United States Patent
Kawakami et al.

(10) Patent No.: US 6,432,585 B1
(45) Date of Patent: *Aug. 13, 2002

(54) ELECTRODE STRUCTURAL BODY, RECHARGEABLE BATTERY PROVIDED WITH SAID ELECTRODE STRUCTURAL BODY, AND RECHARGEABLE BATTERY

(75) Inventors: Soichiro Kawakami; Naoya Kobayashi, both of Nara; Masaya Asao; Takeshi Kosuzu, both of Tanabe; Hironao Kimura, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 55 days.

(21) Appl. No.: 09/014,408

(22) Filed: Jan. 28, 1998

(30) Foreign Application Priority Data

Jan. 28, 1997 (JP) .............................................. 9-013942
Dec. 27, 1997 (JP) .............................................. 9-369371

(51) Int. Cl.⁷ ................................................ H01M 4/66
(52) U.S. Cl. ....................... 429/233; 429/209; 429/235
(58) Field of Search ................................ 429/233, 209, 429/212, 218, 235

(56) References Cited

U.S. PATENT DOCUMENTS

| | | | | |
|---|---|---|---|---|
| 3,647,545 A | * | 3/1972 | Mao ............................ | 136/26 |
| 3,881,953 A | * | 5/1975 | Turowski ..................... | 136/26 |
| 4,163,829 A | | 8/1979 | Kronenberg ................. | 429/194 |
| 4,436,796 A | * | 3/1984 | Huggins et al. ............. | 429/112 |
| 4,844,996 A | * | 7/1989 | Pelad ........................... | 429/194 |
| 5,039,582 A | | 8/1991 | Pistoia ......................... | 429/218 |
| 5,641,591 A | * | 6/1997 | Kawakami et al. .......... | 429/218 |
| 5,698,339 A | * | 12/1997 | Kawakami et al. .......... | 429/212 |
| 5,792,574 A | * | 8/1998 | Mitste et al. ................ | 429/194 |
| 5,824,434 A | * | 10/1998 | Kawakami et al. ......... | 429/209 |

FOREIGN PATENT DOCUMENTS

| | | |
|---|---|---|
| JP | 54-078434 | 6/1979 |
| JP | 60-202675 | 10/1985 |
| JP | 62-015761 | 1/1987 |
| JP | 62-093866 | 4/1987 |
| JP | 62-113366 | 5/1987 |
| JP | 63-013264 | 1/1988 |
| JP | 63-114057 | 5/1988 |
| JP | 02-012768 | 1/1990 |
| JP | 03-062464 | 3/1991 |
| JP | 05-047381 | 2/1993 |
| JP | 05-190171 | 7/1993 |
| JP | 05-234585 | 9/1993 |
| JP | 08-064239 | 3/1996 |

OTHER PUBLICATIONS

N. Kumagai, "Cycling behaviour of lithium–aluminum alloys formed on various aluminum substrates as negative electrodes in secondary lithium cells", *J. Appl. Electrochem.*, vol. 22, pp. 620–627, 1992.

J.O. Besenhard et al., "Will Advanced Li–Alloy Anodes Have a Chance in Lithium–Ion Batteries?", Ext. Abs. WED–02, 8th Int'l Mtg. on Lithium Batteries, pp. 69–72, Jun. 1996.

* cited by examiner

Primary Examiner—Stephen Kalafut
Assistant Examiner—Mark Ruthkosky
(74) Attorney, Agent, or Firm—Fitzpatrick, Cella, Harper & Scinto

(57) ABSTRACT

An electrode structural body comprising a plate-like shaped collector having opposite surfaces and an electrode material layer formed an at least one of said opposite surfaces of said collector, wherein said electrode material layer contains 35% by weight or more of a grained host matrix material of 5 to 60 in average particle size. A rechargeable battery provided with said electrode structural body as an electrode thereof.

95 Claims, 21 Drawing Sheets

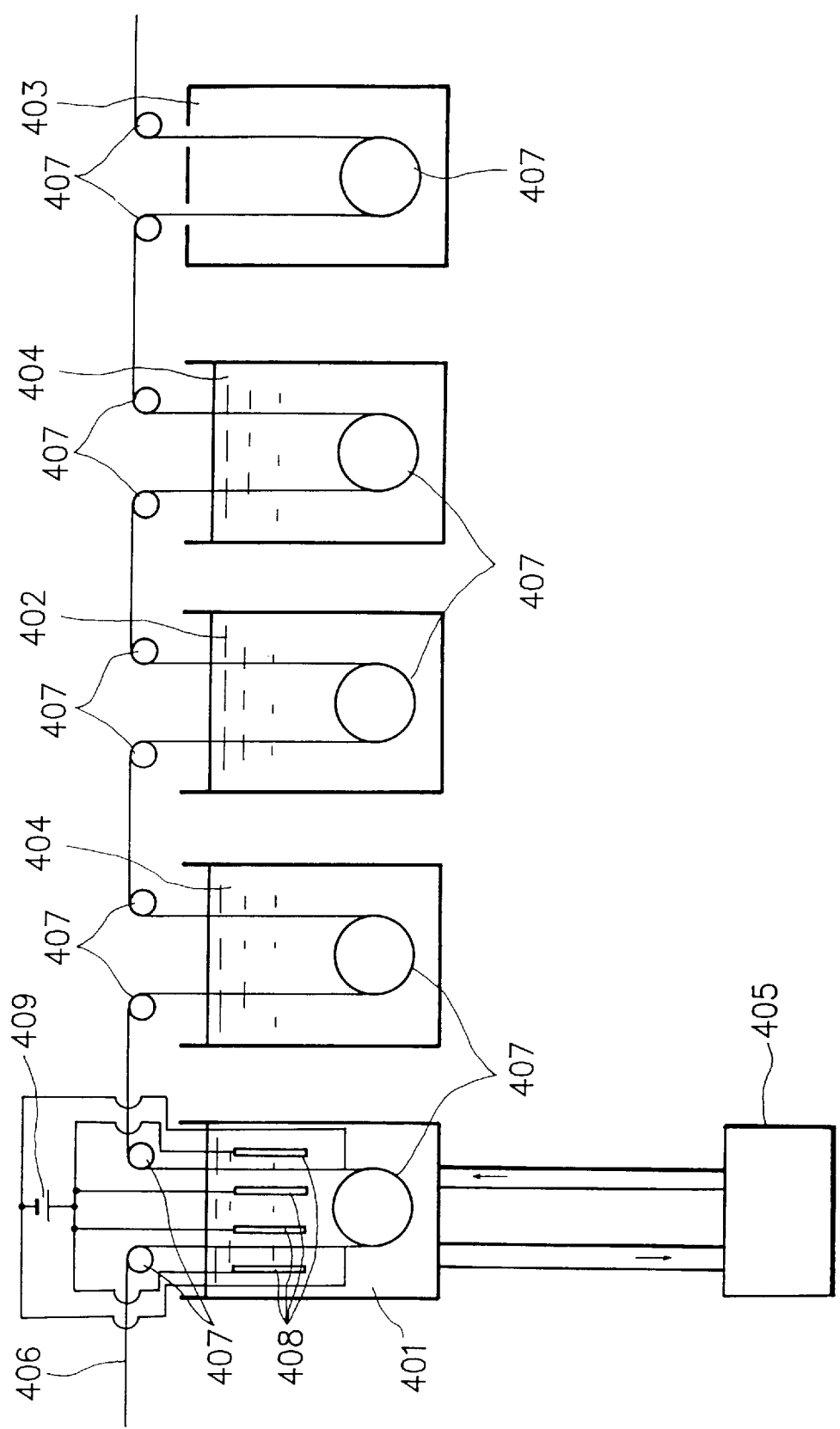

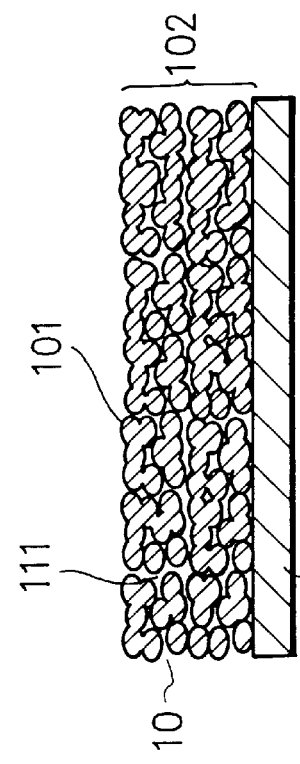
FIG. 9(a)
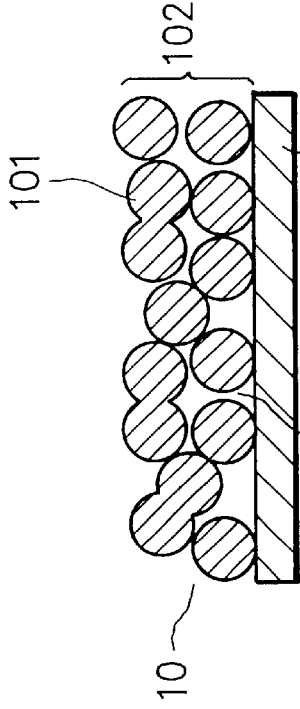
FIG. 9(b)
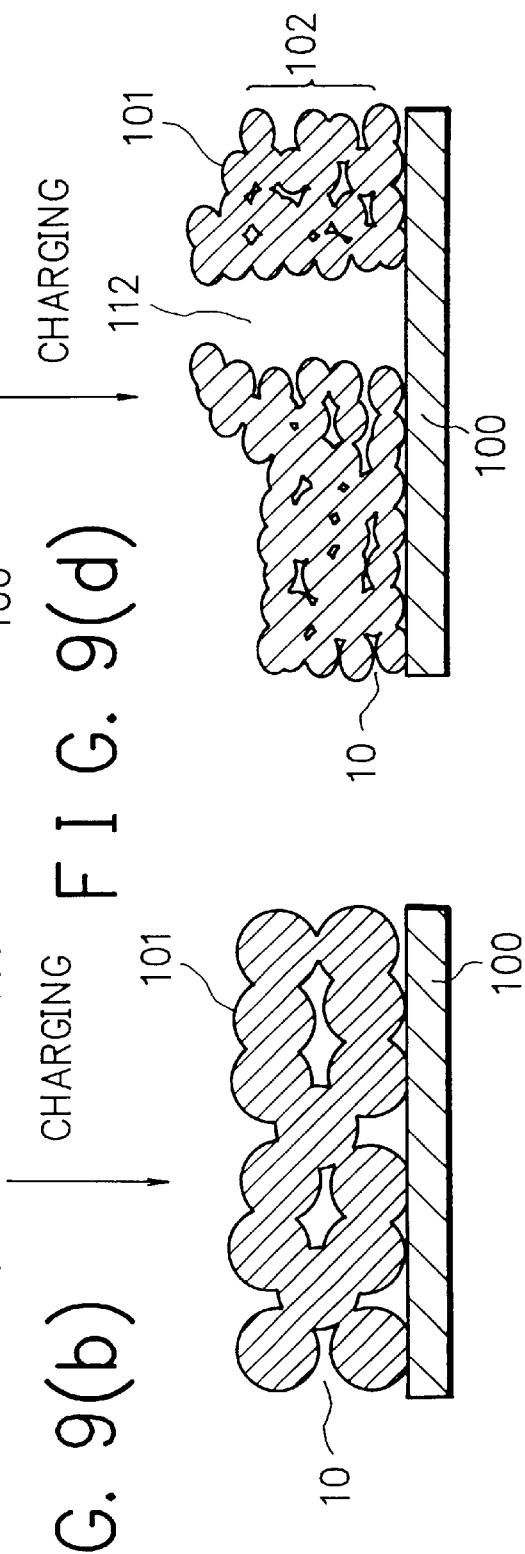
FIG. 9(c)
FIG. 9(d)

F I G. 10
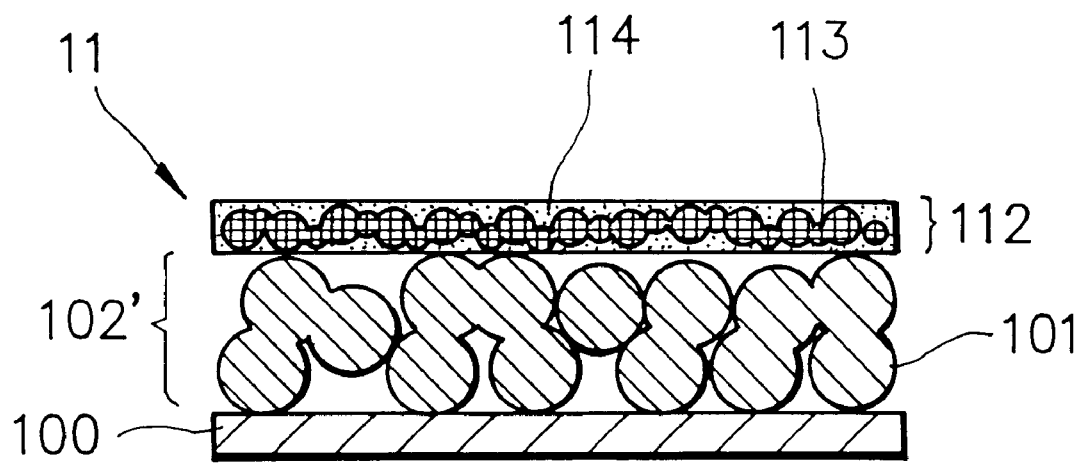

F I G. 12
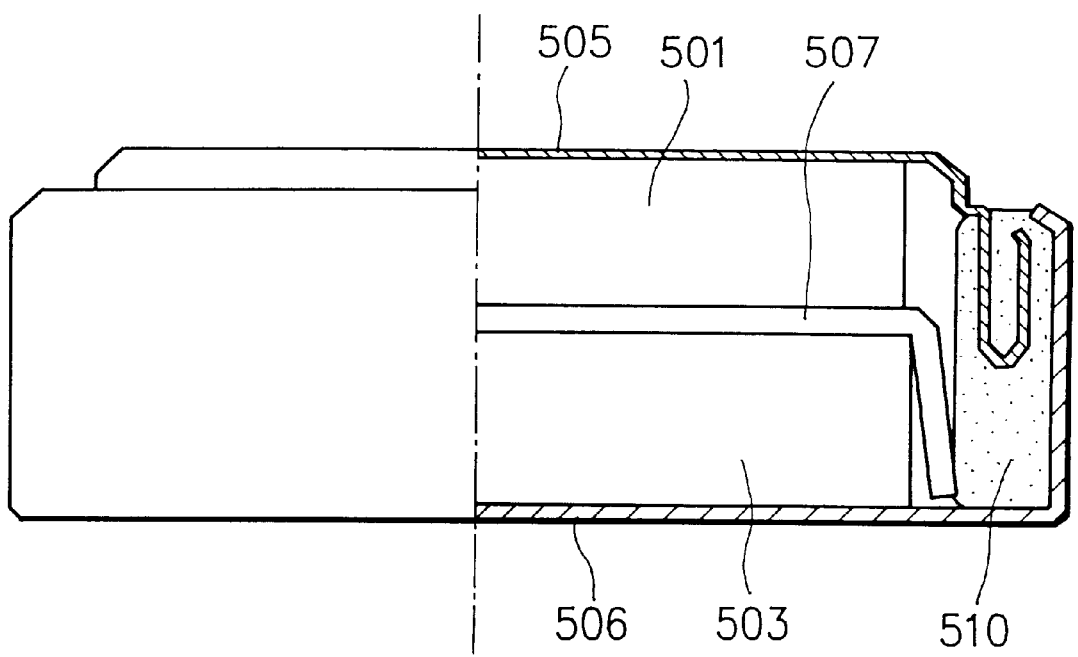

F I G. 14
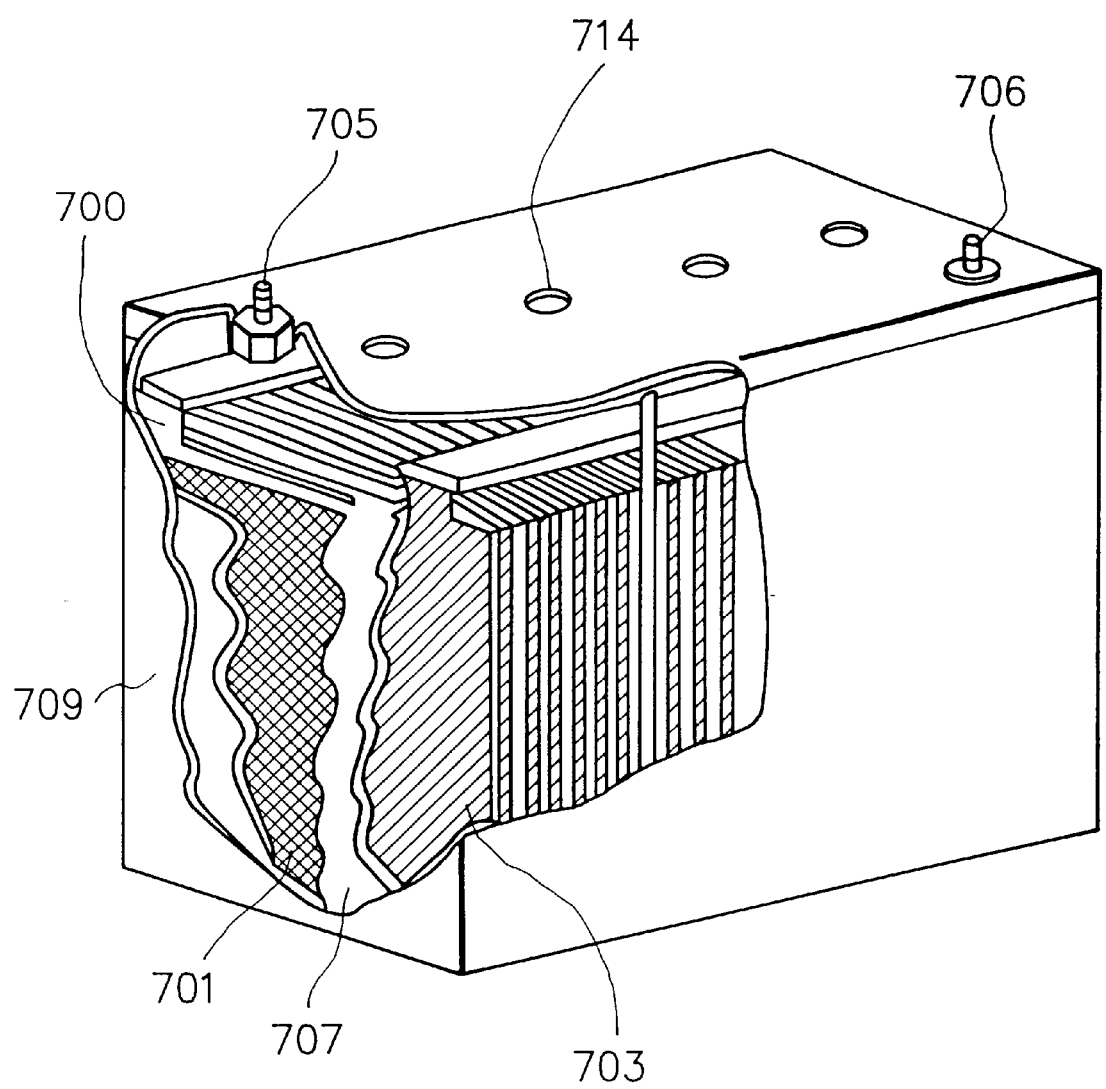

ELECTRODE STRUCTURAL BODY, RECHARGEABLE BATTERY PROVIDED WITH SAID ELECTRODE STRUCTURAL BODY, AND RECHARGEABLE BATTERY

BACKGROUND OF THE INVENTION

1. Field of the Invention

The present invention relates to an improved electrode structural body and a rechargeable battery provided with said electrode structural body. More particularly, the present invention relates an improved electrode structural body having a specific electrode material layer and which is suitable for use, particularly in rechargeable batteries such as rechargeable lithium series batteries and rechargeable zinc series batteries (these rechargeable batteries will be hereinafter referred to simply as rechargeable battery) and a rechargeable battery provided with said electrode structural body and which is always highly safe and stably exhibits excellent battery performances while preventing the generation of growth of a dendrite of lithium or zinc upon the repetition of the charging and discharging cycle, and which has a prolonged cycle life (a prolonged charging and discharging cycle life).

The present invention also relates a process for the production of said electrode structure and a process for the production of said rechargeable battery.

2. Related Background Art

In recent years, increasing levels of atmospheric $CO_2$ has been predicted to cause increase in the earth's temperature, due to the green house effect.

In the case of the steam-power generation, increasing amounts of a fossil fuel represented by coal or petroleum are being consumed for power generation in order to comply with a societal demand for increased power supply. Along with this, the amount of exhaust Ones from the steam-power generation plants has also been continuously increased while accordingly increases the amount of greenhouse gases such as carbon dioxide gas in the air. This results in an earth-warming phenomenon. In order to prevent the earth-warming phenomenon from further developing, prohibitions on newly established steam-power generation plants have been implemented in some countries.

Under these circumstances, use of load leveling has been proposed in order to effectively utilize the power generator, where rechargeable batteries are installed in locations and a surplus power unused in the night, a so-called dump power, is stored in these rechargeable batteries, the power thus stored is supplied in the daytime when the power demand is increased, whereby the power generator is leveled in terms of the load therefor.

In recent years, electric vehicles which do not exhaust any air polluting substances such as COx, NOx, hydrocarbons, and the like and are of low impact to the environment have been developed. For such electric vehicle, there is an increased demand for developing a high performance rechargeable battery with a high energy density which can be effectively used therein.

On the other hand, there is also an increased demand for developing a miniature, lightweight, high performance rechargeable battery usable as a power source for potable instruments such as small personal computers, word processors, camcorders, and cellular phones.

As such rechargeable battery, there has proposed various rocking chair type lithium ion batteries in which a carbonous material such as graphite capable of intercalating lithium ion at intercalation sites of its six-membered network plane provided by carbon atoms in the battery reaction upon charging is used as an -anode material and a lithium intercalation compound capable of deintercalating said lithium ion from the intercalation in the battery reaction upon charging is used as a cathode material. Some of these lithium ion batteries hive been practically used. However, in any of these lithium ion batteries, the theoretical amount of lithium, which can be intercalated by the anodes is only an amount of $\frac{1}{6}$ per carbon atom. Therefore, using this battery design, it is impossible to attain a desirable rechargeable battery having a high energy density comparable to that of a primary lithium battery in which metallic lithium is used as the anode active material.

Further, in such lithium ion battery, when the amount of lithium intercalated by the anode is made greater than the theoretical amount or charging is conducted under condition of high electric current density, there will an unavoidable problem such that lithium is deposited in a dendritic state (that is, in the form of a dendrite) on the anode comprising the carbonous material during the charging operation. This will result in causing internal-shorts between the anode and the cathode upon repeating the charging and discharging cycle, wherein there cannot attain a sufficient charging and discharging cycle life. in addition, it is difficult to operate charging with such high electric current density in the case of a rechargeable battery in which a conventional aqueous series electrolyte solution is used.

Now, rechargeable lithium batteries in which a metallic lithium is used as the anode have been proposed and they have attracted public attention in a viewpoint that they exhibit a high energy density. However, such rechargeable battery is not practically usable one because its charging and discharging cycle life is extremely short. A main reason for this has been generally considered as will be described in the following. The metallic lithium as the anode reacts with impurities such as water or an organic solvent contained in an electrolyte solution to form an insulating film or/and the metallic lithium as the anode has an irregular surface with portions. to which electric field is converged, and these factors lead to generating a dendrite of lithium upon repeating the charging and discharging cycle, resulting in internal-shorts between the anode and cathode. As a result, the charging and discharging cycle life of the rechargeable battery is extremely shortened.

When the lithium dendrite is formed to make the anode and cathode such that they are internally shorted with the cathode, the energy possessed by the battery is rapidly consumed at the internally shorted portion. This creates problems in that the battery is heated or the solvent of the electrolyte is decomposed by virtue of heat to generate gas, resulting in an increase in the inner pressure of the battery. These problems result in damaging the rechargeable battery or/and shortening the lifetime of the battery.

Use of a lithium alloy such as lithium-aluminum alloy as the anode for a rechargeable lithium battery has been proposed as a way to suppress the reactivity of the lithium with water or an organic solvent contained in the electrolyte solution to prevent lithium dendrite formation. However, this is not practical for the following reasons. The lithium alloy is difficult to fabricate into a spiral form and therefore, it Is difficult to produce a spiral-wound cylindrical rechargeable battery. Accordingly, it is difficult to attain a desirable charging and discharging cycle life for a rechargeable battery obtained, and the rechargeable battery, it is difficult attain a: desirable energy density similar to that of a primary battery in which a metallic lithium is used as the anode.

Japanese Unexamined Patent Publications Nos. 64239/1996, 62464/1991, 12768/1990, 113366/1987, 15761/1987, 93866/1987, and 78434/1979 disclose various metals, i.e., Al, Cd, In, Sn, Sb, PC and Bi as the metal capable of forming an alloy with lithium in a rechargeable battery when the battery is subjected to charging, and rechargeable batteries in which these metals, alloys of these metals, or alloys of these metals with lithium are used as the anodes.

However, these documents do not detail about the configurations of the anodes. And any of the rechargeable batteries disclosed in these documents is problematic in that when any of the alloy materials is fabricated into a plate-like form, such as a foil form which is generally adopted as an electrode of a rechargeable battery and it is used as an anode of a rechargeable battery in which lithium is used as an active material, the surface area of a portion contributing to the battery reaction in the electrode material layer is relatively small and therefore, the charging and discharging cycle is difficult to be conducted with a large electric current. Further, for a rechargeable battery in which any of the foregoing alloy materials is used the anode, there are such problems as will be described in the following. The anode is expanded with respect to the volume because of alloying with lithium upon charging and shrunk upon discharging, where the anode suffers from repetitive variations in the volume. Because of this, the anode has a tendency that it is eventually distorted and cracked. And when the charging and discharging cycle is repeated over a long period of time, in the worst case, the anode is converted into a pulverized state to have an increased impedance, resulting in shortening the charging and discharging cycle life. Hence, none of the rechargeable batteries disclosed in the above Japanese documents has been put to practical use.

Japanese Unexamined Patent: Publication No. 202675/1985 proposes an anode for a rechargeable battery in which a non-aqueous electrolyte is used, said anode being an anode having an improved porosity rate obtained by providing a composition composed of powder of a given metal or alloy, a binder and a filler soluble in a solvent, compression-molding said composition into a body and immersing said body in a solvent to dissolve the filler contained therein. This document describes that a rechargeable lithium battery in which said anode is used provides an improved charge-and-discharge capacity at a relatively high current density of more than 2 mA/cm$^2$. However, this Japanese document is silent about the charging and discharging cycle life of the battery.

EXTENDED ABSTRACTS WED-02 (pp. 69–72) ON 8TH INTERNATIONAL MEETING ON LITHIUM BATTERIES (hereinafter referred to as document WED-02) describes that by electrochemically depositing a Sn material or a Sn-alloy material on a copper wire of 0.07 mm; in diameter as a collector, an electrode having a deposited layer comprising a grained tin material with a small particle size of 200 to 400 nm can be formed, and a battery in which the electrode having such deposited layer with a thin thickness of about 3 $\mu$m and a counter electrode comprising lithium metal are used, has an improved charging and discharging cycle life. Document WED-02 further describes that in the evaluations in which charging was conducted up to 1.7 Li/Sn with a current density of 0.25 mA/cm$^2$, an electrode having a layer comprising a fine-grained tin material of 200 to 400 nm in particle size deposited on a collector comprising a copper wire of 0.07 mm in diameter prepared in accordance with the foregoing manner, an electrode comprising an alloy of $Sn_{0.91}Ag_{0.09}$ and an electrode comprising an alloy of $Sn_{0.72}Sb_{0.28}$ were greater than an electrodes having a layer comprising a coarse-grained tin material of 2000 to 4000 nm in particle size obtained by depositing a Sn-alloy material on a collector comprising a copper wire of 1.0 mm, in diameter in the same manner as described in the above, in terms of the charging and discharging cycle life, respectively by about 4 times, about 9 times, and about 11 times. However, in document WED-02, the evaluated results are those obtained by using the lithium metal as the counter electrode as above described. Document WED-02 does not describes anything about results evaluated in practical battery configurations. And the foregoing electrode having the fine-grained thin layer of 200 to 400 nm in particle size is one prepared by electrochemically depositing the Sn material or Sn-alloy material on the copper wire of 0.07 mm in diameter. Therefore this electrode is not usable in a practical rechargeable battery. Further, the foregoing electrode having the coarse-grained tin layer of 2000 to 4000 nm in particle size is one prepared by depositing the Sn-alloy material on the copper wire of 1.0 mm in diameter. It is understood that this electrode is apparently inferior in terms of the charging and discharging cycle life.

Japanese Unexamined Patent Publications Nos. 190171/1993, 47381/1993, 114057/1988 and 13264/1988 describe rechargeable batteries in which various lithium alloys are used as the anodes and in which the generation of a dendrite is prevented so as to have an improvement in the charging efficiency and the charging and discharging cycle life.

Similarly, Japanese Unexamined Patent Publication No. 234585/1993 describes a rechargeable battery having an anode comprising a lithium metal whose surface being uniformly adhered with a powdery metal difficult to form an intermetallic compound with lithium in which the generation of a dendrite is prevented so as to have an improvement in the charging efficiency and the charging and discharging cycle life.

However, the anode in any of the rechargeable batteries described in these publications is insufficient particularly in terms of the battery lifetime.

*Journal of Applied Electrochemistry*, 22, 620–627 (1992) discloses a rechargeable lithium battery in which the anode is constituted by an aluminum foil having a surface applied with etching treatment. However, the rechargeable lithium battery disclosed in this document is problematic in that when the charging and discharging cycle is repeated under standard use conditions for the ordinary rechargeable battery, the aluminum foil is repeatedly expanded and shrunk, eventually cracking, resulting in a reduction in the current collecting performance, wherein the growth of a dendrite is liable to occur. Hence, it is difficult for the rechargeable lithium battery described in this document to have a practically usable charging and discharging cycle life.

The above situation in the conventional rechargeable lithium batteries is similar in the conventional rechargeable zinc series batteries including nickel-zinc batteries and rechargeable zinc-oxygen (or zinc-air) batteries. That is, in any of these zinc series batteries, problems are liable to occur in that upon repeating the charging and discharging cycle, a dendrite of zinc as the anode constituent is often generated and grown to penetrate the separator, resulting in causing internal-shorts between the zinc anode and the cathode, where the charging and discharging cycle life is shortened.

Accordingly, there is an increased demand for an improved, highly reliable rechargeable battery which possesses a high energy, density (or charge energy density) and a prolonged charging and discharging cycle life.

The term "rechargeable battery" herein and hereunder is meant to include a rechargeable lithium battery in which intercalation-deintercalation reaction in accordance with the oxidation-reduction reaction of lithium ion due to charge and discharge is used, and a rechargeable zinc series rechargeable battery in which zinc is used as the anode.

The rechargeable lithium battery herein is meant to include a rechargeable lithium battery in which a carbonous material is used as the anode. The rechargeable zinc series battery herein is meant to include a rechargeable nickel-zinc battery, a rechargeable zinc-oxygen battery and a rechargeable bromine-zinc battery.

SUMMARY OF THE INVENTION

The present invention has been accomplished in view of the above-described nm situations in the prior art.

An object of the present invention is to provide an improved electrode structural body in which an anode active material comprising lithium or zinc is used and which is desirably usable in a rechargeable battery and a rechargeable battery provided with said electrode structural body and which has a high energy density and a prolonged charging and discharging cycle life.

Another object of the present invention is to provide an improved electrode structural body having an electrode material layer comprising 35% by weight or more of a grained host matrix material comprising host matrix material particles of 0.5 to 60 μm in average particle size formed on a surface or opposite surfaces of a plate-like shaped collector.

A further object of the present invention is to provide a rechargeable battery comprising at least an anode, a cathode and an electrolyte and in which charging and discharging are operated utilizing oxidation-reduction. reaction of an anode active material, wherein said anode comprises an electrode structural body having an electrode material layer comprising 35% by weight or more of a grained host matrix material comprising host matrix material particles of 0.5 to 60 μm in average particle size formed on a surface or opposite surfaces of a plate-like shaped collector.

The grained host matrix material comprising host matrix material particles such specific average particle size in the present invention will be hereinafter referred to simply as "grained host matrix material" or "host matrix material particles" for simplification purposes.

BRIEF DESCRIPTION OF DRAWINGS

FIG. 8 is a schematic diagram illustrating an apparatus for forming a layer on a collector by means electroplating.

FIGS. 9 (a) and 9(b) are schematic views for explaining mechanisms for no cracking to be occurred in an electrode structural body according to the present invention upon charging, when used in a rechargeable battery.

FIGS. 9 (c) and 9(d) are schematic views for explaining mechanisms for cracking to be occurred in a comparative electrode structural body comprising thinner host matrix material particles upon charging, when used in a rechargeable battery.

FIG. 10 is a schematic cross-sectional view illustrating a further example of the constitution of an electrode structural body according to the present invention.

FIG. 12 is a schematic cross-sectional view illustrating an example of a single-layer structure type flat battery (or a coin-like shaped battery) according to the present invention.

FIG. 14 is a schematic perspective view illustrating an example of a prismatic battery according to the present invention.

DESCRIPTION OF THE INVENTION AND PREFERRED EMBODIMENTS

Figure 1:
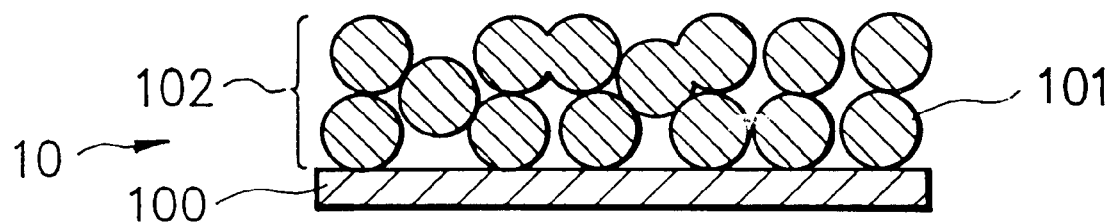
FIG. 1 is a schematic cross-sectional view illustrating an example of the constitution of an electrode structural body according to the present invention.

The present inventors conducted experimental studies in order to solve the foregoing shortcomings due to the performance of the anode which are found in the conventional rechargeable batteries in which the oxidation-reduction reaction of lithium or zinc is used. As a result, there was obtained a finding that an electrode structural body having an electrode material layer comprising 35% by weight or more of a grained host matrix material comprising host matrix material particles of 0.5 to 60 μm. in average particle size formed on a surface or opposite surfaces of a plate-like shaped collector enables to realize a desirable rechargeable battery (in which the oxidation-reduction reaction of lithium or zinc is used) which is free of such shortcomings as above described in the prior art and has a high battery capacity a high energy density and a prolonged cycle life (that is, a prolonged charging and discharging cycle life).

The "average particle size" in the present invention means an average value of sizes of constituent particles of a given grained host matrix material which is obtained by observing the constituent particles of the grained host matrix material by means of a scanning electron microscope (SEM).

Herein, as previously discussed, the foregoing document WED-02 describes that a battery in which an electrode comprising a fine-grained tin or tin-alloy material layer with a small particle size of 20 to 400 nm electrochemical deposited on a copper wire of 0.07 mm in diameter is used has an improved charging and discharging cycle life. in this case, it is understood that an extremely thin copper wire (having a diameter, of 0.07 mm) is used as the collector. And according to the description of document WED-02, it is understood that in the case of using a relatively thick copper wire of 1 mm in diameter as the collector, a coarse-grained tin or tin alloy material layer of 2000 to 4000 nm in particle size is deposited thereon, and a battery in which this electrode having such coarse-grained material layer of 2000 to 4000 nm in particle size deposited on the copper wire of 1 mm in diameter is used is inferior in terms of the charging and discharging cycle life. In this connection, it is considered that according to the technique disclosed in document WED-02, it is difficult to realize a practical usable electrode comprising a fine-grained tin or tin-alloy material layer of 200 to 400 nm in particle size electrochemically deposited on an ordinary plate-like shaped collector having a large area which enables to provide a rechargeable battery having a satisfactory charging and discharging cycle life. Further, according to the description of document WED-02, it is understood that the thickness of the fine-grained tin or tin-alloy material layer of 200 to 400 nm in particle size deposited on the copper wire of 0.07 mm in diameter is very thin (about 3 μm). The charge capacity per unit area of the electrode calculated from the amount of lithium stored in this very thin tin or tin-alloy material layer of 200 to 400 nm in particle size is not of a practically acceptable level.

As above described, the electrode structural body according to the present invention comprises the grained material layer (as the electrode material layer) whose constituent particles being controlled to have such specific average particle size as above described which is formed on the plate-like shaped collector which is large in terms of the area. This electrode material, layer is a relatively uniform layer with slight unevenness over the large area of the collector. When the electrode structural body is used as an electrode in a rechargeable battery, the surface area of the grained host matrix material of the electrode material layer is enlarged when the grained host matrix material is engaged in battery reaction. Particularly, when the electrode structural body is used as the anode in a rechargeable battery in which the oxidation-reduction reaction of lithium or zinc is used, and battery reaction proceeds such that an anode active material is retained in the electrode material layer comprising the grained host matrix material upon operating charging and said anode active material is released from the electrode material layer. The current density with respect to the surface area of the electrode material layer of the anode can be reduced, so that the electrochemical reaction with respect to the surface area of the anode gently and uniformly proceeds. Particularly, the ratio between expansion and contraction of the volume of electrode material layer due to insertion of the anode active material into and release thereof from the electrode material layer in the charge and discharge reactions can be diminished, resulting in an improvement in both the charge-and-discharge efficiency and the battery capacity and in prolongation of the lifetime (the charging and discharging cycle life), of the anode, namely, the battery.

In the present invention, when the void ratios of the electrode material layer as the anode layer is optimized while its constituent particles being controlled to have such specific average particle size as above described, the surface of the electrode material layer is prevented from being cracked even when the electrode material layer is alternately expanded and shrunk due to the insertion of an ion of an active material (an anode active material in this case) into and the release thereof from the electrode material layer at the beginning stage where the charging and discharging cycle is repeated several times.

The term "void ratio" in the present invention is based on the following situation. An electrode material layer having a space formed by a top enveloping surface and a bottom face in contact with a surface of a collector on which said electrode material layer is provided wherein the space is packed by given host matrix material particles while having unfilled voids among said particles packed in the electrode material layer. The ratio of the totaled volume of the unfilled voids to the true volume of the electrode material layer is defines as a void ratio for the electrode material layer. The term "void ratio" in the present invention has the same meaning as the term "porosity".

The void ratios A can be obtained on the basis of the following equations (1) and (2).

$$V = \Sigma(w_i/d_i) \quad (1)$$

$$A = (V'-V)/V' \quad (2)$$

In these equations,

V' is a volume (thickness×area) of an electrode material layer a space formed by a top enveloping surface and a bottom face in contact with a surface of a collector on which paid electrode, material layer is provided wherein the space is packed by given host matrix material particles while having unfilled voids among, said particles packed in the electrode material layer, $w_i$ is a weight of said host matrix material particle, $d_i$ is a specific gravity (a true density) of said host matrix material particles, and V is a true volume occupied by said host matrix material particles in said electrode material layer.

And the weight (W) of the electrode material layer is based on equation $W = \Sigma w_i$ (in the case where the host matrix material particles is of one kind material, W=w). and the bulk density d'=W/V'.

The term "active material" in the present invention is a general name of a material which is engaged in the electrochemical reaction (particularly, the repetition of the electrochemical reaction) upon charging and discharging in a rechargeable battery The active material includes other material than the above material as long as said material itself can engage in the above reaction. Specifically, in the case of a rechargeable lithium battery, lithium element as the anode active material is retained on the anode side upon charging, and it is dissolved into an electrolyte solution whereby converting into lithium ion upon discharging. In the case of a rechargeable zinc battery, zinc element as the anode active material reacts with hydroxide ion into zinc hydroxide or zinc oxide upon discharging.

In a preferred embodiment of the present invention, the electrode material layer (comprising 35% by weight or more of a grained host matrix material of 0.5 to 60 $\mu$m in average particle size) formed the plate-like shaped collector is controlled to have a void ratios in the range of 0.10 to 0.86. When the electrode structural body thus constituted is used in a rechargeable battery, the battery characteristics including battery capacity, energy density and cycle life (charging and discharging cycle life) are further improved.

In a more preferred embodiment, the electrode material layer is designed such that a plurality of pores having a diameter in the range of 0.10 to 10 $\mu$m (the maximum and minimum values fall in this range) are formed at the surface thereof after discharging or that the thickness thereof is in the range of 5 to 500 $\mu$m. In addition, it is desired for the electrode material layer in unused state with neither charging nor discharging have being operated to be controlled to have a surface with irregularities of 1 to 60 $\mu$m.

In the following, detailed description will be made of the electrode structural body according to the present invention with respect to the structure and constituents and also with respect to preparation of the electrode structural body.

FIG. 1 is a schematic cross-sectional view illustrating an example of an electrode structural body according to the present invention.

An electrode structural body 10 shown in FIG. 1 comprises a layer 102 (an electrode material layer) comprising 35% by weight or more of host matrix material particles 101 (this will be hereinafter referred to as "grained host matrix material" or "host matrix material particles") of 0.5 to 60 $\mu$m in average particle size which is formed on a surface of a collector 100. In FIG. 1, the electrode material layer 102 is provided only one of the opposite surface of the collector 100. This is not limitative. It is possible for the electrode material layer 102 to be provided on each of the opposite surfaces of the collector 100.

The collector 100 serves to supply an electric current so that it can be efficiently consumed for the electrode reaction upon charging. It also serves to collect an electric current generated upon discharging. The collector 100 which is used in the anode of a rechargeable battery is desired to be constituted by a material which has high electrical conductivity and is inactive in the battery reaction. Specific preferable examples of such material are Cu, Ni, Fe, Ti, and alloys of two or more these metals such as stainless steel.

The collector 100 is plate-like shaped. For the plate-like shape and its thickness, there is no particular limitation. The plate-like shape may be in a foil-like form having a thickness about 100 $\mu$m or less. Besides, the collector can include a mesh-like configuration, porous form-like sponge configuration, punching metal configuration or expanded metal configuration respectively in a plate-like shape.

For the surface of the collector 100, it sometimes has minute protrusions such as flaws or the like which will be occurred in the production process by means of rolling or the like. Such protrusion is desired to be covered by an appropriate oxide having a resistivity which is higher than that of the constituent material of the collector. Specific examples of such oxide are oxides of one or more elements selected from the group consisting of Ni, Zn, Sn, and In. In the case where a fine-grained material having a large specific surface is used as the host matrix material of the electrode material layer 102 or in the case where the electrode material layer 102 is formed, for instance, by means of plating or coating, when the collector 100 has such minute protrusions as above described on the surface thereof in contact with the electrode material layer 102, these protrusions are desired to be at least substantially covered by such oxide as above described. To cover the protrusions of the collector by the oxide this way provides advantages as will be described in the following when the electrode structural body is used in a rechargeable battery. An active material is desirably prevented from being deposited at the protrusions (which are electrically conductive) due to electric field being converged at the protrusions upon charging. This leads to preventing the generation or growth of a dendrite of the active material upon repeating the charging and discharging cycle, where occurrence of internal-shorts in the battery is prevented to elongate the charging and discharging cycle life of the battery.

Figure 2A:
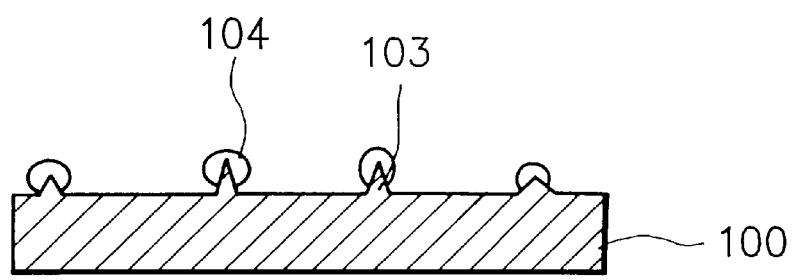
FIGS. 2(a) and 2(B) are schematic cross-sectional views illustrating a structure of a collector used in the present invention and treatment of said collector in the case of forming an electrode material layer.
Figure 2B:
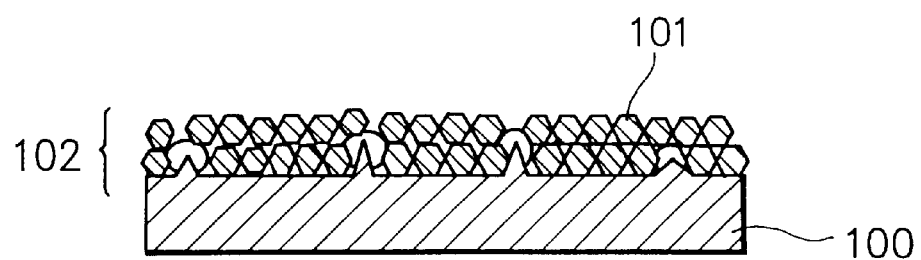

FIGS. 2(*a*) and 2(*b*) shows an embodiment in that in the case where minute protrusions are present on the surface of the collector 100 shown in FIG. 1, the protrusions are treated as above described, followed by forming the electrode material layer whose constituent host matrix material particles being controlled as desired. in this embodiment, a given metal oxide 104 is deposited onto each of minute protrusions 103 incidentally occurred (as above described) on the surface of the collector 100 so as to cover each minute protrusion by the oxide [see, FIG. 2(*a*)] followed by depositing, thereon, a grained host matrix material 101 [see, FIG. 2(*b*)] whereby forming an electrode material layer 102. The electrode structural body prepared by making the minute protrusions 103 on the surface of the collector 100 to be highly electrically resistant and forming the electrode material layer 102 in this way is uses as an anode in a rechargeable battery, the surface of the anode has a slight number of portions at which electric field is converged. Therefore, when the rechargeable battery is either a rechargeable lithium battery or a rechargeable zinc battery, a dentrite of lithium or zinc is desirably prevented from generating or said dendrite when it should be generated is desirably prevented from growing even upon repeating the charging and discharging cycle over a long period of time.

To cover the minute protrusions of the collector by the oxide as above described ray be conducted, for example, in the following manner. The collector as a cathode and a counter electrode as an anode are immersed in an electrolyte solution comprising aqueous solution of one or more of nitrates selected from the group consisting of nickel nitrate, zinc nitrate, indium nitrate, and tin nitrate, followed by causing electrolytic reaction, where the quantity of electricity in the electrolytic reaction is controlled as required to deposit a given metal oxide onto the minute protrusions of the collector whereby covering the minute protrusions by the oxide deposited.

Description will be made of the host matrix material 101 and the electrode material layer 102.

In the electrode structural body 10, the electrode material layer 102 which is practically engaged in the electrochemical reaction comprises 35% by weight or more of a grained host matrix material 101 (or host matrix material particles) of 0.5 to 60 $\mu$m in average particle size as above described. In a preferred embodiment, the grained host matrix material 101 is of 0.5 to 20 $\mu$m in average particle size. As the grained host matrix material 101, an appropriate material whose bulk's specific resistance (electric resistivity) at 20° C. being preferably in the range of $1 \times 10^{-6}$ to $1 \times 10^{0}$ $\Omega \cdot$cm or most preferably in the range of $1\times10^{-5}$ to $1\times10^{-1}$ Ω·cm is used. It is more preferable for the electrode material layer 102 to contain the grained host matrix material 101 in an amount of 50% by weight or more. Such material used as the grained host matrix material 101 can include materials composed of one or more elements selected from the group consisting of Si, Ge, Sn, Pb, In, Mg, and Zn which are usable as a constituent of the anode in a rechargeable lithium battery or a rechargeable zinc batter. Alloys and composites of two or more of these elements are also usable. Particularly, when the electrode structural body is for use in a rechargeable lithium battery, the grained host matrix material is desired to comprise a material composed of one or more elements selected from the group consisting of Si, Sn, and In. When the electrode structural body is for use in a rechargeable zinc battery, the grained host matrix material is desired to comprise a material composed of one or more materials selected from the group consisting of zinc oxides and zinc alloys.

The grained host matrix material (101) is desired to be covered by a layer comprising a metal which is deferent from that contained in the grained host matrix material.

Figure 3:
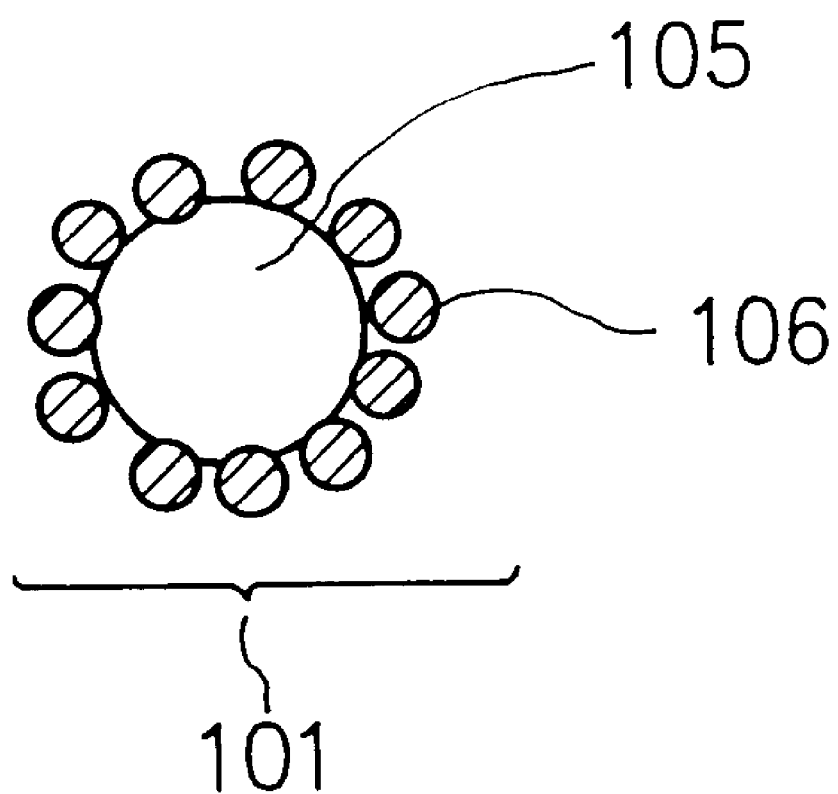
FIG. 3 is a schematic cross-sectional view illustrating an example of the structure of a grained host matrix material of an electrode structural body according to the present invention.

FIG. 3 is a schematic cross-sectional view illustrating an embodiment of a host matrix material particle (corresponding to one of the host matrix material particles 101 shown in FIG. 1) in this case. The host matrix material particle 101 in this embodiment shown in FIG. 3 comprises a core portion 105 having a surface covered by a metal 106. The covering metal 106 serves to assist electron conduction among the particles 101.

In the case where Sri is used as the host matrix material particle (101) in the electrode structural body, (i) a configuration comprising a metallic Sn or Sn-alloy particle (or powder) whose surface being partially covered by one or more metals selected from the group consisting of Cu and Ag; (ii) a configuration comprising a Ni particle (or powder) whose surface being partially covered by metallic Sn; and (iii) a configuration comprising an alloy particle (or powder) composed of Sn and one or more metals selected from the group consisting of Cu, Ni, Ag, Sb, Si and Zn may be taken. According to any of these configurations, the impedance in a rechargeable battery in which the oxidation-reduction reaction of lithium or zinc is used can be prevented from increasing, resulting in preventing the charge-and-discharge efficiency from decreasing.

Any of the configurations (i) and (ii) may be obtained as will be described in the following. For instance, the configuration (i) maybe obtained in, the following manner. Sn particle (or powder) is immersed in an electroless plating liquid and it is engaged in reduction on reaction or substitution reaction utilizing a difference of ionization tendency, or Sn, or Sn-alloy particle (or powder) is immersed in an aqueous solution of a salt of Cu or Ag and it is engaged in substitution reaction, whereby an Sn or Sn-alloy particle (powder) whose surface being covered by Cu or Ag is obtained The configuration (ii) may be obtained in the same manner as in the case of the configuration (i).

In the case where Si is used as the host matrix material particle (101) in the electrode structural body, it is desired to employ a configuration comprising a Si particle (or powder) whose surface being partially covered by one or more metals selected from the group consisting- of Cu, Ni, Ag, and Sn. The foregoing Si may be of less than 99% in purity. In this case, there is an advantage in that it is possible to obtain a host matrix material as the constituent of the electrode material layer by using such relatively inexpensive material and this leads to reducing the production cost of a rechargeable battery.

Further, the foregoing Si is desired to contain an impurity comprising one or more elements selected front the group consisting of Al, Ca, Cr, Fe, Mg, Mn, and Ni. In this case, the electric resistance of the electrode material layer 102 can be more decreased. As a result, the impedance in a rechargeable battery in which the oxidation-reduction reaction of lithium or zinc is used can be prevented from increasing to result in preventing the charge-and-discharge efficiency of the battery from decreasing.

The above-described Si particle whose surface being covered by Cu, Ag or the like may be obtained, for instance, in the following manner. Si particle (or powder) is roughened with respect to its surface, a Sn colloid containing Sn-ion is deposited on the roughened surface, followed by substituting the deposited Sn by Pd, and using the Pd on the Si particle's surface as a catalyst, the Si particle's surface is covered by Cu or Ag by way of electroless reduction reaction.

The surface of the particle (of Sn or Sn-alloy, Ni, Si, or In) obtained using such aqueous solution as above described or that of the particle constituted by a component of Sn, Pb or Zn which is of a low melting point tend to be deposited with a thin oxide film is liable to form a thin oxide film so as to cover the surface. Therefore, it is desired that before or after the formation of a layer comprising such particle, such covering oxide film is removed by way of reduction treatment or surface treatment using an acid whereby improving the performance as the electrode material layer, particularly the performance as the anode.

Incidentally, when the anode active material is Zn, the constituent of the grained host matrix material (101) of the electrode structural body is desired to comprise a material selected from the group consisting of alloys comprising Zn and one or more metals selected from the group consisting of Cu, Ni, and Ag and. zinc oxides.

The electrode material layer 101 may be a layer constituted by only the grained host matrix material 101 incorporated with other inorganic material as required. In this case, the layer as the electrodes material layer is of low electric resistance. When the electrode structural body having this electrode material layer is used as an anode in a rechargeable battery in which the oxidation-reduction reaction of lithium or zinc is used, the internal impedance of the battery can be decreased, resulting in an increased in the charge-and-discharge efficiency.

For the electrode material layer 102 comprising such powdery host matrix material (101) as above described, it may be formed by a mixture composed of a given starting material as the host matrix material and an appropriate electrically conductive auxiliary, in order to assist and increase electron conduction among particles of the host matrix material or that between the host matrix material and the collector. For We amount of the electrically conductive auxiliary used herein, it is preferred to be in the range of 1 to 30% by weight.

Specific examples of the electrically, conductive auxiliary are carbonous materials and metallic materials. Such carbonous material can include amorphous carbon materials such as acetylene black and ketjen black and graphite. The carbonous material used herein serves not only to assist the electron conduction among the host matrix material particles but also to improve the physical strength of the electrode material layer 102. in additional in the formation of the electrode material layer 102, for instance, in the case where powder of a metal of low melting point such as Sn, Pb, or Zn as a host matrix material and a electrically conductive auxiliary comprising a given metallic material are mechanically mixed using a ball mill or the like, the carbonous material serves to prevent said powdery metal from being melted into a mass. The metallic material as the electrically conductive auxiliary in this case can include Cu, Ni, Ag, Ti, and Fe.

For the configuration of the electrically conductive auxiliary, it nay be in a spherical form, flake-like form, filament-like form fibrous form, spike-like form, or needle-like form. Besides, it may take a configuration comprising a combination of two or more of these forms. To use the electrically conductive auxiliary having any of these configurations improves the packing density upon the formation of the electrode material layer 102, where the resulting electrode material layer is of low impedance.

The electrode material layer 102 may comprise a composite added with an organic polymer. In this case, the flexibility of the electrode structural body is improved. In addition, there are other advantages such that the electrode comprising the electrode structural body is free of layer peeling even in the case where it is spirally wound; in the case where the anode comprising the electrode structural body is repeatedly expanded and shrunk upon repeating the charging and discharging cycle, the organic polymer expands and contracts to prevent the electrode material layer from being peeled from the collector, resulting in the performance of the battery from being deteriorated.

In the case where the electrically conductive auxiliary is incorporated into the electrode material layer 102 as above described, it is desired to use the above organic polymer as a binder for the grained host matrix material 101 and the electrically conductive auxiliary.

The amount of the above organic polymer contained in the electrode material layer 102 is desired to be in the range of 2% by weight to 20% by weight in order to retain the active material layer in a large amount as much as possible upon operating charging.

The organic polymer used is required to be stable such that it is not dissolved or decomposed in an electrolyte solution used in a rechargeable battery in which the electrode structural body is used as the anode.

Specific examples of the organic polymer in the case where the electrode structural body is used in a rechargeable lithium battery are polyolefins such as polyethylene and polypropylene, celluloses such as carboxymethylcellulose, and fluororesins such as polyvinylidene fluoride and tetrafluoroethylene polymers. Specific examples of the organic polymer in the case where the electrode structural body is used, in a rechargeable zinc battery are, in addition to those organic polymers illustrated in the case of the rechargeable lithium battery, celluloses such as carboxymethylcellulose, polyvinyl alcohol, and polyvinyl chloride.

Figure 4:
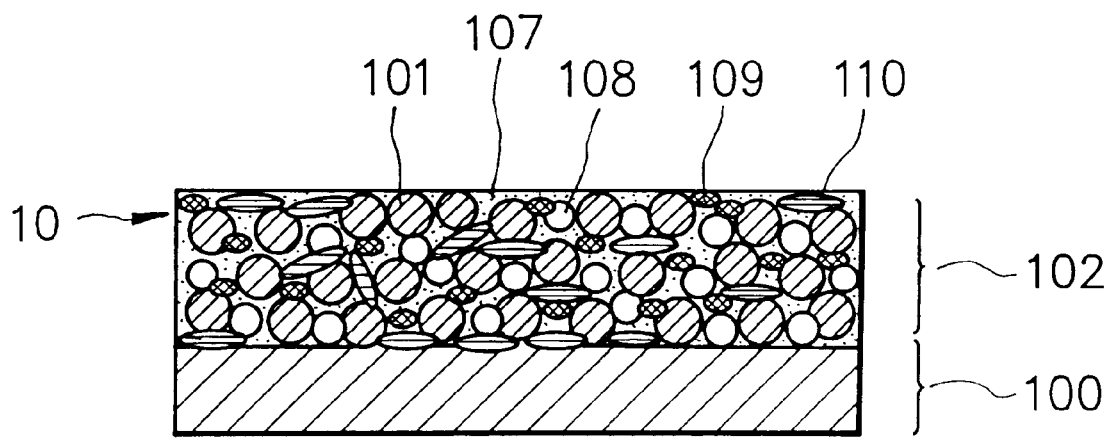
FIG. 4 is a schematic cross-sectional view illustrating another example of the constitution of an electrode structural body according to the present invention.

FIG. 4 is a schematic cross-sectional view illustrating an embodiment in which the foregoing electrically conductive auxiliary and the foregoing organic polymer are used in addition to the grained host matrix material 101 in the electrode material layer of the electrode structural body shown in FIG. 1.

The electrode material layer 102 in this case comprises, in addition to the grained host matrix material 101, a binder 107 comprising the organic polymer, a spherical carbonous material 108 as the electrically conductive auxiliary, a spherical metallic material 109 as the electrically conductive auxiliary, and a flake-like shaped metallic material 110 as the electrically conductive auxiliary.

When the electrode structural body 10 is used as the anode in a rechargeable lithium battery or a rechargeable zinc battery, the surface of the electrode material layer 102 in the electrode structural body is desired to be designed such that a plurality of pores preferably of 0.10 to 10 μm in diameter are formed after discharging. When such pores are formed at the surface of the electrode material layer of the electrode structural body after discharging, the area in the electrode material layer which reacts with the active material will be increased at the time of successive charging, and these pores serve to establish spaces in the electrode material layer which relax the volume expansion upon the insertion of lithium (upon charging), resulting in an improvement in not only the battery capacity but also the charging and discharging cycle life.

For the thickness of the electrode material layer 102 in the electrode structural body, it is preferably in the range of 5 to 500 μm, more preferably in the range of 10 to 100 μm.

This layer thickness herein is based on the thickness value measured by a micrometer.

When the electrode material layer 102 is designed to have a thickness in the range of 5 to 500 μm, particularly in the range of 10 to 100 μm, the utilization efficiency as the electrode is increased, where a large battery capacity can be attained. In the case where the thickness of the electrode material layer is less than 5 μm, when the electrode structural body is used as the anode of a rechargeable lithium battery or a rechargeable zinc battery, the charge quantity per unit area of the anode is undesirably small and this situation makes the battery capacity to be small. On the other hand, when the thickness of the electrode material layer is beyond 500 μm, the active material such as lithium or the like is difficult to efficiently mobilize into the inside of the layer and therefore, the utilization efficiency is inferior. In addition to this, the electrode impedance is increased, resulting in deterioration in the battery performance.

For the electrode material layer 102 in the electrode structural body 10, it is desired to have a surface roughness preferably of 1 to 60 μm or more preferably of 5 to 30 μm in peak-to-valley elevation. The surface roughness value is based on the value measured by a stylus method in which a needle of 5 μm in diameter is swept on the irregular surface of an object at an interval of L=400 μm to obtain the maximum height value and the minimum height value and the minimum height value is subtracted from the maximum height value to obtain a surface roughness value of the irregular surface.

In the case where the electrode structural body is used as the anode of a rechargeable lithium battery or a rechargeable zinc battery, when the electrode material layer 102 is designed to have a surface roughness to fall in the above range, the utilization efficiency of the anode is improved, resulting in improving the battery capacity and prolonging the charging and discharging cycle life of the battery.

When the surface roughness is less than 1 μm, the anode's area to react with the active material such as lithium or the like is insufficient and therefore, the utilization efficiency is inferior. On the other hand, when the surface roughness is beyond 60 μm, electric field is liable to converge at protrusions, where uniform reaction with the active material such as lithium or the like does not take place in the anode and the charging and discharging cycle life of the battery will be shortened.

The formation of the electrode material layer 102 on the collector 100 using the electrically conductive auxiliary and the binder in addition to the grained host matrix material may be conducted, for example, in the following manner. A given grained host matrix material 101 for the electrode material layer 102 is mixed with any of the foregoing electrically conductive auxiliaries capable of assisting electron conduction among the constituent particles of the grained host matrix material or between the grained host matrix material and the collector and any of the foregoing organic polymers as the binder, followed by adding a solvent for the organic polymer whereby obtaining a paste-like mixture, the paste-like mixture is applied on a given plate-like shaped material as the collector, followed by drying. The application of the paste-like mixture on the collector in this case may be conducted by means of coater-coating or screen printing.

The formation of the electrode material layer 102 on the collector 100 may be conducted by press-molding a mixture composed of the above grained host matrix material, the above electrically conductive auxiliary and the above organic polymer as the binder without containing the solvent for the organic polymer or a mixture composed of the grained host matrix material and the electrically conductive auxiliary without containing the organic polymer as the binder on the collector.

Besides, the formation of the electrode material layer 102 on the collector 100 may be conducted by means of vapor phase deposition or plating.

The vapor phase deposition can include CVD (chemical vapor deposition), plasma CVD, resistance heating evaporation, electron beam evaporation, and sputtering. The plating can include electroplating utilizing electrochemical reaction, and electroless plating utilizing reduction reaction.

In any of the above described processes for the formation of the electrode material layer on the collector, by optimizing the related conditions, the grained host matrix material 101 to constitute the electrode material layer 102 on the collector 100 is made to have a specific average particle size in the range of 0.5 to 60 $\mu$m.

In the case where Sn, Sn-alloy, Si or Si-alloy is used as the host matrix material, there can be formed a desirable electrode material layer comprising a grained host matrix material having a desirably controlled particle size on a plate-like shaped collector, whereby a desirable electrode structural body can be obtained. When the electrode structural body is used as the anode in a rechargeable battery, especially in a rechargeable lithium battery, significant advantages with respect to the battery capacity, energy density, and charging and discharging cycle life are provided.

Now, it is known that when a tin metal or tin alloy is used as the anode of a rechargeable lithium battery, at most 4.4 lithium atoms are taken-in per one tin atom. The theoretical capacity per unit weight in this case is 790 Ah/Kg. Therefore, this capacity is theoretically more than two times 372 Ah/Kg for the theoretical capacity in the case where graphite is used.

In the present invention, by preparing an electrode material layer comprising particles of a metallic tin or tin alloy in optimized state, a theoretically very high battery capacity can be realized and other battery performances can be markedly improved.

In the following, typical embodiments in the case of using metallic tin and tin alloy which are particularly suitable as the host matrix material in the electrode structural body in the present invention will be detailed. In the following, items where description is made of the case of using metallic tin and tin alloy will be added with indication comprising an indication "Sn" and a numeral in a sequential order, i.e., "Sn-1", "Sn-2", "Sn-3", - - - .

(Sn-1) METALLIC TIN AND TIN ALLOY USED

In the case of using a Sn (tin)-containing grained material as the constituent of the grained host matrix material of the electrode material layer in the electrode structural body in the present invention, as the Sn (tin)-containing grained material, a grained material comprised of a metallic tin such as tin metal or a grained material of a tin alloy is used. The tin alloy can alloys of Sn and one or more elements selected from the group consisting of Sb, Bi, Pb, Ni, Cu, Ag and Zn. These tin alloys are desired to contain Sn preferably in an amount in the range of 50% to less than 100% or more preferably in an amount in the range of 70% to less than 100%. When the Sn content is less than 50%, a problem is liable to entail in that the amount of lithium to be taken-in is diminished to decrease the battery capacity.

(Sn-2) AVERAGE PARTICLE SIZE OF ELECTRODE MATERIAL LAYER

As previously described, the grained host matrix material to constitute the electrode material layer in the electrode structural body in the present invention is desired to comprises host matrix material particles having an average particle size in the range of 0.5 to 60 $\mu$m. In the present invention, by using a metallic tin (a tin metal) or any of the foregoing tin alloys (hereinafter referred to simply as tin alloy), a desirable layer comprising a grained host matrix material having an average particle size in the above range as the electrode material layer can be formed on a given plate-like shaped collector. In the case using such grained host matrix material (comprising host matrix material particles) of the metallic tin or tin alloy, the average particle size thereof is more preferred to be in the range of 5 to 50 $\mu$m.

In accordance with such electroplating manner as described in examples which will be later described, there were prepared a plurality of electrode structural bodies each having an electrode material layer comprising a grained host matrix material of a tin metal or tin alloy having a different average particle size. And there were prepared a plurality of rechargeable lithium batteries comprising one of these electrode structural bodies as an anode and a cathode containing lithium-manganese composite oxide. For each of these rechargeable lithium batteries, the interrelations between the average particle size of the grained host matrix material as the electrode material layer and battery performances, i.e., battery lifetime (charging and discharging cycle life) under condition of repeating the charging and discharging cycle and charge-and-discharge Coulomb efficiency were evaluated, wherein the battery performances of a rechargeable lithium battery of AA-size in which a tin metal foil is used as the anode and lithium-maganese composite oxide is used as the cathode were used as comparison reference standards. The evaluated results obtained are graphically shown in FIG. 5.

Figure 5:
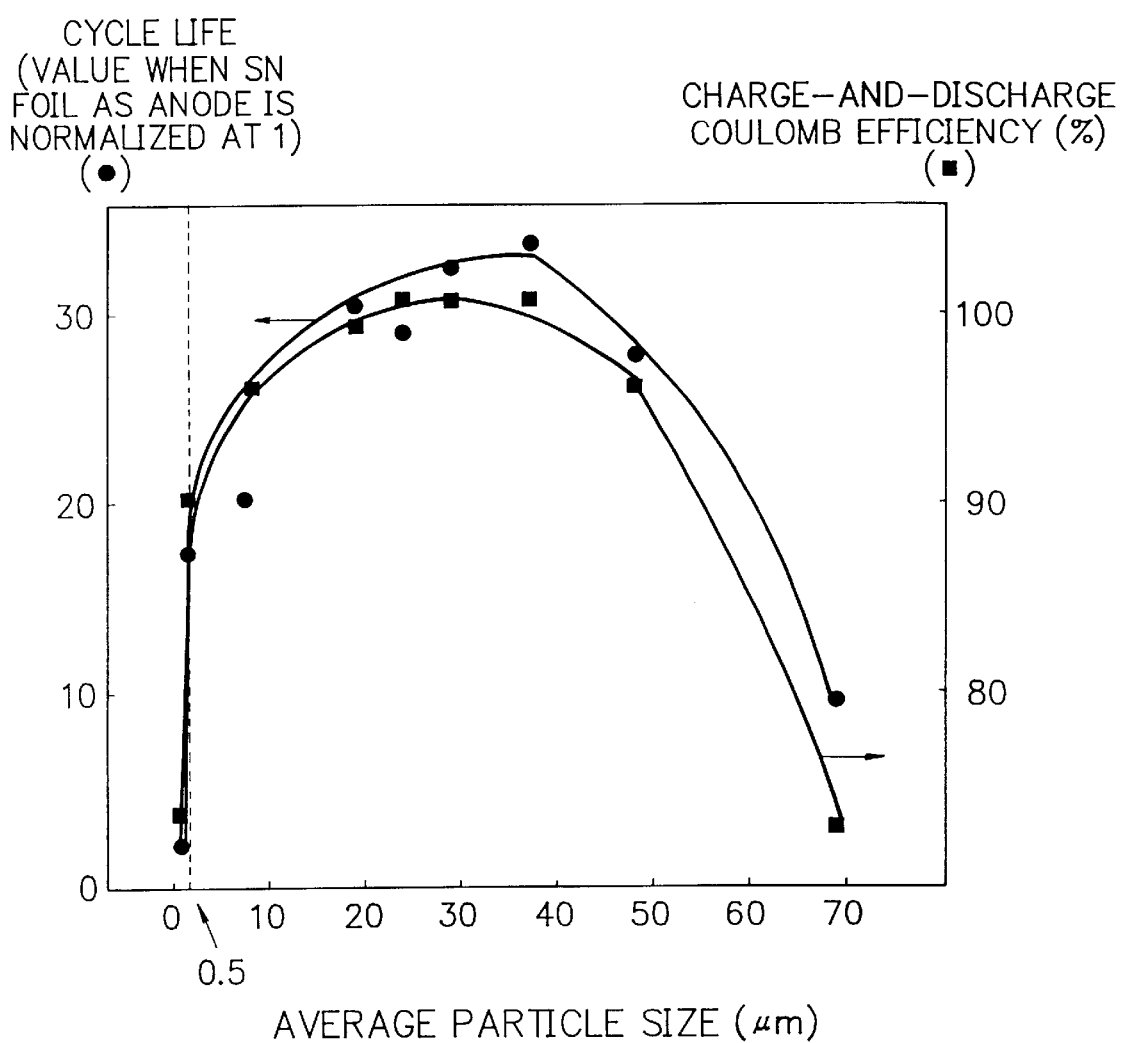
FIG. 5 is a graph showing interrelations among average particle sizes of grained host matrix materials of a metallic tin or tin alloy, lifetimes of rechargeable batteries in which these materials are used, and charge-and-discharge Coulomb efficiencies of said rechargeable batteries.

As FIG. 5 illustrates, it is understood that when the average particle size of the grained host matrix material as the electrode material layer is less than 0.5 $\mu$m, the charging and discharging cycle life is markedly diminished. For the reason for this, it is considered such that when the average particle size is excessively small, the bulk density of the Sn or Sn-alloy layer is increased so that the void rate in the electrode material layer is diminished and as a result, upon repeating the charging and discharging cycle, cracking is occurred in the electrode material layer to cause layer peeling at the interface between the electrode material layer and the collector. On the other hand, when the average particle size of the grained host matrix material as the electrode material layer is beyond 60 $\mu$m, it is understood that not only the charge-and-discharge Coulomb efficiency but also the charging and discharging cycle life are diminished. For the reason for this, it is considered such that when the average particle size of the grained host matrix material as the electrode material layer is excessively large, the electrode material layer has such surface roughness that is large in terms of peak-to-valley elevation and because of this, electric field is converged at the protrusions, resulting in generation or growth of a dendrite of lithium upon operating charging.

(Sn-3) CRYSTAL GRAIN MATERIAL

In the present invention, the grained host matrix material by which the electrode material layer is constituted, it may be a crystal grain material composed of crystallites of a metallic tin or tin alloy, having an average crystallite size preferably in the range of 10 to 50 nm or more preferably in the range of 10 to 30 nm under unused condition where neither charging nor discharging are operated.

The "crystallite size" herein is obtained based on a half band width of a peak and an angle of diffraction with respect to an X-ray diffraction curve obtained using alpha ($\alpha$) rays of CuK as the radiation source and in accordance with Scherrer's equation Lc=0.94 $\lambda/(\beta \cos \theta)$, with Lc being a crystallite size, $\lambda$ being a wavelength of X-ray beam, $\beta$ being a peak half band width, and $\theta$ being a diffraction angle.

In the case where the electrode material layer in the electrode structural body in the present invention is constituted by a host matrix material comprising such crystal grain material as above described, there are provided such advantages as will be described in the following when the electrode structural body is used as the anode in a rechargeable lithium battery or a rechargeable zinc battery. That is, the electrochemical reaction upon conducting the charging and discharging cycle smoothly proceeds, and the battery capacity is desirably improved. In addition, the electrode material layer is prevented from suffering from distortion which will be occurred upon insertion or release of lithium upon operating charging or discharging, resulting in prolonging the charging and discharging cycle life.

(Sn-4) DENSITY AND VOID RATIO OF ELECTRODE MATERIAL LAYER

For the electrode material layer comprising the foregoing host matrix material particles of the metallic tin or tin alloy, it is desired to be controlled to have an appropriate density preferably in the range of 1.00 to 6.56 g/cm$^3$ or more preferably in the range of 2.00 to 6.00 g/cm$^3$.

The density herein is a value obtained on the basis of the weight per unit area and the thickness of the electrode material layer.

Further, the electrode material layer is desired to be controlled to have an appropriate void ratios preferably in the range of 0.10 to 0.86 or more preferably in the range of 0.31 to 0.73.

The void ratios herein is a value obtained in the previously described manner using the equations (1) and (2).

Now, in accordance with such electroplating manner as described in examples which will be later described, there were prepared a plurality of electrode structural bodies of AA-size each having an electrode material layer comprising a grained host matrix material of a tin metal or tin alloy having a different void ratios by controlling related conditions in each case. And there were prepared a plurality of rechargeable lithium batteries comprising one of these electrode structural bodies as an anode and a cathode containing lithium manganate. For each of these rechargeable lithium batteries, the interrelations between the density and void ratios of the electrode material layer and battery performances, i.e., battery lifetime (charging and discharging cycle life) under condition of repeating the charging and discharging cycle and battery capacity were evaluated, where the battery performance of a rechargeable lithium battery of AA-size in which a tin metal foil is used as the anode and lithium manganate is used as the cathode were used as a comparison reference standard with respect to battery capacity.

In the above, the surface state of the electrode material layer in each battery at a stage after repeating the charging and discharging cycle three times was examined by means of a scanning electron microscope (SEM).

Figure 6:
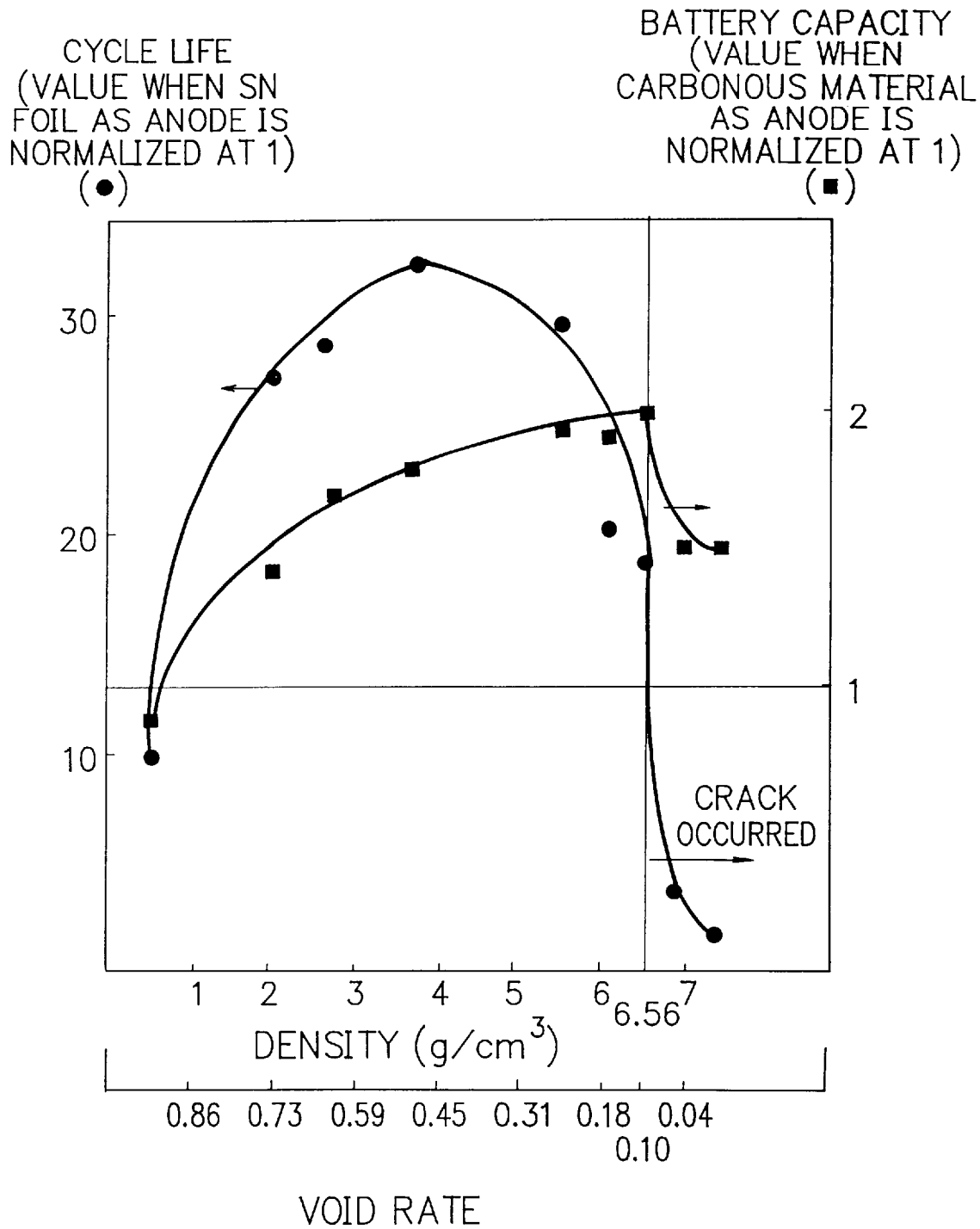
FIG. 6 is a graph showing interrelations among densities and void ratios of layers each comprising a grained tin host matrix material or the like, and lifetimes and battery capacities of rechargeable batteries each having an electrode structural body with one of said layers.

The evaluated results obtained are graphically shown in FIG. 6.

Based on the results shown in FIG. 6, the following facts are understood.

When the void ratios of the electrode material layer is less than 0.10 where the density of the layer is beyond 6.56 g/cm$^3$, cracking is occurred at the surface of the electrode material layer, and the battery lifetime is shortened.

When the void ratios the electrode material layer is beyond 0.86 where the density of the layer is less than 1.00 g/cm$^3$, the battery lifetime and battery capacity are similar to those of the comparative rechargeable lithium batteries.

When the void ratios of the electrode material layer is in the range of 0.31 to 0.73 where the bulk density of the layer is in the range of 2 to 6 g/cm$^3$, the battery lifetime and battery capacity are most excellent.

Based on the facts provided by FIG. 6, it is understood that by making the electrode material layer to have a density preferably in the range of 1.00 to 6.56 g/cm$^3$ or more preferably in the range of 2 to 6 g/cm$^3$ and a void ratios preferably in the range of 0.10 to 0.86 or more preferably in the range of 0.31 to 0.73, there can be attained a desirable rechargeable lithium battery which has a good enough or excellent battery capacity and a prolonged battery lifetime.

(Sn-5) PORES FORMED AT ELECTRODE MATERIAL LAYER

The surface of the electrode material layer comprising the foregoing host matrix material of the metallic tin or tin alloy in the electrode structural body is desired to be designed such that a plurality of pores preferably of 0.10 to 10 $\mu$m in diameter are formed after discharging. When such pores are formed at the surface of the electrode material layer of the electrode structural body after discharging, the area in the electrode material layer which reacts with lithium as the active material is increased at the time of successive charging, and these pores serve to establish spaces in the electrode material layer which relax the volume expansion upon the insertion of lithium (upon charging), resulting in an improvement in not only the battery capacity but also the charging and discharging cycle life.

(Sn-6) THICKNESS OF ELECTRODE MATERIAL LAYER

For the thickness of the electrode material layer comprising the foregoing host matrix material of the metallic tin or tin alloy in the electrode structural body, it is preferably in the range of 5 to 500 $\mu$m or more preferably in the range of 10 to 100 $\mu$m.

This layer thickness herein is based on the thickness value measured by a micrometer.

When the electrode material layer is designed to have a thickness in the range of 5 to 500 μm, particularly in the range of 10 to 100 μm, the utilization efficiency as the electrode is increased, where a large battery capacity can be attained. In the case where the thickness of the electrode material layer is less than 5 μm, when the electrode structural body is used as the anode of a rechargeable lithium battery, the charge quantity per unit area of the anode is undesirably small and this situation makes the battery capacity to be small. On the other hand, when the thickness of the electrode material layer is beyond 500 μm, lithium as the active material is difficult to efficiently mobilize into the inside of the layer and therefore, the utilization efficiency is inferior. In addition to this, the electrode impedance is increased, resulting in deterioration in the battery performance.

(Sn-7) SURFACE ROUGHNESS OF ELECTRODE MATERIAL LAYER

For the electrode material layer comprising the foregoing host matrix material of the metallic tin or tin alloy in the electrode structural body, it is desired to have a surface roughness preferably of 1 to 60 μm or more preferably of 5 to 30 μm in peak-to-valley elevation. The surface roughness value is based on the value measured by a stylus method in which a needle of 5 μm in diameter is swept on the irregular surface of an object at an interval of L=400 μm to obtain the maximum height value and the minimum height value and the minimum height value is subtracted from the maximum height value to obtain a surface roughness value of the irregular surface.

In the case where the electrode structural body is used as the anode of a rechargeable lithium battery, when the electrode material layer has a specific surface roughness in the above range, the utilization efficiency of the anode is improved, resulting in improving the battery capacity and prolonging the charging and discharging cycle life of the battery.

When the surface roughness is less than 1 μm, the anode's area to react with lithium as the active material is insufficient and therefore, the utilization efficiency is inferior. On the other hand, when the surface roughness is beyond 60 μm, electric field is liable to converge at protrusions, where uniform reaction with lithium as the active material does not take place in the anode and the charging and discharging cycle life of the battery will be shortened.

(Sn-8) COMPOSITION OF ELECTRODE MATERIAL LAYER

The electrode material layer comprising the foregoing host matrix material of the metallic tin or tin alloy in the electrode structural body may contain, besides the metallic tin or tin alloy components, one or more elements selected from the group consisting of C, N, O, F, and S. In this case, the electrode material layer is desired to contain one or more of these elements at a highest concentration in a layer region thereof on the surface side.

Of these elements, the oxygen (O) element is desired to be contained in a state that it is chemically bonded with the tin (Sn) element. In this case, it is most appropriate that the oxygen element in a state of tin oxide is present in the tin or tin alloy particle's surface.

The presence of these elements in the host matrix material of the metallic tin or tin alloy by which the electrode material layer is constituted may be analyzed by X-ray photoelectron spectroscopy (XPS). The composition ratio of these elements contained in the electrode material layer may be obtained based on the intensity ratio of a peak area of each element measured by XPS. For instance, with respect to Sn and C, their composition ratio may be obtained based on Sn 3d5/2 and C1s peak area and in accordance with the following equation.

$n(C)/n(Sn) = \{N(C) \cdot \sigma(Sn) \cdot \lambda(Sn) \cdot S(Sn)\} / \{N(C) \cdot \alpha(C) \cdot \lambda(C) \cdot S(C)\} = \{N(C)/N(Sn)\} \cdot K(Sn/C)$, with n being atomic number per unite volume, N being a measured value of a peak area of each element, σ being a photo-ionization cross section, λ being an electron's mean free path, S being a value with respect to a spectrograph's factor, and K being a sensitive coefficient.

In this measurement, calculation is conducted using the C. O. Wagner's element sensitivity coefficient.

For the content of each element in the electrode material layer, it may be obtained by a manner in which after the surface of the electrode material layer is cleaned by way of argon ion etching, followed by measurement, and it is obtained on the measured result. The bonded state of each element may be obtained based on the position of the corresponding peak.

(Sn-9) INCORPORATION OF ORGANIC COMPOUND OR/AND CARBON MATERIAL

The electrode material layer comprising the foregoing host matrix material of the metallic tin or tin alloy in the electrode structural body may contain, besides the tin or tin alloy components, an organic compound or/and a carbon material.

The organic compound can include the foregoing organic polymers usable as the binder. The organic compound serves as a cushioning in the electrode material layer. It also serves as an adhesive among the particles, where the volume of the electrode material layer is prevented from being changed.

The carbon material contained in the electrode material layer also serves as a cushioning in the electrode material layer as well as in the case of the organic compound, to prevent the volume of the electrode material layer from being changed.

(Sn-10) ORIENTATION OF CRYSTAL GRAIN MATERIAL

For the foregoing crystal grain material composed of crystallites of the metallic tin or tin alloy by which the electrode material layer is constituted, the orientation of the tin crystal lattice in the anode in unused state is desired to have a preferred orientation with respect to a given lattice plane, and have one to three oriented lattice planes. To have orientation herein means that in a X-ray diffraction peak obtained using alpha (α) rays of CuK as the radiation source, the lattice plane's intensity ratio is two times or more the non-oriented peak intensity ratio, where the number of lattice plane having such large peak intensity ratio is at most three.

Particularly, for the foregoing crystal grain material composed of crystallites of the metallic tin or tin alloy by which the electrode material layer is constituted, it is desired such that a first peak having the strongest peak intensity for the (200) plane ($2\theta=30.6°\pm1.0°$) in terms of the Miller index is observed, the ratio of the peak intensity of the first peak to a second peak is two or more; or a first peak having the strongest peak intensity for the (101) plane ($2\theta=32.0°\pm1.0°$) in terms of the Miller index is observed, the ratio of the peak intensity of the first peak to a second peak is two or more.

In the case where the electrode structural body having the electrode material layer comprised such crystal grain material is used as the anode of a rechargeable lithium battery, the battery has a prolonged charging and discharging cycle life. This is considered due to such factors that dispersion of lithium as the active material into the tin crystal lattices is smoothly conducted and as a result, the concentration distribution of lithium becomes uniform, resulting in preventing the volume of the crystal grain material from being changed and also preventing the crystal grain material from being distorted.

(Sn-11) FORMATION OF ELECTRODE MATERIAL LAYER

The electrode material layer comprising the foregoing host matrix material of the metallic tin or tin alloy in the present invention may be formed by way of deposition reaction utilizing electrochemical reaction (electroplating), deposition reaction utilizing reduction reaction (chemical plating), or vapor phase deposition. Besides, a manner of coating a paste comprising a given powdery material, a given organic polymer and a solvent is also usable. Of these manners, electroplating and chemical plating are more suitable for forming an electrode material layer having an average particle size and void ratio and density controlled as desired.

In the following, description will be made of each of the above described manners suitable for the formation of an electrode material layer in the present invention.

(Sn-11-i) ELECTROPLATING

Figure 7:
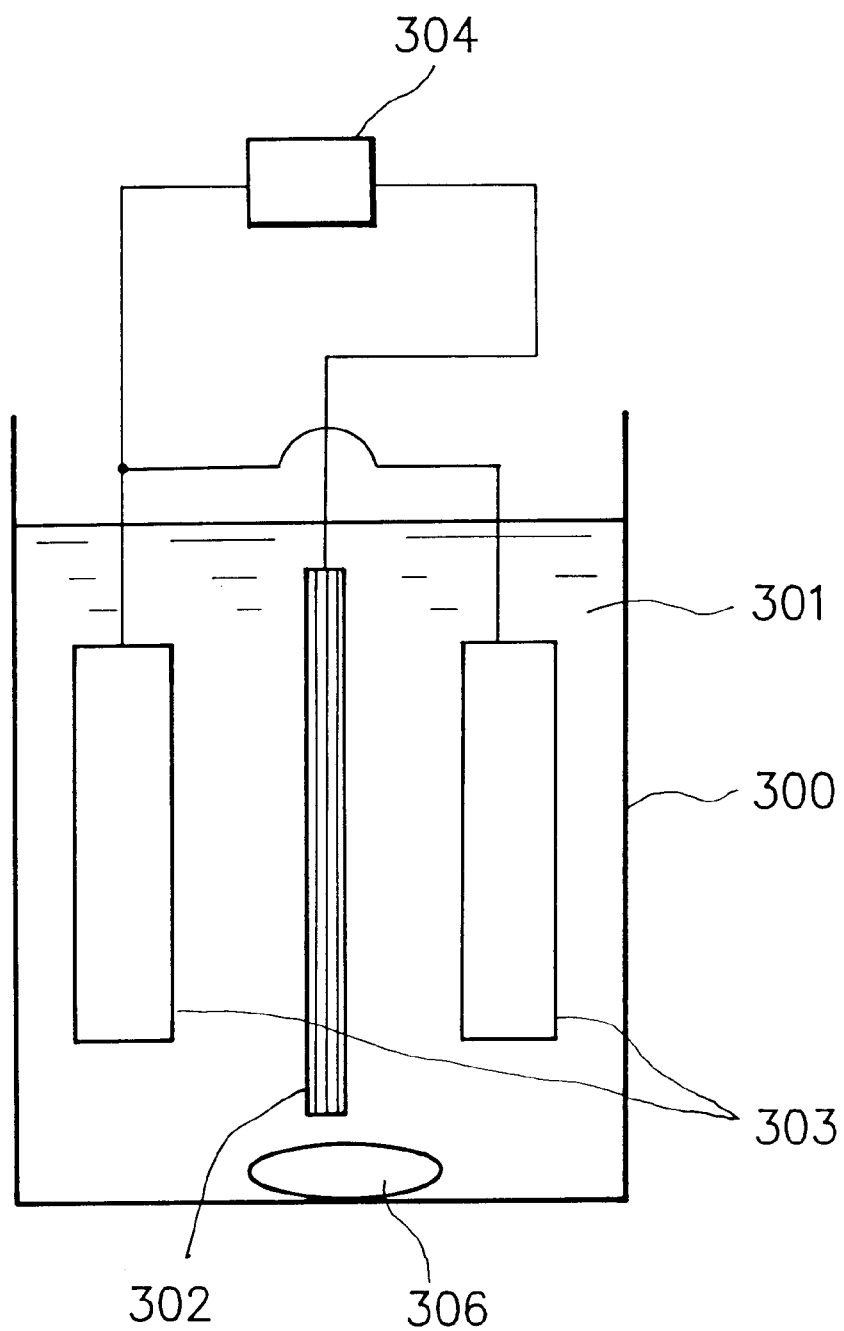
FIG. 7 is a schematic diagram illustrating an electroplating apparatus.

FIG. 7 is a schematic diagram illustrating an example of an electroplating apparatus suitable for forming an electrode material layer comprising a host matrix material of a metallic tin or tin alloy in the present invention.

The electroplating apparatus shown in FIG. 7 basically comprises an electrolysis vessel 300, an electrolyte solution 301, a cathode 302 comprising a plate-like shaped collector (which is corresponding to the collector 100 shown in FIG. 1) on which an electrode material layer comprising a host matrix material of a metallic tin or tin alloy in the present invention is to be formed, a counter electrode 303 (an anode), a power source 304, and an agitator 306.

In electroplating using the electroplating apparatus, using the power source 304, electric field of DC (direct current), electric field of AC (alternate current), electric field of pulse or a combination of two or more of these electric fields is applied between the collector 302 (as the cathode) and the counter electrode 303 (as the anode) in the electrolyte solution 301 contained in the electrolysis vessel 300 to treat a surface of the collector 302 whereby depositing a material to be plated on the surface of the collector. In this way, there can be formed a layer comprising host matrix material particles of Sn or Sn-alloy having an average particle size in the range of 0.1 to 60 $\mu$m, and which preferably has a density in the range of 1.00 to 6.56 g/cm$^3$.

By this electroplating, it is possible to form a layer comprising crystal grains having a complete grain size and orientation and which has a substantially uniform layer thickness for a relatively short period of time.

For a layer comprising a grained material of Sn or Sn-alloy deposited by the electroplating, its average particle size, layer density, void ratios, crystallite size, and presence or absence of orientation can be properly controlled by adjusting related parameters such as the kind of an electrolyte solution used, the content of Sn ion in the electrolyte solution, the kind and amount of a material to be added in the electrolyte solution, the temperature upon the plating treatment, the kind of the electric field applied, the current density at the cathode, and the voltage applied between the cathode and anode.

In the following, description will be made of the requirements in the electroplating using the electroplating apparatus shown in FIG. 7.

ELECTROLYTE SOLUTION 301:

As the electrolyte solution, it is desired to use an electrolyte solution containing at least Sn ion in an amount of 0.001 to 5 mol/L. Specific examples of such electrolyte solution are chloride solution, fluoride solution, sulfate solution, cyanide solution, pyrophosphate solution, perchloric acid solution, oxalate solution, potassium stannate solution, sodium stannate solution, and organic carboxylate solution, respectively containing Sn dissolved therein.

In the electrolyte solution, it is desired to disperse a substance composed of one or more elements selected from the group consisting of C, N, O, F, S and H. By dispersing such substance in the electrolyte solution, it is possible to eventually incorporate one or more of these elements into or among particles of Sn or Sn-alloy deposited upon the electroplating treatment.

The substance dispersed in the electrolyte solution can include organic compounds. Specific examples of such organic compound are amino acid series materials such as gelatin, glues, and proteins; and sugar materials such as glucose, fructose, saccharose, starch, dextrin, glycogen, molasses, licorice, and celluloses. Besides, cresolsulfonic acid, β-naphthol, formalin, hydroquinone, polyethylene glycol, and vinyl compounds are also usable.

It is possible that a monomer capable of causing electro-polymerization is dispersed in the electrolyte solution to take place polymerization reaction by way of electrochemical oxidation or reduction on the collector (the cathode) whereby incorporating the polymerized material in the particles of Sn or Sn-alloy. In the case of using a monomer capable of being polymerized on the reduction side, it is possible to incorporate the polymerized material into the particles of Sn or Sn-alloy simultaneously when they are deposited. In the case of using a monomer capable of being polymerized on the oxidation side, by using electric field of Ac or pulse, the polymerized material can be incorporated to the collector side.

The monomer capable of causing electrolytic oxidation polymerization can include aromatic compounds having an amino group or hydroxyl group-bearing benzene ring such as aniline and phenol; heterocyclic compounds such as pyrrole, furan, and thiophene; and polycyclic compounds having two or more condensed aromatic rings such as azulene and pyrene. Besides, dibenzocrown ethers and benzen are also usable.

The monomer capable of causing electrolytic reduction polymerization can include vinyl group-bearing compounds such as vinylpyridine, vinyl-4-tert-butylbenzoate, 4-vinyl-1-cyclohexane, 4-vinyl-1-cyclohexane-1,2-epoxide, vinyldecanoate, 2-vinyl-1,3-dioxolan, 1-vinylimidazole, vinyleodecanoate, 1-vinyl-2,2-pyrrolidinone, and vinyl stearate. Besides, acetylene and acetylene derivatives are also usable.

In the case where an organic compound containing O, S and N is incorporated into an layer comprising a host matrix material of Sn or Sn-alloy, when the layer is used as the anode in a rechargeable battery, the battery has an improved charge-and-discharge efficiency. For the reason for this, it is considered such that because these elements have electron attractive properties, upon charging, lithium (Li) is stabilized while preventing it from being reacted with an electrolyte solution of the battery.

Further, it is desired to disperse a carbon material in the electrolyte solution. In this case, it is possible for the carbon material to be incorporated into or among the particles of Sn or Sn-alloy during the electroplating treatment.

Besides, it is also desirable to disperse a surface active agent in the electrolyte solution. Particularly, when an appropriate cationic surface active agent is dispersed in the electrolyte solution, it is possible for the carbon material to be effectively incorporated into or among the particles of Sn or Sn-alloy during the electroplating treatment.

Specific examples of such cationic surface active agent are perfluorohexane, sodium decanate, sodium decyl sulfate, sodium decyl sulfonate, sodium dodecanate, copper dodecyl sulfate (II), sodium dodecyl sulfonate, and sodium hexadecyl sulfate.

For the temperature of the electrolyte solution upon the electroplating treatment, it is desired to be in the range of 0 to 85° C.

ANODE 303:

The anode 303 which serves as the counter electrode in the electrolytic reaction is desired to be constituted by a tin metal or tin alloy. For the area of the anode, it is desired to be preferably in the range of 0.1 to 1 or more preferably in the range of 0.5 to 1, respectively in terms of the ratio to the area of the cathode 302 (the collector).

For the distance between the anode 303 and the cathode 302, it is desired to be preferably in the range of 2 to 50 cm or more preferably in the range of 5 to 30 cm.

POWER SOURCE 304:

As the power source 304, it is desired to use a power source which can apply electric field of DC, electric field of AC, electric field of pulse or a combination of two or more of these electric fields between the anode 303 and the cathode 302 and can control the current density of the cathode in the range of 1 to 50 mA/cm$^2$. It is also desired for the power source to be capable of control the voltage applied between the anode and the cathode in the range of 0.05 to 10 V.

STIRRING:

By stirring the electrolyte solution 301 contained in the electrolysis vessel 300, there can be formed a layer comprising a host matrix material of Sn or Sn-alloy having a uniform thickness and which has few pinhole. To stir the electrolyte solution can be conducted by a mechanical manner or a manner by way of gas bubbling.

The mechanical stirring manner can include a manner conducting the stirring by using the agitator 305 and a manner of conducting the stirring by moving either the cathode or the anode.

The stirring manner by way of gas bubbling can be conducted by bubbling air, nitrogen gas, hydrogen gas, or argon gas in the electrolyte solution contained in the electrolysis vessel. Of these bubbling gases, nitrogen gas and argon gas are particularly appropriate since these gases can prevent the electrolyte solution from being oxidized.

(Sn-11-ii) CHEMICAL PLATING

It is possible to form a layer comprising host matrix material particles of Sn or Sn-alloy by way of deposition reaction (chemical plating) utilizing reduction reaction.

In the chemical plating, the collector as an object to be treated is treated in a chemical plating solution, whereby forming said layer on the collector.

A preferable example of the chemical plating is reduction type plating utilizing reduction deposition by means of a reducing agent. In the reduction type plating, plating of Sn is conducted by using a reducing agent comprising titanium trichloride, hypophosphite, or boron hydride, respectively having a strong reducing property. In this case, the above described layer can be formed on a plate-like shaped substrate made of Cu, Ni, Fe or stainless steel as the collector. And by adding a complexing agent comprising citric acid, EDTA, or nitrilotriacetic acid into the chemical plating solution, the chemical plating solution can be desirably stabilized.

As well as in the case of the above described electroplating, by dispersing a substance composed of one or more elements selected from the group consisting of C, N, O, F, S and H in the chemical plating solution, it is possible to eventually incorporate one or more of these elements into or among particles of Sn or Sn-alloy deposited upon the chemical plating treatment.

(Sn-11-iii) VAPOR PHASE DEPOSITION

It is possible to form a layer comprising host matrix material particles of Sn or Sn-alloy on a collector by way of CVD (chemical vapor deposition), plasma CVD, resistance heating evaporation, electron beam evaporation, or sputtering.

(Sn-11-iv) PASTE COATING MANNER

It is possible to form a layer comprising host matrix material particles of Sn or Sn-alloy on a collector by a manner of coating a paste obtained by converting particles of Sn or Sn-alloy having a desired average particle size into a paste on a collector. Particularly, for instance, at least particles of Sn or Sn-alloy having a desired average particle size, a given resin and a solvent capable dissolving said resin are mixed to obtain a paste, the paste is applied on a surface or opposite surfaces of a collector, followed by drying, whereby said layer can be formed on the collector.

(Sn-12) APPARATUS FOR PRODUCING AN ELECTRODE STRUCTURAL BODY

FIG. 8 is a schematic diagram of an example of an apparatus (system) suitable for the production an electrode structural body having an electrode material layer (comprising a grained host matrix material of Sn or Sn-alloy) according to the present invention.

The apparatus shown in FIG. 8 basically comprises a plating vessel 401, an oxide-removing vessel 402, a drier 403 (oven), and first and second rinsing vessels 404, and feed rollers 407. In this apparatus, a web-like collector 406 is continuously is moved in the respective vessels by means of the feed rollers 407 while being treated in each vessel, whereby an electrode material layer (comprising a grained host matrix material of Sn or Sn-alloy) according to the present invention is continuously formed on the collector 406.

It is desired for the plating vessel 401 to be provided with a liquid circulation device 405 for circulating a plating solution contained in the plating vessel 401 in order to remove precipitates and the like in the plating solution in the plating vessel 401.

The plating vessel 401 is also provided with counter electrodes 408 and a power source 409, where the counter electrodes 408 are electrically connected to the power source 409. The counter electrodes and power source in this case are substantially the same those used in the apparatus shown in FIG. 7.

In the plating vessel 401, the formation of the above electrode material layer on the collector 406 is conducted. After this, the collector 406 having the electrode material layer formed thereon is moved into the first rinsing vessel 404 to subject to rinsing with water, where the plating solution remained thereon is sufficiently removed. Then, the collector having the electrode material layer is moved into the oxide-removing vessel 402 containing an oxide-removing solution therein, where the surface of the electrode material layer is treated by the oxide-removing solution, whereby oxides present on the surface of the electrode material layer are removed. The oxide-removing solution can include acid aqueous solutions or alkaline aqueous solutions. A specific example of such oxide-removing solution is an aqueous solution of sodium tertiary phosphate.

After the treatment in the oxide-removing vessel 402, the collector having the electrode material layer is moved into the second rinsing vessel 404 to subject to rinsing with water, where the oxide-removing solution remained thereon is sufficiently removed. After this, the collector having the electrode material layer is moved into the drier 403, where it is subjected to drying treatment. The drying treatment is desired to be conducted in an atmosphere composed of gas incapable of causing oxidation such as argon gas or nitrogen gas or under reduced pressure condition, in order to prevent both the collector and the electrode material layer from being oxidized.

The apparatus shown in FIG. 8 may be provided with a compression means (not shown) for subjecting the electrode material layer formed on the collector. In this case, it is possible to uniform the thickness of the electrode material layer formed on the collector. It is also possible to properly control the density, void rate and surface roughness as desired.

(Sn-13) PERFORMANCE OF ELECTRODE MATERIAL LAYER (comprising tin or tin alloy as host matrix material)

When an electrode structural body having an electrode material layer comprising a grained host matrix material of Sn or Sn-alloy according to the present invention formed as above described is used as the anode in a rechargeable battery, especially in a rechargeable lithium batter, even after the initial repetition of the charging and discharging cycle, i.e., the charge and discharge reaction cycle of 1 to 3 times, no cracking is occurred at the electrode material layer.

The "cracking" herein means a turtle shell-like shaped crack of 1 $\mu$m or more in groove width which is found in the observation of the layer surface by means of a scanning electron microscope (SEM).

FIGS. 9(a) through 9(d) are schematic views illustrating assumed mechanisms when cracking is not occurred and when it is occurred at the electrode material layer in the electrode structural body (as the anode).

In FIGS. 9(a) through 9(d), reference numeral 10 indicates an electrode structural body whose structure being basically the same as that of the electrode structural body shown in FIG. 1. Reference numeral 102 indicates an electrode material layer comprising host matrix material particles 101 of Sn or Sn-alloy formed on a collector 100.

In FIGS. 9(a) through 9(d), it should be understood the electrode structural body 10 as the anode in the rechargeable lithium battery as above described is positioned to oppose the cathode (not shown) in which lithium is intercalated.

FIGS. 9(a) and 9(b) are of an example when the host matrix material particles 101 are of a relatively large average particle size and they are packed in the electrode material layer 102 to have relatively large void regions 111 at an optimized void ratios.

FIGS. 9(c) and 9(d) are of an example when the host matrix material particles 101 are of a relatively small average particle size and they are densely packed in the electrode material layer 102 to have very small void regions 112 at a very small void ratios.

Each of FIGS. 9(a) and 9(c) is of a state prior to charging. Each of FIGS. 9(b) and 9(d) is of a state after charging has been operated.

Upon charging, lithium ion contained in the electrolyte or electrolyte solution is inserted into the particles 101 in the electrode material layer 102, where the particles 101 are volume-expanded to result in enlarging the volume of the electrode material layer 102.

In the case of FIG. 9(a), the volume changes of the particles 101 due to the charging are sufficiently relaxed by the void regions 111, where the distortion of the electrode material layer 102 as a whole is desirably diminished and because of this, no cracking is occurred [see, FIG. 9(b)].

On this other hand, in the case of FIG. 9(c), as above described, the particles 101 are densely packed in the electrode material layer 102 to have very small void regions 112 at a very small void ratios. Because of this, when the particles 101 are volume-expanded due to the charging, the electrode material layer 102 is eventually distorted to cause cracking 112 in the electrode material layer 102 [see FIG. 9(d)]. When such cracking is occurred, there are entailed problems such that the electrode material layer 102 is peeled off from the collector 100, and the electrode material layer is finely pulverized when the charging and discharging cycle is repeated, where the impedance of the electrode structural body as the anode is increased to result in shortening the charging and discharging cycle life.

Now, the electrode material layer in the electrode structural body according to the present invention may be designed to have a two-layered structure.

For instance, on an electrode material layer (comprising 35% by weight or more of a grained host matrix material (host matrix material particles) having an average particle size in the range of 0.5 to 60 $\mu$m as a first layer which is formed on a surface or opposite surfaces of plate-like shaped collector, a second layer comprising 80 to 98% by weight of an inorganic material and 2 to 20% by weight of an organic polymer is provided.

FIG. 10 is a schematic cross-sectional view illustrating an electrode structural body (11) having such two-layered structure as above described.

Particularly, the electrode structural body 11 shown in FIG. 10 comprises a first layer 102' and a second layer 112 stacked in this order on a plate-like shaped collector 100, wherein said first layer 102' is of the constitution similar to that of the electrode material layer (102) shown in FIG. 1 but specifically, it comprises 35% by weight of more of the grained host matrix material 101 (host matrix material particles) of 0.5 to 60 $\mu$m in average particle size, and said second layer 112 comprises an inorganic material 113 (in an amount of 80 to 98% by weight) and an organic polymer 114 (in an amount of 2 to 20% by weight).

In a preferred embodiment of the electrode structural body 11, the specific resistance of the grained host matrix material 101 in the first layer 102' when it is in a bulk state at 20° C. is made to be greater than that of the constituent of the collector 100, and the specific resistance of the inorganic material 113 in the second layer 112 when it is in a bulk state at 20° C. is made to be greater than the above specific resistance of the grained host matrix material 101 in the first layer 102'.

In a particularly preferred embodiment, in the case of using the electrode structural body 11 as the anode in a rechargeable battery, when the electrode structural body is in an initial state or in a state of having been substantially subjected to discharging (specifically, in a state that more than 95% of the quantity of electricity with respect to the capacity has been discharged), the first layer 102' and the second layer 112 are designed so that the above relationships with respect to specific resistance can be established. In this case, when the electrode structural body 11 is used as the anode in a rechargeable lithium battery (in which the anode active material is lithium) or a rechargeable zinc battery (in which the anode active material is zinc), upon charging, lithium ion or zinc ion as the anode active material which penetrates the second layer 112 is reduced to deposit in the first layer 102' situated near the collector 100, and since the second layer 112 is high in terms of the specific resistance, no deposition of lithium or zinc is occurred in the second layer 112 until the active material-retaining capacity of the first layer 102' is exceeded.

On the other hand, in the case where the specific resistance of the second layer 112 is relatively low, there is considered such possibility that upon charging, the anode active material is deposited in the first layer 102', followed by arriving in the second layer 112 wherein it starts depositing; and when the charging and discharging cycle is further repeated, the anode active material deposited in the second layer 112 upon charging is grown into a dendrite, where internal-shorts will be occurred between the anode and cathode depending upon the related conditions.

However, the electrode structural body configured as above described is free of such possibility as above described. Particularly, when the electrode structural body is used as the anode in the rechargeable lithium battery or the rechargeable zinc battery, the generation or growth of a dendrite of the anode active material upon charging is effectively prevented. And the anode active material is effectively retained in the first layer 102' upon charging and it is effectively released from the first layer 102' upon discharging, and even when the first layer 102' should be suffered from certain fracture due to the fatigue caused as a result of repetition of volume expansion and contraction thereof upon the repetition of the charging and discharging cycle, the second layer 112 serves to prevent the first layer 102' from being peeled off. This situation results in prolonging the charging and discharging cycle life of the battery. Hence, there can be realized a desirable rechargeable lithium battery and a desirable rechargeable zinc battery respectively having a prolonged charging and discharging cycle life.

As above described, the electrode structural body 11 the two-layered structure comprising the first layer 102' and the second layer 112 stacked in this order on the plate-like shaped collector 100 is characterized in that the fist layer 102' comprises 35% by weight or more of the grained host matrix material 101 (host matrix material particles) of 0.5 to 60 µm in average particle size, and the second layer 112 comprises the inorganic material 113 in an amount of 80 to 98% by weight and the organic polymer 114 in an amount of 2 to 20% by weight. The electrode structural body has such advantages as above described. That is, when used as the anode in a rechargeable battery (a rechargeable lithium battery or a rechargeable zinc battery), the electrode structural body as the anode desirably follows its repeated expansion and contraction upon the repetition of the charging and discharging cycle, and the second layer 112 always protects the first layer 102' without being destroyed even when the charging and discharging cycle is continuously repeated over a long period of time.

For the inorganic material 113 in the second layer 112, its specific resistance in a bulk state at 20° C. is desired to be preferably in the range of $1\times10^{-4}$ to $1\times10^{2}$ Ω·cm or more preferably in the range of $1\times10^{-4}$ to $1\times10^{1}$ Ω·cm.

Taking into consideration the preferable range of the specific resistance (the electric resistivity) [$1\times10^{-6}$ to $1\times10^{0}$ Ω·cm in a bulk state at 20° C.] of the grained host matrix material 101 in the first layer 102', by increasing the specific resistance of the second layer 112 to be greater than that of the first layer 102', the active material can be effectively prevented from being deposited on the surface of the second layer upon charging.

For the thickness of the second layer 112, it is desired to be in the range of 1 to 30 µm. In this case, irregularities present in the surface of the first layer 102' are desirably covered by the second layer 112. In addition, it is ensured that the anode active material in a large amount is retained in the first layer 102' upon charging. This situation enables to produce a rechargeable battery (a rechargeable lithium battery or a rechargeable zinc battery) having a large battery capacity per unit volume. In order to more increase the battery capacity, it is desired for the thickness of the second layer to be preferably in the range of 5 to 20 µm.

For the above described electrode structural body, in the case where it is used as the anode in either a rechargeable lithium battery or a rechargeable zinc battery, especially before charging, it is preferred that the specific resistance of the layer 102' is 10 times or more that of the constituent of the collector 100 and that the specific resistance of the second layer 112 is 10 times or more that of the first layer 102'. By this, the generation of a dendrite of lithium or zinc is desirably prevented even upon repeating the charging and discharging cycle over a long period of time, resulting in prolonging the charging and discharging cycle life of the battery.

Specific examples of the inorganic material 113 in the second layer 112 are carbonous materials including amorphous carbon and graphite, metal oxides, metal borates, metal nitrides, metal carbides, and mixtures of these materials. Specific examples of such metal oxide are indium oxide, tin oxide, zinc oxide, and mixtures of these.

Specific examples of the organic polymer 114 are polyolefins such as polyethylene and polypropylene, fluororesins such as polyvinylidene fluoride and tetrafluoroethylene polymer, and celluloses.

The formation of the second layer 112 may be conducted, for example, in the following manner. A mixture composed of any of the foregoing inorganic materials in an amount of 80 to 98% by weight and any of the foregoing organic polymers (capable of serving as a binder) in an amount of 2 to 20% by weight was mixed with a solvent for the organic polymer to obtain a paste-like mixture. The paste-like mixture in a desired amount is applied onto the first layer 102' previously formed on the collector 100 in accordance with the previously described manner for the formation of the electrode material layer, followed by drying, whereby a layer as the second layer 112 is formed. Besides, the formation of the second layer 112 may be also conducted in the following manner without using the solvent. That is, such mixture as used in the above is compression-molded on the first layer 102' to form a layer as the second layer 112.

Using any of the foregoing electrode structural bodies above described as an electrode, there can be obtained a desirable rechargeable battery. Particularly, by using the electrode structural body as the anode in a rechargeable battery having a high energy density in which an active material such as lithium or zinc which is liable to deposit in a dendritic state upon charging, e.g., a rechargeable lithium battery or a rechargeable zinc battery, the lifetime (the charging and discharging cycle life) of the battery can be desirably prolonged.

In the following, description will be made of an example of the constitution of a rechargeable battery according to the present invention with reference to FIG. 11.

Figure 11:
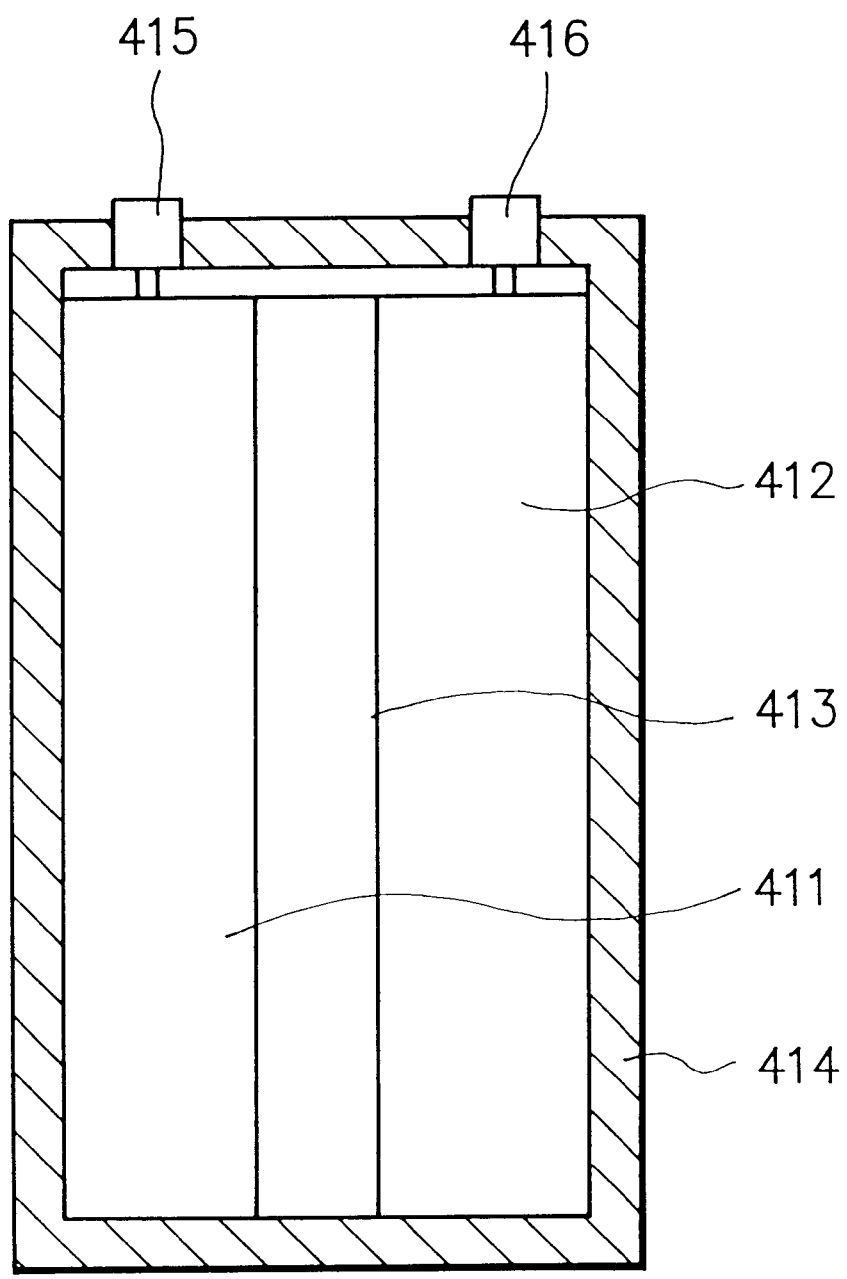
FIG. 11 is a schematic cross-sectional view illustrating a basic constitution of an example of a rechargeable battery according to the present invention.

FIG. 11 is a schematic cross-sectional view illustrating a basic constitution of an example of a rechargeable battery (a rechargeable lithium battery or a rechargeable zinc battery) according to the present invention.

In the battery shown in FIG. 11, an assembled body comprising a separator 413 (including an electrolyte or an electrolyte solution) interposed between an anode 411 (comprising the electrode structural body according to the present invention shown in FIG. 1 or FIG. 10) and a cathode 412 is enclosed by a battery housing 414 (or a battery vessel).

In the case where a solid electrolyte is used as the electrolyte, no separator is occasionally installed.

Reference numeral 415 indicates a negative terminal (a negative outputting and inputting terminal) which is provided at the capping of the battery housing while electrically connecting to the anode 411 through a lead, and reference numeral 416 indicates a positive terminal (a positive outputting and inputting terminal) which is provided at the capping of the battery housing while electrically connecting to the cathode 412 through a lead.

In the following, description will be made of each of the battery components (excluding the anode 411) in each of the rechargeable lithium battery and the rechargeable zinc battery.

CATHODE

The cathode (412) generally comprises a cathode collector, a cathode active material, an electrically conductive auxiliary, and a binder.

The cathode is usually formed by disposing a mixture composed of a cathode active material, an electrically conductive auxiliary and a binder on a member capable of serving as a cathode collector.

The electrically conductive auxiliary can include graphite, carbon blacks such as ketjen black and acetylene black, and metal fine powders of nickel or the like.

As the binder in the case of using a non-aqueous series electrolyte solution as in the case of a rechargeable lithium battery, there can be illustrated polyolefines such as polyethylene, polypropylene, and the like, and fluororesins such as polyvinylidene fluoride, tetrafluoroethylene polymer, and the like. In the case of using an aqueous series electrolyte solution as in the case of a rechargeable zinc battery, the binder can include celulloses such as carboxymethylcellulose, polyvinyl alcohol, and polyvinyl chloride.

As the cathode active material in the case of a rechargeable lithium battery, there is usually used a compound selected from transition metal oxides, transition metal sulfides, lithium-transition metal composite oxides, and lithium-transition metal composite sulfides. The metals of these transition metal oxides and transition metal sulfides can include metals partially having a d-shell or f-shell. Specific examples of such metal are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au. Of these, Ti, V, Cr, Mn, Fe, Co, Ni and Cu are the most appropriate.

As the cathode active material in the case of a rechargeable nickel-zinc battery, there is usually used nickel oxyhydroxide or nickel hydroxide.

As the cathode active material in the case of a rechargeable zinc-oxide battery which comprises a cathode collector, a catalyst, and a water repellent, there is used oxygen. This oxygen is usually supplied from the air. As the catalyst in this case, there is usually used porous carbon material, porous nickel material, copper oxide, or nickel oxide. The water repellent can include fluororesins such as porous tetrafluoroethylene polymer and porous polyvinylidene fluoride.

As the cathode active material in the case of a rechargeable bromine-zinc battery, there is used bromine.

The cathode collector (not shown in FIG. 11) serves to supply an electric current so that it can be efficiently consumed for the electrode reaction upon charging or to collect an electric current generated upon discharging.

The cathode collector is therefore desired to be constituted by a material which is highly electrically conductive and is inactive to the battery reaction.

Specific examples of such material are metals such as Ni, Fe, Ti, Al, Pt, Au, and Pb; alloys of these metals such as stainless steel; and metal composites of two or more of said metals.

In the case where the cathode collector is for a rechargeable zinc battery, when it is intended to use Al, it is necessary to be used by covering by other metal or converting it into an alloy because the Al is dissolved in an alkaline electrolyte solution.

The cathode collector may be shaped in a plate-like form, foil-like form, mesh form, porous form-like sponge, fibrous form, punching metal form, or expanded metal form.

SEPARATOR

The separator (413) is interposed between the anode and the cathode, and it serves to prevent the anode and the cathode from suffering from internal-shorts. In addition, the separator also serves to retain an electrolyte solution.

The separator is required to have a porous structure capable of allowing lithium ions, hydronium ions, hydroxyl ions, or the like involved in the charge and discharge reaction in the rechargeable battery to pass therethrough, and it is also required to be insoluble into and stable to the electrolyte solution.

The separator is usually constituted by a nonwoven fabric or a memberane having a micropore structure made of glass, polyolefin such as polypropylene or polyethylene, fluororesin, or polyamide. Alternatively, the separator may be constituted by a metal oxide film or a resin film combined with a metal oxide respectively having a number of micropores.

Particularly when the separator is constituted by a multilayered metal oxide film, the separator effectively prevents a dendrite from passing therethrough and because of this, the occurrence of internal-shorts between the anode and the cathode is desirably prevented. Further, in the case where the separator is constituted by an incombustible member such as a fluororesin film, glass or metal oxide film, an improvement can be attained in terms of the safety even in the case where such internal-shorts as described in the above should be unexpectedly occurred.

ELECTROLYTE

As the electrolyte (which is included in the collector 413 in FIG. 11), there can be used an appropriate electrolyte as it is, a solution of said electrolyte dissolved in a solvent, or a material of said solution having solidified using a gelling agent. However, an electrolyte solution obtained by dissolving an appropriate electrolyte in an solvent is usually used in such a way that said electrolyte solution is retained on the separator.

The higher the ion conductivity of the electrolyte, the better. Particularly, it is desired to use such an electrolyte that the ion conductivity at 25° C. is preferably $1 \times 10^{-3}$ S/cm or more or more preferably, $5 \times 10^{-3}$ S/cm or more.

As the electrolyte in the case of a rechargeable lithium battery, there is usually used a given electrolyte dissolved in a given solvent. The electrolyte herein can include inorganic acids such as $H_2SO_4$, HCl and $HNO_3$; salts of $Li^-$ (lithium ion) with Lewis acid ion such as $BF_4^-$, $PF_6^-$, $ClO_4^-$, $CF_3SO_3^-$, or $BPh_4^-$ (with Ph being a phenyl group); and mixtures of two or more of said salts. Besides these, salts of the above described Lewis acids ions with cations such as sodium ion, potassium ion, tetraalkylammonium ion, or the like are also usable.

In any case, it is desired that the above salts are used after they are subjected to dehydration or deoxygenation, for example, by way of heat treatment under reduced pressure.

The solvent in which the electrolyte is dissolved can include acetonitrile, benzonitrile, propylene carbonate, ethylene carbonate, dimethyl carbonate, diethyl carbonate, dimethylformamide, tetrahydrofuran, nitrobenzene, dimethyl sulfide, dimethyl sulfoxide, methyl formate, 3-methyl-2-oxdazolydinone, 2-methyltetrahydrofuran, 3-propylsydonone, sulfur dioxide, phosphonyl chloride, thionyl chloride, sulfuly chloride, and mixtures of two or more of these. As for these solvents, it is desired for them to be subjected to dehydration using activated alumina, molecular sieve, phosphorous pentaoxide, or calcium chloride, prior to their use. Alternatively, it is possible for them to be subjected to distillation in an atmosphere composed of inert gas in the presence of an alkali metal, wherein moisture and foreign matters are removed.

In order to prevent leakage of the electrolyte solution, it is desired for the electrolyte solution to be gelated using an appropriate gelling agent. The gelling agent usable in this case can include polymers having a property such that it absorbs the solvent of the electrolyte solution to swell. Specific examples of such polymer are polyethylene oxide, polyvinyl alcohol, and polyacrylamide. Besides, starch is also usable.

As the electrolyte in the case of a nickel-zinc battery in which the anode active material is zinc or a rechargeable zinc-oxygen battery in which the anode active material is zinc, there is used an electrolyte comprising an alkali such as potassium hydroxide, sodium hydroxide, or lithium hydroxide dissolved in water as a solvent.

As the electrolyte in the case of a rechargeable bromine-zinc battery in which the anode active material is zinc, there is used an electrolyte comprising a salt such as zinc bromide dissolved in water as a solvent.

For the electrolyte solution used in these rechargeable zinc series batteries, in order to prevent leakage thereof, it is desired to be gelated using any of the gelling agents illustrate in the case of the rechargeable lithium battery.

SHAPE AND STRUCTURE OF RECHARGEABLE BATTERY

There is no particular limitation for the shape of the rechargeable battery according to the present invention.

For the shape of the rechargeable battery, it may be in the form of a flat round shape (or a coin-like shape), a cylindrical shape, a prismatic shape, or a sheet-like shape.

For the battery structure, it includes a single-layered type, a multi-layered type and a spiral-wound type.

In the case of a spiral-wound cylindrical rechargeable battery comprising an assembled body (comprising a separator interposed between an anode and a cathode) wound in multiple about a given axis, it has advantages such that the battery area can be increased as desired and a high electric current can be flown upon operating charging and discharging.

In the case of a rechargeable battery in either a prismatic shape or sheet-like shape, it has an advantage such that the space of an instrument for housing the battery can be effectively utilized.

In the following, description in more detail will be made of the shape and structure of such a battery as above described with reference to FIGS. 12, 13 and 14.

FIG. 12 is a schematic cross-sectional view illustrating an example of a single-layer structure type flat battery. FIG. 13 is a schematic cross-sectional view illustrating an example of a spiral-wound cylindrical battery.

FIG. 14 is a schematic perspective view illustrating an example of a prismatic battery. These batteries basically have a constitution similar to that of the battery shown in FIG. 11, and they comprise a anode, a cathode, a separator including an electrolyte (or an electrolyte solution), a battery housing and a pair of terminals.

In FIG. 12, reference numeral 501 indicates an anode (comprising an anode material layer), reference numeral 503 a cathode (comprising a cathode material layer), reference numeral 505 an anode cap (or an anode terminal), reference numeral 506 a cathode can (or a cathode terminal), reference numeral 507 a separator with an electrolyte (or an electrolyte solution) retained therein, and reference numeral 510 a gasket (or an insulating packing).

Figure 13:
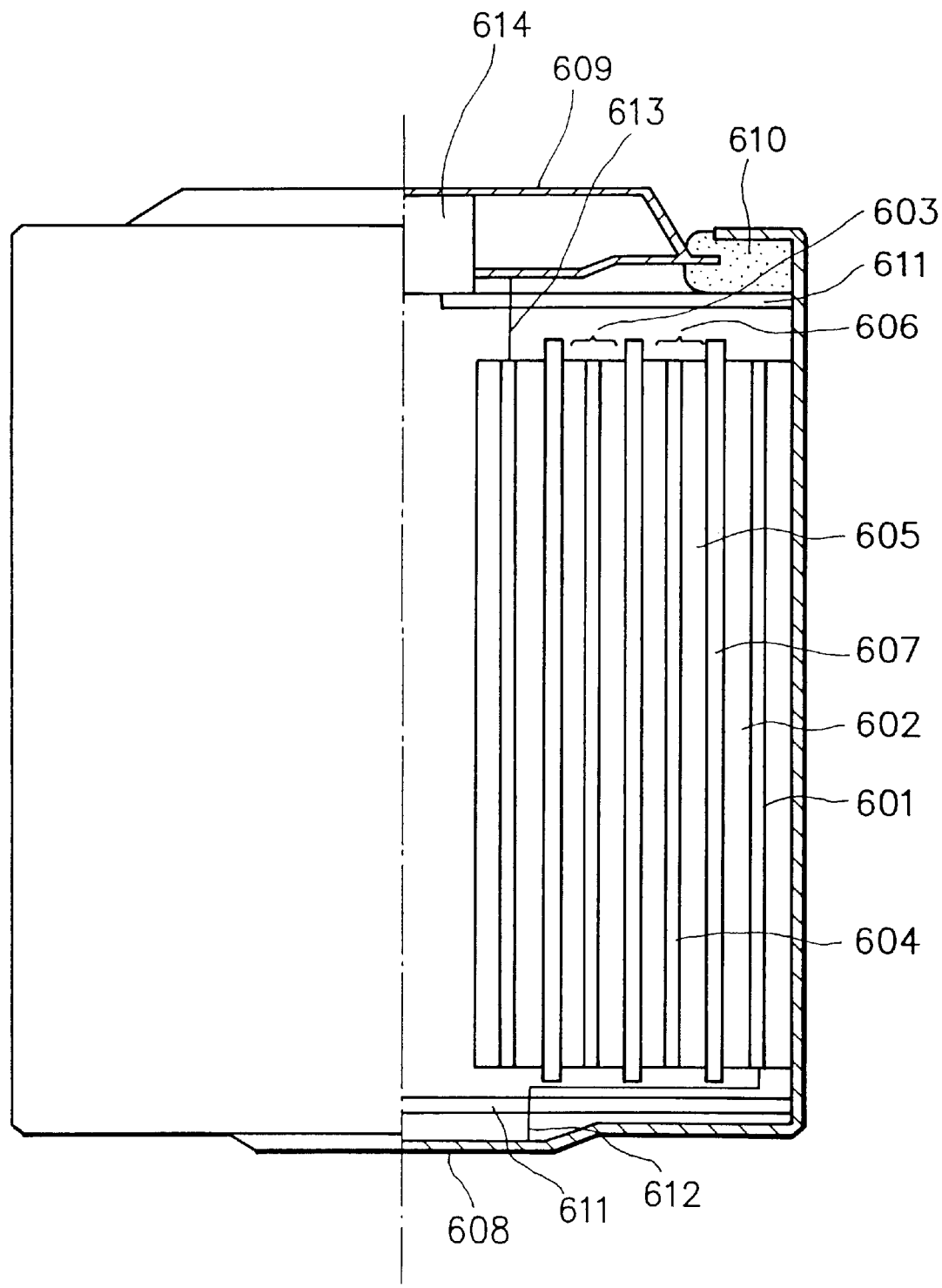
FIG. 13 is a schematic cross-sectional view illustrating a spiral-wound cylindrical battery according to the present invention.

In FIG. 13, reference numeral 601 indicates an anode collector, reference numeral 602 an anode material layer, reference 603 an anode, reference numerals 604 a cathode collector, reference numeral 605 a cathode material layer, reference numeral a cathode collector, reference numeral 606 a cathode, reference numeral 607 a separator with an electrolyte (or an electrolyte solution) retained therein, reference numeral 608 an anode can (or an anode terminal), reference numeral 609 a cathode cap (or a cathode terminal), reference numeral 610 a gasket (or an insulating packing), reference numeral 611 an insulating plate, reference numeral 612 an anode lead, reference numeral 613 a cathode lead, and reference 614 a safety vent.

Particularly, in the single-layer structure type flat battery (the so-called coin-like shaped battery) shown in FIG. 12, an assembly comprising the cathode 503 (comprising the cathode material layer) and the anode 501 (comprising the anode material layer) stacked in this order from the cathode side through at least the separator 507 having an electrolyte solution retained therein is housed in the cathode can 506. The anode side of the assembly in the cathode can 506 is sealed by the anode cap 505 as the anode terminal and the residual inside space of the cathode can 506 is packed by the gasket 510 (comprising an insulating material).

In the spiral-wound cylindrical battery shown in FIG. 13, an assembly wound in multiple about a given axis is housed in the anode can 608 as the anode terminal such that the side face and a given bottom face side of the assembly are covered by the anode can 608, said assembly comprising the separator 607 having at least an electrolyte solution retained therein interposed between the cathode 606 having the cathode material layer 605 formed on the cathode collector 604 and the anode 603 having the anode material layer 602 formed on the anode collector 601. In the uncovered side of the anode can 608, the cathode cap 609 as the cathode terminal is installed. The residual inside space of the anode can 608 is packed by the gasket 610 (comprising an insulating material). The stacked electrode assembly having the cylindrical structure is electrically isolated from the cathode cap side through the insulating plate 611. The cathode 606 is electrically connected to the cathode cap 609 by means of the cathode lead 613. Similarly, the anode 603 is electrically connected to the anode can 608 by means of the anode lead 612. On the cathode cap side, there is provided the safety vent 614 for adjusting the internal pressure of the battery.

The prismatic battery shown in FIG. 14 comprises a plurality of unit cells integrated in parallel connection through a collector 700 in a battery housing 709 having a capping, wherein each unit cell comprises a separator 707 having an electrolyte solution retained therein interposed between an anode 701 comprising an anode material layer and a cathode 703 comprising a cathode material layer. The anode 701 is electrically connected to an anode terminal 705, and the cathode 703 is electrically connected to a cathode terminal 706. The prismatic battery is provided with a plurality of safety vents 714 at the capping of the battery housing 709.

A battery having the configuration shown in FIG. 12 or FIG. 13 may be fabricated, for example, in the following manner.

An assembly comprising the separator (507, 607) interposed between the anode material layer (501, 601) and the cathode material layer (503, 603) is positioned in the cathode can (506) or the anode can (608). Thereafter, the electrolyte is introduced thereinto. The resultant is assembled with the anode cap (505) or the cathode cap (609) and the gasket (510, 610), followed by subjecting to caulking treatment. Thus, there is obtained a battery having the configuration shown in FIG. 12 or FIG. 13.

In the case of the rechargeable lithium batter, the preparation of the components thereof and the fabrication thereof are desired to be conducted in a dry air atmosphere free of moisture or a dry inert gas atmosphere free of moisture in order to prevent the occurrence of chemical reaction of lithium with water and also in order to prevent the rechargeable lithium battery from being deteriorated due to chemical reaction of lithium with moisture in the inside of the battery.

A prismatic battery having the configuration shown in FIG. 14 may be fabricated, for example, in the following manner.

A plurality of unit cells each comprising the separator 707 sandwiched between the anode 701 and the cathode 703 are integrated in parallel connection through the collector 700 into an assembled body. The assembled body is positioned in the battery housing 709. Thereafter, an electrolyte solution is injected into in the battery housing 709. Then, the collector 700 is electrically connected to the anode terminal 705 and also to the cathode terminal 706. Finally, the capping is put to the battery hosing 709 to seal the inside of the battery housing. By this, there is obtained a prismatic battery having the configuration shown in FIG. 14.

In the following, description will be made of the constituent components (other than those already explained) of the above-described batteries according to the present invention.

GASKET

As the constituent of the gasket (510, 610), there can be used, for example, polyolefin resins, fluororesins, polyamide resins, polysulfone resins, and various rubbers.

The battery sealing is typically conducted by way of caulking with the use of the gasket in the case of the configuration as shown in FIG. 12 or 13. Besides this, it may be conducted by means of glass sealing, adhesive sealing, welding or soldering.

Separately, as the constituent of the insulating plate (611) shown in FIG. 13, there can be used organic resins and ceramics.

BATTERY HOUSING, ANODE CAN, CATHODE CAN, ANODE CAP AND CATHODE CAP:

In each of the batteries shown in FIGS. 12 and 13, a combination of the electrode terminals, cathode can and anode cap or a combination the anode can, cathode cap and the like functions a battery housing.

Particularly, in the case of FIG. 12, the cathode can 506 and the anode cap 505 function respectively also as the battery housing. In the case of FIG. 13, the anode can 608 and the cathode cap 609 function respectively also as the battery housing. Therefore, these constituent components which also function as the inputting or outputting terminals are desired to be constituted by a stainless steel such as titanium clad stainless steel, copper clad stainless steel, nickel-plated steel, or the like.

In the case of FIG. 14, the battery housing cannot function as the electrode terminals. Therefore, the constituent of the battery housing (709) can include, in addition to those stainless steels above mentioned, metals such as zinc, plastics such as polypropylene, and composites of a metal or glass fiber with plastic.

SAFETY VENT:

Any of the rechargeable batteries according to the present invention is desired to be provided with an appropriate safety vent as in the case of FIG. 13 (see, reference numeral 614) and in the case of FIG. 14 (see, reference numeral 714) in order to ensure the safety when the internal pressure of the battery is incidentally increased, by communicating the inside of the battery with the outside to thereby reduce the increased internal pressure of the battery.

The safety vent may be constituted by a material comprising a rubber, a spring, a metal boll or a rupture foil.

Separately, as previously described, for any of the constituent materials and members of the foregoing electrode structural bodies for rechargeable lithium batteries, it is desired for them to be sufficiently dehydrated prior to their use. And the production of any of the foregoing electrode structural bodies and batteries using these materials and members is desired to be conducted in an atmosphere having been sufficiently dehydrated. In addition, for the solvents used for various materials, it is important for them to sufficiently dehydrated prior to their use. The dehydration of such solvent can be conducted using activated alumina, molecular sieve, phosphorous pentaoxide, or calcium chloride. Depending upon the kind of the solvent, it is possible to conduct the dehydration by way of distillation in an atmosphere composed of inert gas in the presence of an alkali metal, wherein moisture and foreign matters can be removed.

In the case of producing any of the foregoing rechargeable zinc series batteries, it is not always necessary for their constituent materials and members to be dehydrated.

In the following, the present invention will be described in more detail with reference to examples. It should be understood that these examples are only for illustrative purpose and the present invention is not restricted by these examples.

EXAMPLE 1

In this example, there was prepared an electrode structural body having such cross-sectional structure as shown in FIG. 1 as will be described below.

A copper foil of 18 $\mu$m in thickness as a collector 100 was subjected to degreasing and cleaning treatment using acetone and isopropyl alcohol, followed by drying.

The collector thus cleaned as a cathode and a plate made of Sn as an anode were arranged in an electrolyte solution of the below-described composition contained in an electrolysis vessel such that they were opposed to each other while having a distance of 6 cm between the two electrodes. The temperature of the electrolyte solution was adjusted to and maintained at 25° C., and electric field of DC was applied between the two electrodes while stirring the electrolyte solution and the current density of the cathode was made to be 10 mA/cm$^2$, where deposition was conducted under condition of constant net plating charge of 20 C/cm$^2$ (with C being coulomb). The voltage between the two electrode was 1 V. By this, there was formed a layer 102 comprising a grained metallic tin material (this layer will be hereinafter referred to as "metallic tin layer") on the collector.

[composition of electrolyte solution]

stannous sulfate: 40 g/L
    sulfuric acid: 60 g/L
    gelatin: 2 g/L
    solvent: water ("L" in the description of composition for electrolyte solution herein and hereinafter means "liter")

The collector having the metallic tin layer formed thereon was washed with water, successively subjected to surface treatment using an aqueous solution containing 60 g/L of Na$_3$PO$_4$·12H$_2$O dissolved therein and maintained at 60° C. for 60 seconds, followed by washing with water, then followed by drying. By this, there was obtained an electrode structural body 10 having an electrode material layer 102 comprising the metallic tin layer.

For the resultant electrode structural body, the thickness of the electrode material layer was examined using a micrometer. As a result, the electrode material layer was found to have a thickness of 30 $\mu$m.

Figure 17:
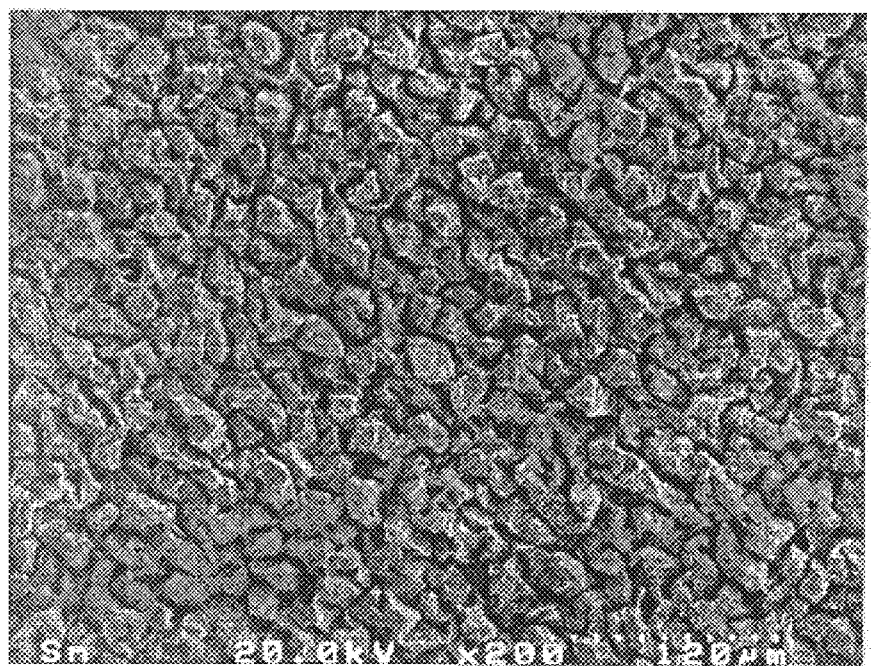
FIGS. 17 to 20 are SEM micrographs (200 times, 1000 times, 3000 times, 20,000 times) each showing a surface state of an electrode structural body (in unused state prior to subjecting to charging) in an example of the present invention.
Figure 18:
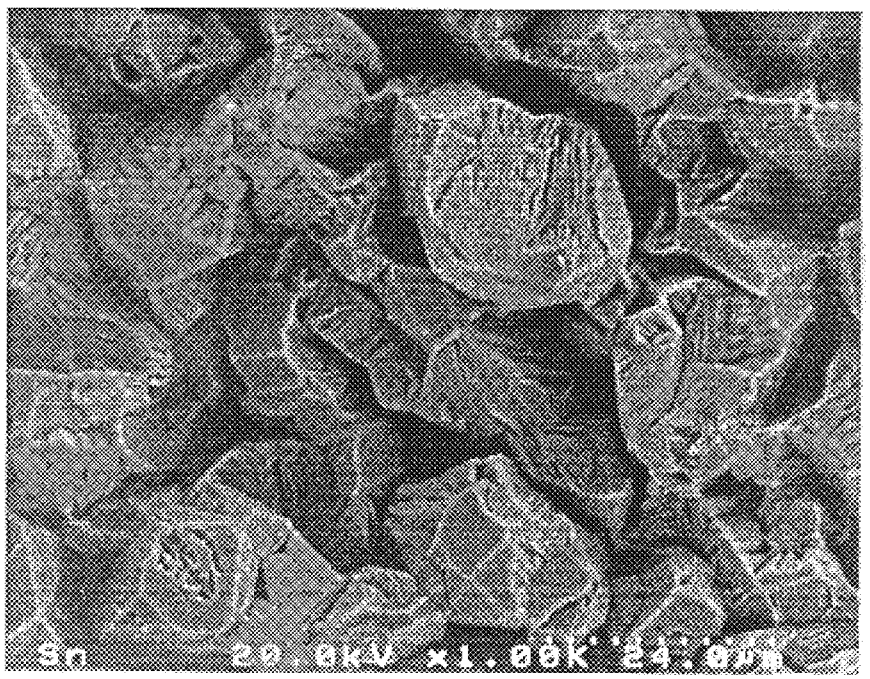
Figure 19:
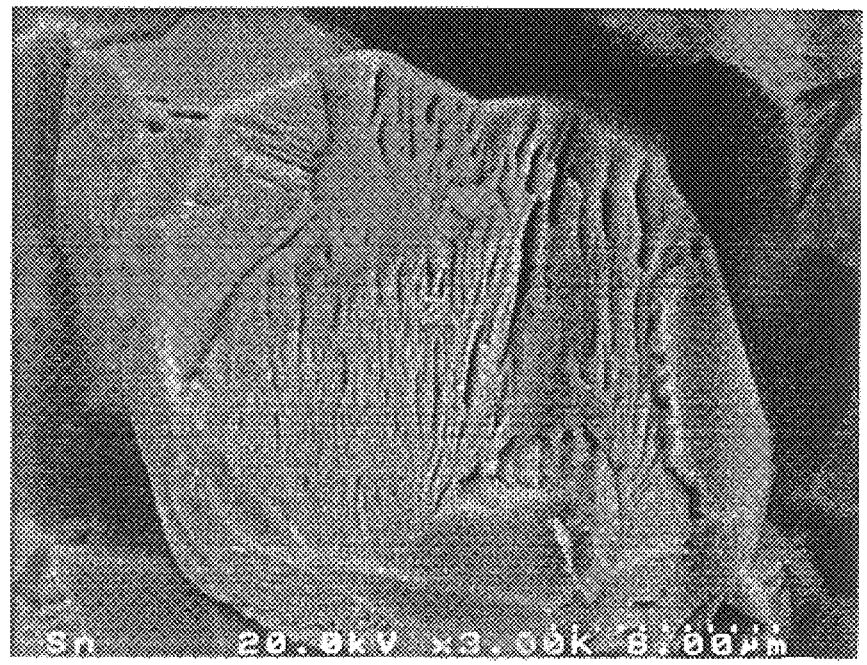
Figure 20:
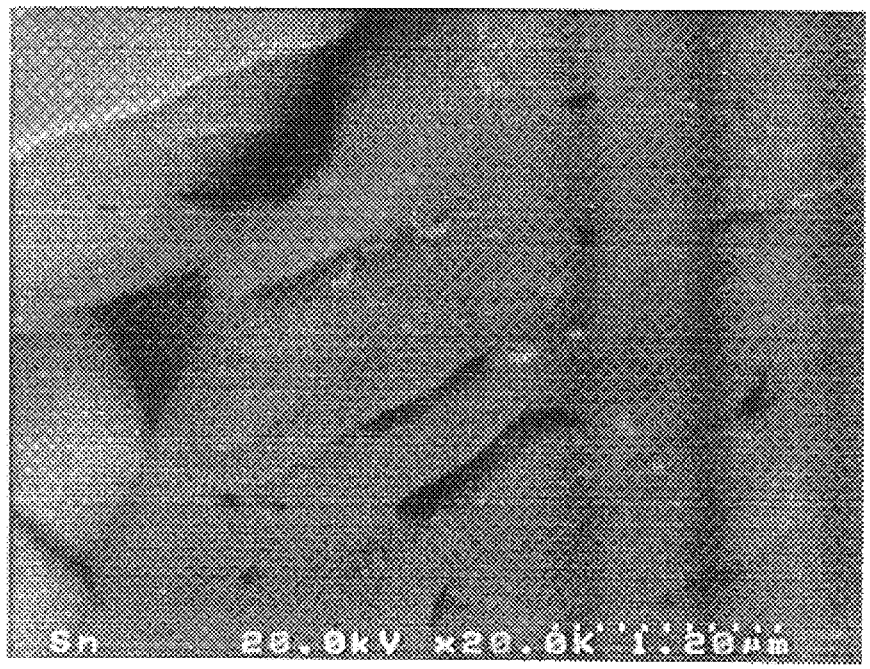

Separately, the surface of the electrode structural body, namely the surface of the metallic tin layer as the electrode material layer 102 was observed by means of a scanning electron microscope (SEM) to obtain four SEM micrographs, i.e., a SEM micrograph of magnification with 200 times shown in FIG. 17, a SEM micrograph of magnification with 1000 times shown in FIG. 18, a SEM micrograph of magnification with 3,000 times shown in FIG. 19, a SEM micrograph of magnification with 20,000 times shown in FIG. 20.

Based on these SEM micrographs, it was found that the electrode material layer 102 on the collector 100 comprises particles of tin (Sn) of 25 $\mu$m in average particle size.

EXAMPLE 2

The procedures of Example 1 were repeated, except that the amount of the gelatin contained in the electrolyte solution was changed to 20 g/L from 2 g/L, to thereby obtain an electrode structural body having such cross-sectional structure as shown in FIG. 1, which comprises a metallic tin layer 102 (comprising a grained metallic tin material) formed on a collector 100.

For the metallic tin layer, its thickness was examined using a micrometer. As a result, the thickness was found to be 20 $\mu$m.

EXAMPLE 3

The procedures of Example 1 were repeated, except that the electrolyte solution was replaced by a commercially available tinning electrolyte solution of non-bright type (trade name: LEAD Sb, produced by C. Uymura Co., Ltd.), to thereby obtain an electrode structural body having such cross-sectional structure as shown in FIG. 1, which comprises a metallic tin layer 102 (comprising a grained metallic tin layer) formed on a collector 100.

For the metallic tin layer, its thickness was examined using a micrometer. As a result, the thickness was found to be 18 $\mu$m.

EXAMPLE 4

The procedures of Example 1 were repeated, except that the electrolyte solution was replaced by an electrolyte solution of the below-described composition and the current density of the cathode was changed to 5 mA/cm$^2$, to thereby obtain an electrode structural body having such cross-sectional structure as shown in FIG. 1, which comprises a metallic tin layer 102 (a grained metallic tin material) formed on a collector 100.

[composition of electrolyte solution]

stannous sulfate: 10 g/L
    potassium pyrophosphate: 40 g/L
    polyethylene glycol 4000: 1 g/L
    formalin: 0.3 ml/L
    solvent: water For the metallic tin layer of the electrode structural body obtained, its thickness was examined using a micrometer. As a result, the thickness was found to be 15 $\mu$m.

EXAMPLE 5

The procedures of Example 1 were repeated, except that the electrolyte solution was replaced by an electrolyte solution (containing 4-vinylpyridine as a monomer capable of being engaged in electrolytic reduction polymerization) of the below-described composition, to thereby obtain an electrode structural body having such cross-sectional structure as shown in FIG. 1, which comprises a metallic tin layer 102 (comprising a grained metallic tin-polymer composite material) formed on a collector 100.

[composition of electrolyte solution]

stannous sulfate: 40 g/L
    sulfuric acid: 60 g/L
    4-vinylpyridine: 10 ml/L
    solvent: water For the metallic tin layer of the electrode structural body obtained, its thickness was examined using a micrometer. As a result, the thickness was found to be 50 $\mu$m.

EXAMPLE 6

The procedures of Example 1 were repeated, except that the electrolyte solution was replaced by an electrolyte solution (containing aniline and furan as monomers capable of being engaged in electrolytic oxidation polymerization) of the below-described composition and the DC electric field was replaced by electric field of AC pulse, to thereby obtain an electrode structural body having such cross-sectional structure as shown in FIG. 1, which comprises a metallic tin layer 102 (comprising a grained metallic tin-polymer composite material) formed on a collector 100. Herein, under conditions of 10 mA/cm² for the current density of the collector side and (a) time (reduction)/(b) time (oxidation)= 1/3 [said (a) and (b) herein are of the oxidation-reduction reaction on the collector] for the AC pulse width, the application of the pulse electric field was conducted until the quantity of electricity at the cathode on the collector side became 20 C/cm².

[composition of electrolyte solution]

stannous sulfate: 40 g/L sulfuric acid: 60 g/L aniline: 5 ml/L furan: 5 ml/L solvent: a mixture of water and ethanol (mixing volume ratio: 1:1)

For the metallic tin layer of the electrode structural body obtained, its thickness was examined using a micrometer. As a result, the thickness was found to be 30 μm.

EXAMPLE 7

The procedures of Example 1 were repeated, except that the electrolyte solution was replaced by an electrolyte solution of the below-described composition, to thereby obtain an electrode structural body having such cross-sectional structure as shown in FIG. 1, which comprises a metallic tin layer 102 (comprising a grained metallic tin-carbon composite material) formed on a collector 100.

[composition of electrolyte solution]

stannous sulfate: 40 g/L sulfuric acid: 60 g/L gelatin: 2 g/L carbon powder (graphited mesophase microbeads): 20 g/L surface active agent (perfluorohexane): 0.5 ml/L solvent: water For the metallic tin layer of the electrode structural body obtained, its thickness was examined using a micrometer. As a result, the thickness was found to be 40 μm.

EXAMPLE 8

The procedures of Example 1 were repeated, except that the content of the sulfuric acid in the electrolyte solution was changed to 20 g/L, to thereby obtain an electrode structural body having such cross-sectional structure as shown in FIG. 1, which comprises a metallic tin layer 102 (comprising a grained metallic tin material) formed on a collector 100.

For the metallic tin layer of the electrode structural body obtained, its thickness was examined using a micrometer. As a result, the thickness was found to be 33 μm.

EXAMPLE 9

The procedures of Example 1 were repeated, except that the electrolyte solution was replaced by an electrolyte solution of the below-described composition, to thereby obtain an electrode structural body having such cross-sectional structure as shown in FIG. 1, which comprises a layer 102 (comprising a grained Sn—In alloy material; this layer will be hereinafter referred to as "Sn—In alloy layer") formed on a collector 100.

[composition of electrolyte solution]

stannous sulfate: 40 g/L indium (III) sulfate (n hydrate): 20 g/L sulfuric acid: 60 g/L gelatin: 2 g/L solvent: water For the Sn—In alloy layer of the electrode structural body obtained, its thickness was examined using a micrometer. As a result, the thickness was found to be 28 μm.

Separately, for the grained Sn—In alloy material of the Sn—In alloy layer, examination with respect to its element composition ratio was conducted using an X-ray microanalyser (XMA). As a result, it was found that the element composition ratio of Sn and In is Sn:In=9:1.

EXAMPLE 10

In this example, there was prepared an electrode structural body having such cross-sectional structure as shown in FIG. 1 as will be described below.

There was prepared a paste by mixing tin powder (of less than 600 in mesh size and 99.7% in purity) with 3% by weight of acetylene black and 2% by weight of carboxymethylcellulose (as a binder) to obtain a mixture and kneading the mixture with water. The paste was applied on a copper foil of 18 μm in thickness as a collector 100 using a coater, followed by drying, whereby a 50 μm thick layer (comprising the tin powder) as an electrode material layer 102 was formed on the copper foil as the collector 100. The resultant was subjected to drying at 150° C. under reduced pressure. By this, there was obtained an electrode structural body.

EXAMPLE 11

In this example, there was prepared an electrode structural body having such cross-sectional structure as shown in FIG. 1 as will be described below.

There was prepared a paste by mixing 75% by weight of tin powder (of less than 600 in mesh size and 99.7% in purity) with 20% by weight of graphite, 3% by weight of acetylene black and 2% by weight of carboxymethylcellulose (as a binder) to obtain a mixture and kneading the mixture with water. The paste was applied on a copper foil of 18 μm in thickness as a collector 100 using a coater, followed by drying, whereby a 50 μm thick layer (comprising the tin powder) as an electrode material layer 102 was formed on the copper foil as the collector 100. The resultant was subjected to drying at 150° C. under reduce pressure. By this, there was obtained an electrode structural body.

EXAMPLE 12

In this example, there was prepared an electrode structural body having such cross-sectional structure as shown in FIG. 1 as will be described below.

There was provided silicon powder (of 5 μm in average particle size, and 98% in purity) having treated with hydrofluoric acid to remove oxide materials present on their surfaces.

Then, 30% by weight of said silicon powder, 50% by weight of tin powder (of less than 600 in mesh size, and 99.7% in purity), 15% by weight of indium powder (of less than 325 in mesh size, and 99.9% in purity), 3% by weight of acetylene black, and 2% by weight of carboxymethylcellulose (as a binder) were mixed to obtain a mixture, and the mixture was kneaded with water to obtain a paste. The paste was applied on a copper foil of 18 µm in thickness as a collector 100 using a coater, followed by drying, whereby a 50 µm thick layer (comprising the silicon, tin and indium powders) as an electrode material layer 102 was formed on the copper foil as the collector 100. The resultant was subjected to drying at 150° C. under reduced pressure. By this, there was obtained an electrode structural body.

REFERENCE EXAMPLE 1

A 100 µm thick tin metal foil (produced by Kohjundo Kagaku Kabushiki Kaisha) was made to be an electrode structural body.

REFERENCE EXAMPLE 2

The procedures of Example 1 were repeated, except that the gelatin used in the electrolyte solution was omitted to thereby obtain an electrode structural body having such cross-sectional structure as shown in FIG. 1, which comprises a metallic tin layer 102 (comprising a grained metallic tin material) formed on a collector 100.

For the metallic tin layer of the electrode structural body obtained, its thickness was examined using a micrometer. As a result, the thickness was found to be 80 µm.

REFERENCE EXAMPLE 3

The procedures of Example 1 were repeated, except that the electrolyte solution was replaced by an electrolyte solution of the below-described composition, to thereby obtain an electrode structural body having such cross-sectional structure as shown in FIG. 1, which comprises a layer 102 (comprising a grained tin material) formed on a collector 100.
[composition of electrolyte solution]
  stannous sulfate: 40 g/L
  sulfuric acid: 60 g/L
  brightener Tinglo Culmo (high concentration type, produced by LeaRonal Inc. of USA): 40 ml/L
  solvent: water
For the metallic tin layer of the electrode structural body obtained, its thickness was examined using a micrometer. As a result, the thickness was found to be 15 µm.

ANALYSIS OF ELECTRODE STRUCTURAL BODY

Figure 16:
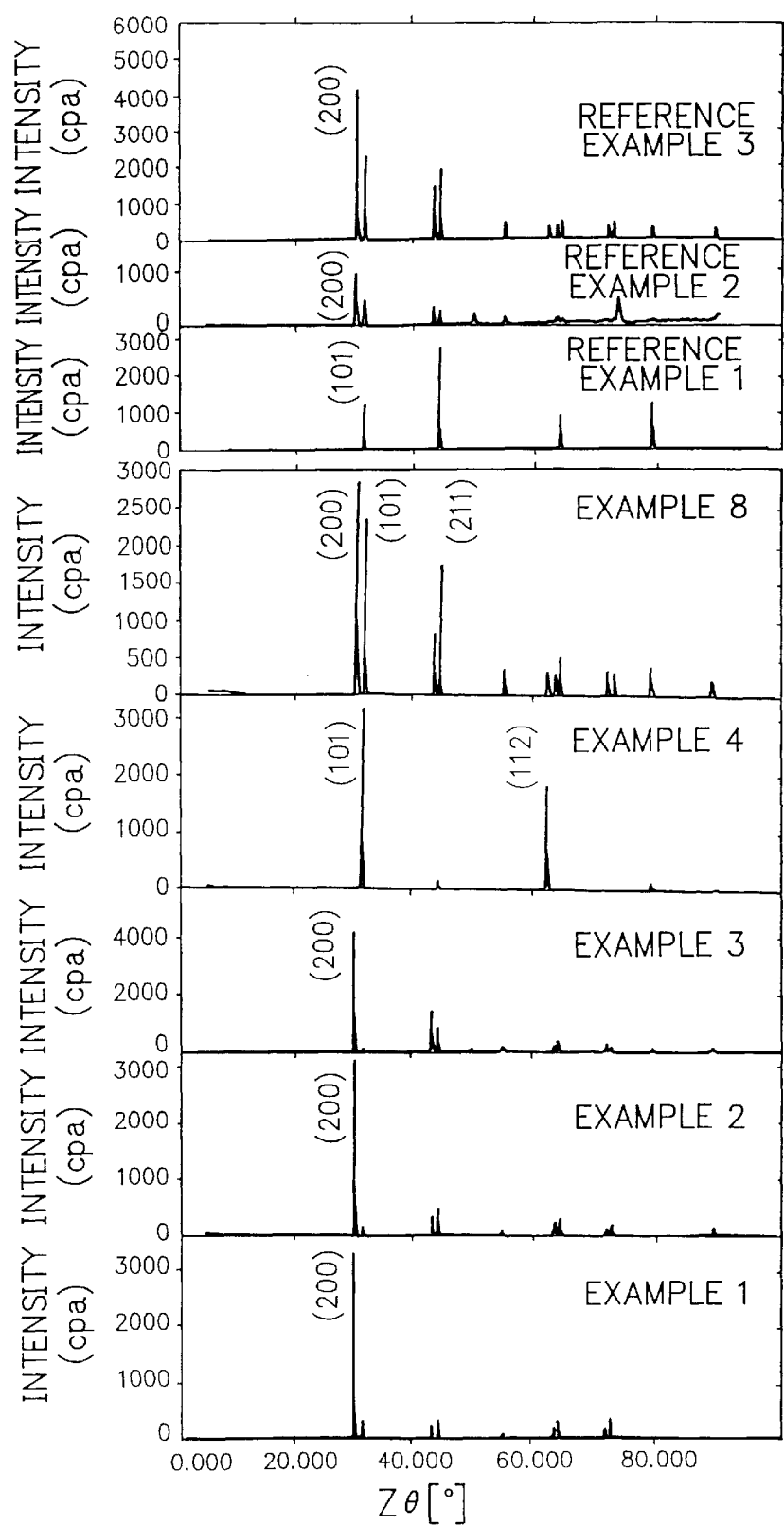
FIG. 16 is a chart including XRD diffraction patterns obtained in examples and reference examples which will be described later.

For each of the electrode structural bodies obtained in Examples 1 to 12 and in Reference Examples 1 to 3, analysis was conducted as follows.
DENSITY:
For the electrode material layer of each electrode structural body, its weight was measured. And the density of the electrode material layer was examined based on the thickness thereof (obtained using the micrometer) and the measured weight.
The results obtained are collectively shown in Table 1.
VOID RATE:
For the electrode material layer of each electrode structural body, the void ratios thereof was examined in accordance with the previously described void ratios measuring manner using the equations (1) and (2).
The results obtained are collectively shown in Table 1.
AVERAGE PARTICLE SIZE:
For the electrode material layer of each electrode structural body, the average particle size for the constituent particles of Sn or Sn-alloy of the electrode material layer was examined based on the observed result using SEM.
The results obtained are collectively shown in Table 1.
SURFACE ROUGHNESS:
For the electrode material layer of each electrode structural body, its surface state was examined in accordance with the previously described stylus method to obtain a surface roughness in peak-to-valley elevation.
The results obtained are collectively shown in Table 1.
X-RAY DIFFRACTION:
For the electrode material layer of each of the electrode structural bodies obtained in Examples 1 to 4 and 8 and in Reference Examples 1 to 3, X-ray diffraction (XRD) was conducted using alpha (α) rays of CuK as the radiation source to obtain an XRD diffraction peak pattern.
The diffraction peak patterns thus obtained are collectively shown in FIG. 16.
As FIG. 16 illustrates, the following facts are understood.
  (i). In the case of each of Examples 1 to 3, the Miller index has orientation for the (200) plane (2θ=30.6°±1.0°).
  (ii). In the case of Example 4, the Miller index has orientation for the (101) plane (2θ=32.0°±1.0°) and also for the (112) plane (2θ=62.5°±1.0°).
  (iii). In the case of Example 8, the Miller index has orientation for each of said (200) plane, said (101) plane, and the (211) plane (2θ=44.9°±1.0°).
  (iv). However, in the case of each of Reference Examples 1 and 2, there is not present such distinct orientation as in the above examples of the present invention.
Based on each of the diffraction peak patterns shown in FIG. 16, there was obtained a peak intensity ratio of the peak intensity of the strongest peak (the first peak) to that of the second peak. The results obtained are collectively shown in Table 1.
Separately, for the electrode material layer of each of the electrode structural bodies obtained in Examples 1 to 4 and 8 and in Reference Examples 1 and 2, the crystallite size was examined in accordance with the previously described manner using Sherrer's equation.
The results are obtained are collectively shown in Table 1.
Based on the results shown in Table 1, there are understood the following facts.
  (i). For the electrode material layers 102 of the electrode structural bodies obtained in Examples 1 to 12, they have a void ratios falling in the defined range of 0.10 to 0.86 with respect to the void ratios of the electrode material layer in the present invention, a density falling in the defined range of 1.00 to 6.56 g/cm$^3$ with respect to the density of the electrode material layer in the present invention, an average particle size falling in the defined range of 0.5 to 60 µm with respect to the constituent of the electrode material layer in the present invention, and a surface roughness falling in the defined range 1 to 60 µm with respect to the surface state of the electrode material layer in the present invention.
  (ii). Especially for the electrode material layers 102 of the electrode structural bodies obtained in Examples 1 to 4 and 8, they are of 10 to 50 nm in crystallite size.
  (iii). For the electrode material layers 102 of the electrode structural bodies obtained in Examples 1 to 4, they have a peak intensity ratio (that is, a ratio of the intensity of the strongest peak to that of the second peak with respect to the orientation in the XRD diffraction peak pattern) of more than 2.

ELEMENTAL ANALYSIS (Sn, C, O, N):

For each of the electrode material layers 102 of the electrode structural bodies obtained in Examples 1 to 2 and 5 to 7 and Reference Example 2, the composition ratio of each of the elements to the Sn in the electrode material layer was examined in accordance with the previously described elemental analysis manner by XPS (X-ray photoelectron spectroscopy).

The examined results obtained are collectively shown in Table 2.

Based on the results shown in Table 2, the following facts are understood.

(i). When the electroplating electrolyte solution contains gelatin (see, Examples 1 and 2 in Table 2) or one or more organic compounds (see, Examples 5 and 6 in Table 2) besides Sn, the composition ratio of each of C and N to the Sn is increased. For the reason for this situation, it is considered such that these elements (C and N) are contained in the structure of the organic compound used and because of this, they are incorporated into a layer as the electrode material layer during the formation thereof by way of electroplating.

(ii). The incorporation of 4-vinylpyridine (Example 5), a combination of aniline and furan (Example 6), or a combination of gelatin and carbon (Example 7) into the electroplating electrolyte solution increases the composition ratio of the C.

Separately, for the electrode material layer 102 of each of the electrode structural bodies obtained in Examples 1 and 2, the surface thereof was subjected to etching treatment using argon ion for 30 minutes. The electrode material layer whose surface region having been removed was subjected to the elemental analysis by way of XPS. The results obtained are collectively shown in Table 3.

Based on the results shown in Tables 2 and 3, the following facts are understood. As a result of having etched the surface region of the electrode material layer 102 of each of the electrode structural bodies obtained in Examples 1 and 2 as above described, the composition ratio of each of the C, O and N to the Sn in the electrode material layer was decreased. This reveals that the C, O and N each in a relatively large amount are contained in the surface side region of the electrode material layer of each of the electrode structural bodies obtained in Example 1 and 2.

EXAMPLES OF RECHARGEABLE BATTERY

In the following, examples relating to rechargeable batteries according to the present invention will be described.

EXAMPLE 13

There was prepared a rechargeable lithium battery of the configuration shown in FIG. 13 and which is in a cylindrical form of AA-size (13.9 mm (diameter)×50 mm) in the following manner.

(1) Preparation of Anode 603

In accordance with the procedures of Example 1 for the preparation of the electrode structural body, there was prepared an electrode structural body comprising a 30 $\mu$m thick grained metallic tin material layer (as an anode material layer 602) formed on opposite surfaces of a 18 $\mu$m thick copper foil as a collector 601.

The electrode structural body thus prepared was cut to obtain an electrode structural body having a prescribed size. A lead wire made of nickel as an anode lead 612 was connected to the collector of the electrode structural body by way of spot welding. By this, there was obtained an anode 603.

(2) Preparation of Cathode 606

Electrolytic manganese dioxide was mixed with lithium carbonate with a mole ratio of 1:0.4, followed by subjecting to heat treatment at 800° C., to thereby obtain a lithium-manganese composite oxide. With the resultant lithium-manganese composite oxide in an amount of 85 wt. %, 5 wt. % of powder of acetylene black and 10 wt. % of powder of polyvinylidene fluoride were mixed. The resultant was mixed with N-methyl-2-pyrrolidone to obtain a paste-like material. The paste-like material was applied onto opposite surfaces of a 20 $\mu$m thick aluminum foil as a cathode collector 604 using a coater, followed by subjecting to drying, successively to roller press treatment, and the resultant was dried at 150° C. under reduced pressure to obtain an electrode structural body comprising a 90 $\mu$m thick cathode material layer 605 formed on the opposite surfaces of the collector 604.

The electrode structural body thus obtained was cut to obtain an electrode structural body having a prescribed size. A lead wire made of aluminum as a cathode lead 613 was connected to the collector of the electrode structural body by way of spot welding. By this, there was obtained a cathode 606.

(3) Preparation of Electrolyte Solution

There was provided a moisture-free mixed solvent composed of ethylene carbonate (EC) and dimethyl carbonate (DMC) with an equivalent mixing ratio. 1M (mol/L) of tetrafluoro lithium borate was dissolved in the mixed solvent. By this, there was obtained an electrolyte solution.

(4) Separator 607

There was provided a 25 $\mu$m thick polyethylene member having a number of perforations as a separator 607.

(5) Fabrication of Rechargeable Lithium Battery

The fabrication of a rechargeable lithium battery was conducted in a dry argon atmosphere having been controlled with respect to moisture in the range of dew point to 50° C.

(i) The separator 607 was interposed between the anode 603 and the cathode 606, followed by spirally winding so as to provide an assembled body of the constitution comprising the separator/the cathode/the separator/the anode/the separator. The assembled body was inserted into an anode can 608 made of stainless steel.

(ii) The anode lead 612 was spot-welded to a bottom portion of the anode can 608. Necking was formed at the upper part of the anode can using a necking device. The cathode lead 613 was spot-welded to a cathode cap 609 provided with a gasket 610 made of polypropylene.

(iii) The electrolyte solution was injected into the anode can. The cathode cap was put on, followed by sealing by way of caulking the cathode cap and the anode can using a caulking machine.

By this, there was obtained a rechargeable lithium battery. In this rechargeable lithium battery, the cathode has a greater capacity than that of the anode.

EXAMPLE 14

The procedures of Example 13 were repeated, except that each of the opposite anode material layers 602 was replaced by an electrode material layer formed in accordance with the procedures of Example 2, to thereby obtain a rechargeable lithium battery of AA-size and having the configuration shown in FIG. 13.

EXAMPLE 15

The procedures of Example 13 were repeated, except that each of the opposite anode material layers 602 was replaced by an electrode material layer formed in accordance with the procedures of Example 3, to thereby obtain a rechargeable lithium battery of AA-size and having the configuration shown in FIG. 13.

EXAMPLE 16

The procedures of Example 13 were repeated, except that each of the opposite anode material layers 602 was replaced by an electrode material layer formed in accordance with the procedures of Example 4, to thereby obtain a rechargeable lithium battery of AA-size and having the configuration shown in FIG. 13.

EXAMPLE 17

The procedures of Example 13 were repeated, except that each of the opposite anode material layers 602 was replaced by an electrode material layer formed in accordance with the procedures of Example 5, to thereby obtain a rechargeable lithium battery of AA-size and having the configuration shown in FIG. 13.

EXAMPLE 18

The procedure of Example 13 were repeated, except that each of the opposite anode material layers 602 was replaced by an electrode material layer formed in accordance with the procedures of Example 6, to thereby obtain a rechargeable lithium battery of AA-size and having the configuration shown in FIG. 13.

EXAMPLE 19

The procedures of Example 13 were repeated, except that each of the opposite anode material layers 602 was replaced by an electrode material layer formed in accordance with the procedures of Example 7, to thereby obtain a rechargeable lithium battery of AA-size and having the configuration shown in FIG. 13.

EXAMPLE 20

The procedures of Example 13 were repeated, except that each of the opposite anode material layers 602 was replaced by an electrode material layer formed in accordance with the procedures of Example 8, to thereby obtain a rechargeable lithium battery of AA-size and having the configuration shown in FIG. 13.

EXAMPLE 21

The procedures of Example 13 were repeated, except that each of the opposite anode material layers 602 was replaced by an electrode material layer formed in accordance with the procedures of Example 9, to thereby obtain a rechargeable lithium battery of AA-size and having the configuration shown in FIG. 13.

EXAMPLE 22

The procedures of Example 13 were repeated, except that each of the opposite anode material layers 602 was replaced by an electrode material layer formed in accordance with the procedures of Example 10, to thereby obtain a rechargeable lithium battery of AA-size and having the configuration shown in FIG. 13.

EXAMPLE 23

The procedures of Example 13 were repeated, except that each of the opposite anode material layers 602 was replaced by an electrode material layer formed in accordance with the procedures of Example 11, to thereby obtain a rechargeable lithium battery of AA-size and having the configuration shown in FIG. 13.

EXAMPLE 24

The procedures of Example 13 were repeated, except that each of the opposite anode material layers 602 was replaced by an electrode material layer formed in accordance with the procedures of Example 12, to thereby obtain a rechargeable lithium battery of AA-size and having the configuration shown in FIG. 13.

EXAMPLE 25

The procedures of Example 13 were repeated, except that the anode 603 was replaced by an anode comprising an electrode structural body having such structure as shown in FIG. 10 prepared as will be described below, to thereby obtain a rechargeable lithium battery of AA-size and having the configuration shown in FIG. 13.

The above electrode structural body as the anode was prepared in the following manner. In accordance with the procedures of Example 1 for the preparation of the electrode structural body, there was formed a 30 $\mu$m thick grained metallic tin material layer (102') formed on opposite surfaces of a 18 $\mu$m thick copper foil as a collector (100). Then, a paste-like material (obtained by mixing 90% by weight of spherical powder of graphite and 10% by weight of powder of polyvinylidene fluoride to obtain a mixture and mixing the mixture with N-methyl-2-pyrrolidone) was applied onto each of the opposite metallic tin material layer (102') using a coater, followed by frying to form a 10 $\mu$m thick second layer on each of the opposite metallic tin material layer (102'). The resultant was dried at 150° C. under reduced pressure.

By this, there was obtained the above electrode structural body as the anode.

EXAMPLE 26

The procedures of Example 13 were repeated, except that the anode 603 was replaced by an anode comprising an electrode structural body having such structure as shown in FIG. 10 prepared as will be described below, to thereby obtain a rechargeable lithium battery of AA-size and having the configuration shown in FIG. 13.

The above electrode structural body as the anode was prepared in the following manner. In accordance with the procedures of Example 1 for the preparation of the electrode structural body, there was formed a 30 $\mu$m thick grained metallic tin material layer (102') formed on opposite surfaces of a 18 $\mu$m thick copper foil as a collector (100).

Separately, 10% by weight of polyvinylidene fluoride was resolved in $\gamma$-butyrolactone to obtain a solution. The solution was gelled by subjecting the solution to heat treatment at 90° C. in an autoclave and subjecting the solution thus heat-treated to cooling treatment, whereby obtaining a gel. The gel was mixed with spherical powder of graphite in an amount corresponding to 9 times the weight amount of the polyvinylidene fluoride contained in the gel to obtain a paste-like material.

The paste-like material thus obtained was applied onto each of the opposite metallic tin material layer (102') using a coater, followed by drying to form a 10 $\mu$m thick second layer on each of the opposite metallic tin material layer (102'). The resultant was dried at 150° C. under reduced pressure. By this, there was obtained the above electrode structural body as the anode.

REFERENCE EXAMPLE 4

The procedures of Example 13 were repeated, except that the anode 603 was replaced a 100 μm thick tin metal foil as the electrode structural body in Reference Example 1, to thereby obtain a rechargeable lithium battery of AA-size and having the configuration shown in FIG. 13.

REFERENCE EXAMPLE 5

The procedures of Example 13 were repeated, except that each of the opposite anode material layers 602 was replaced by an electrode material layer formed in accordance with the procedures of Reference Example 2, to thereby obtain a rechargeable lithium battery of AA-size and having the configuration shown in FIG. 13.

REFERENCE EXAMPLE 6

The procedures of Example 13 were repeated, except that each of the opposite anode material layers 602 was replaced by an electrode material layer formed in accordance with the procedures of Reference Example 3, to thereby obtain a rechargeable lithium battery of AA-size and having the configuration shown in FIG. 13.

REFERENCE EXAMPLE 17

The procedures of Example 13 were repeated, except that the anode 603 was replaced by an anode comprising an electrode structural body prepared as will be described below, to thereby obtain a rechargeable lithium battery of AA-size and having the configuration shown in FIG. 13.

The above electrode structural body as the anode was prepared in the following manner. 90% by weight of carbon powder (graphited mesophase microbeads) of 6 μm in average particle size was mixed with 10% by weight of polyvinylidene fluoride (as a binder), followed by kneading with N-methyl-2-pyrrolidone to obtain a paste-like material. The paste-like material was applied onto opposite surfaces of a 18 μm thick copper foil as a collector using a coater, followed by drying to form a 80 μm thick carbon layer on each of the opposite surfaces of the collector. The resultant was dried at 150° C. under reduced pressure. By this, there was obtained the above electrode structural body as the anode.

EVALUATION

In each of Examples 13 to 26 and Reference Examples 4 to 7, there were prepared two rechargeable batteries. One of the two rechargeable batteries in each case was used for the evaluation of battery performances [battery capacity and battery cycle life (charging and discharging cycle life)] through charging and discharging cycle test as will be described below. For the remaining rechargeable battery, after the third repetition of the charging and discharging cycle in the charging and discharging cycle test, it was decomposed to take out the anode, and its surface was observed by means of a scanning electron microscope (SEM), wherein the presence or absence of not only "cracking" but also "pores" therein was examined. The "cracking" herein means a turtle shell-like shaped crack of 1 μm or more in groove width which is found in the observation by the SEM.

Charging and Discharging Cycle Test

The charging and discharging cycle test was conducted in the following manner. That is, each rechargeable battery is placed in a charging and discharging device HJ-106M (produced by Hokuto Denko Kabushiki Kaisha), wherein charging and discharging are alternately repeated under conditions of 0.5C (electric current of 0.5 time the electric capacity per an hour based on the electric capacity calculated from the cathode active material of the rechargeable battery) for the charging and discharging, and 20 minutes for the rest. As for other conditions, in the case of each of the rechargeable batteries obtained in Examples 13 to 26 and Reference Examples 4 to 6, the cut-off voltage upon charging is made to be 4.5V and that upon discharging is made to be 2.8V. Similarly, in the case of the rechargeable battery obtained in Reference Example 7, the cut-off voltage upon charging is made to be 4.5V and that upon discharging is made to be 2.5V.

The charging and discharging cycle test was initiated by operating charging. In the charging and discharging test, as for each rechargeable battery, there were observed its battery capacity (that is, an energy density, namely, a discharge energy density) per a unit volume of the rechargeable battery and its charging and discharging cycle life. The battery capacity was based on the service capacity after the third repetition of the charging and discharging cycle. And the charging and discharging cycle life was based on the number of the charging and discharging cycle having been repeated until the battery capacity became less than 60% of the initial battery capacity.

The evaluated results obtained with respect to battery capacity and battery cycle life are collectively shown in Table 4. Each of the figures with respect to battery capacity and battery cycle life shown in Table 4 is a value relative to the corresponding value of Reference Example 5 or 7, which is set at 1.0 or 1.

Observation by SEM

Each of the rechargeable batteries obtained in Examples 13 to 26 and Reference Examples 4 to 7 was subjected to the above charging and discharging cycle test, where after the third repetition of the charging and discharging cycle, the rechargeable battery was decomposed and the anode was taken out. The surface of the anode (that is, the surface of the layer comprising metallic tin) was observed by the SEM, where the presence or absence of "cracking" and also "pores" therein was examined. The examined results with respect to cracking and pores are collectively shown in Table 4.

Figure 21:
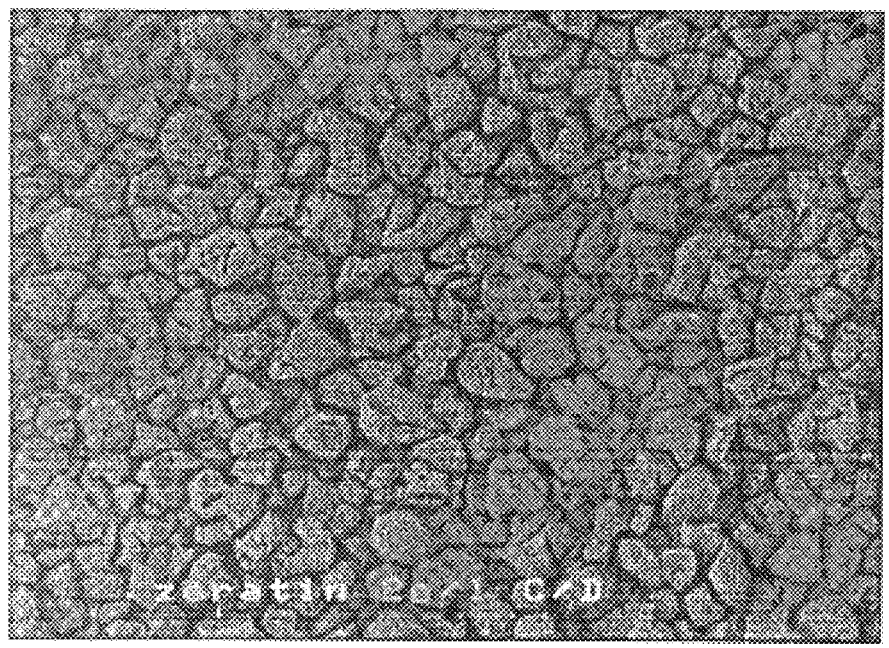
FIGS. 21 to 24 are SEM micrographs (200 times, 1000 times, 3000 times, 20,000 times) each showing a surface state of an electrode structural body (after having subjected to charging and discharging cycle) in an example of the present invention.
Figure 22:
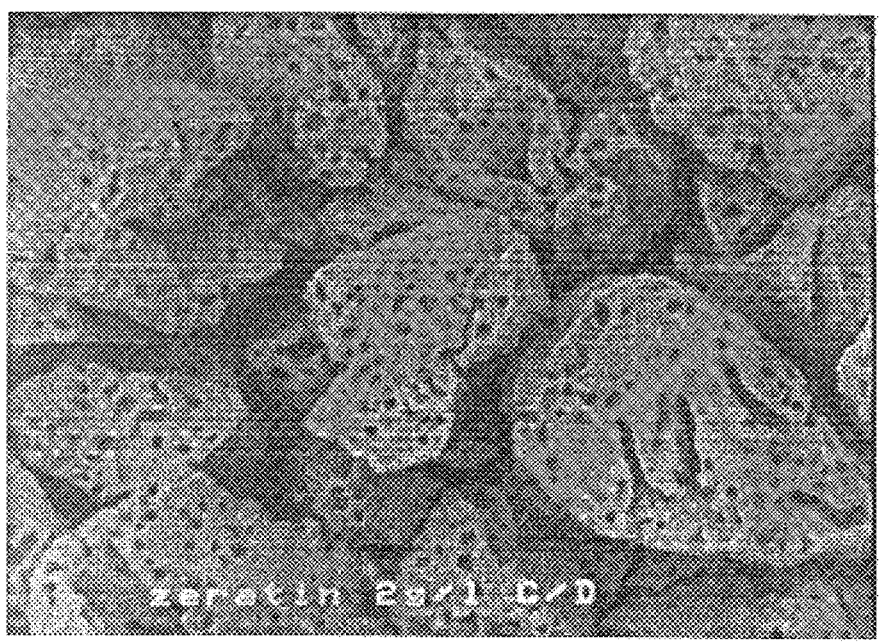
Figure 23:
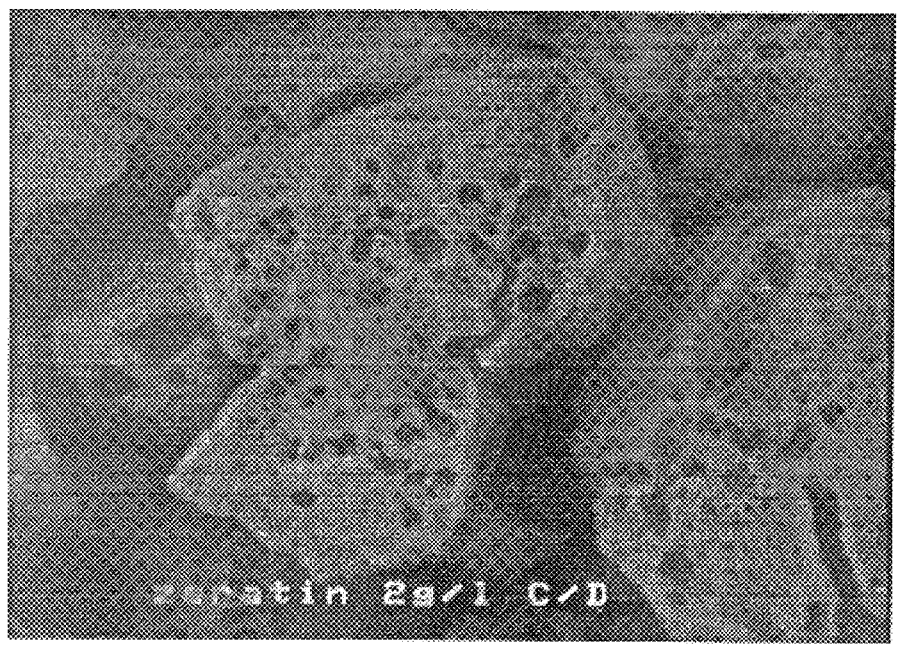
Figure 24:
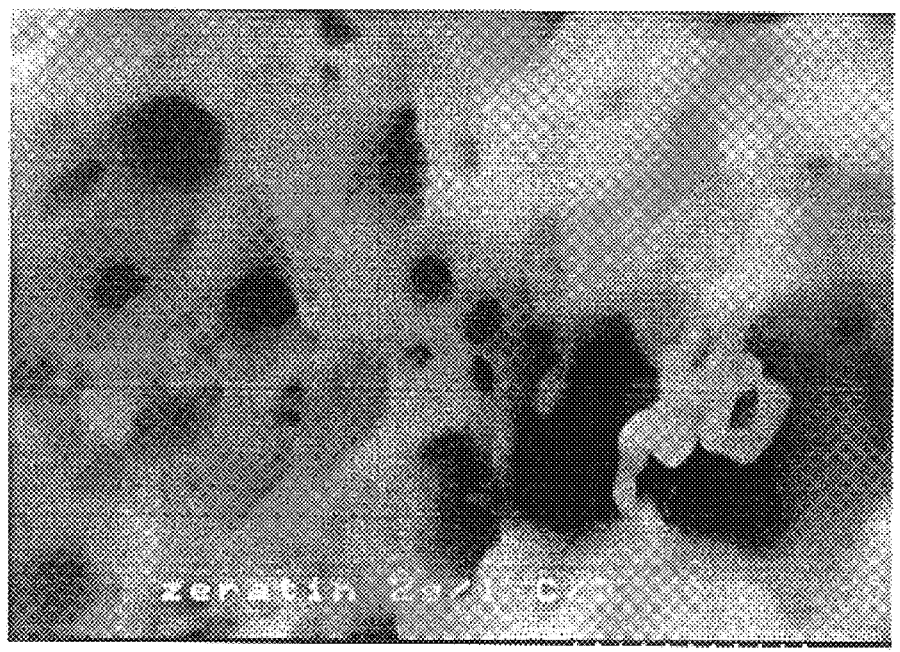

For the surface state of the anode of the rechargeable battery of Example 13 (after the after the third repetition of the charging and discharging cycle in the charging and discharging cycle test), there are shown four SEM micrographs in FIGS. 21 to 24, i.e., a SEM micrograph of magnification with 200 times in FIG. 21, a SEM micrograph of magnification with 1,000 times in FIG. 22, a SEM micrograph of magnification with 3,000 times in FIG. 23, and a SEM micrograph of magnification with 20,000 times in FIG. 24.

In comparison of the anode's surface state shown in the SEM micrographs of FIGS. 21 to 24 with the surface state of the corresponding layer comprising the grained metallic tin material (unused state without having been subjected to the charging and discharging cycle test) shown in the SEM micrographs of FIGS. 17 to 20, it is understood that no cracking is present in the surface of the anode (the electrode structural body) even after having been subjected to the repetition of the charging and discharging cycle, and minute pores are formed therein.

Figure 25:
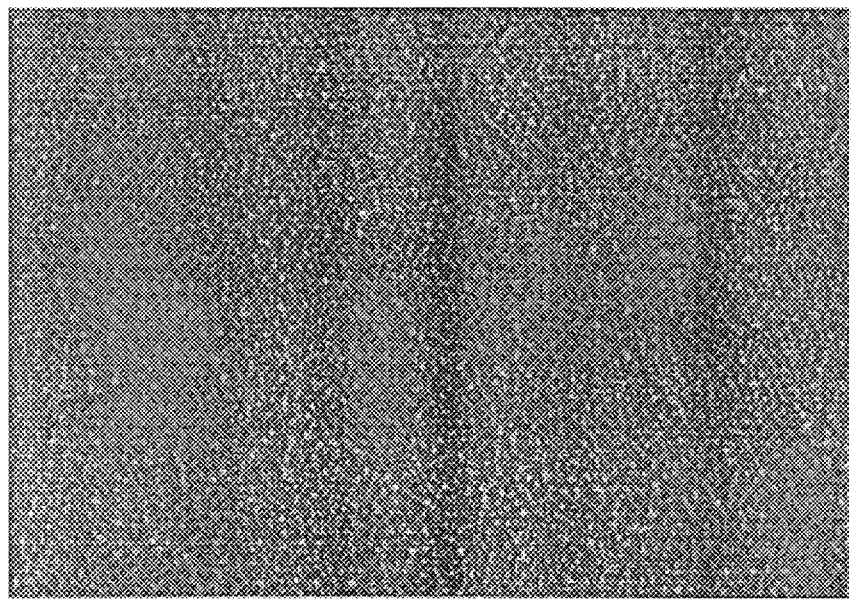
FIG. 25 is a SEM micrograph (200 times) showing a surface state of an electrode structural body (in unused state prior to subjecting to charging) a reference example of the present invention.
Figure 26:
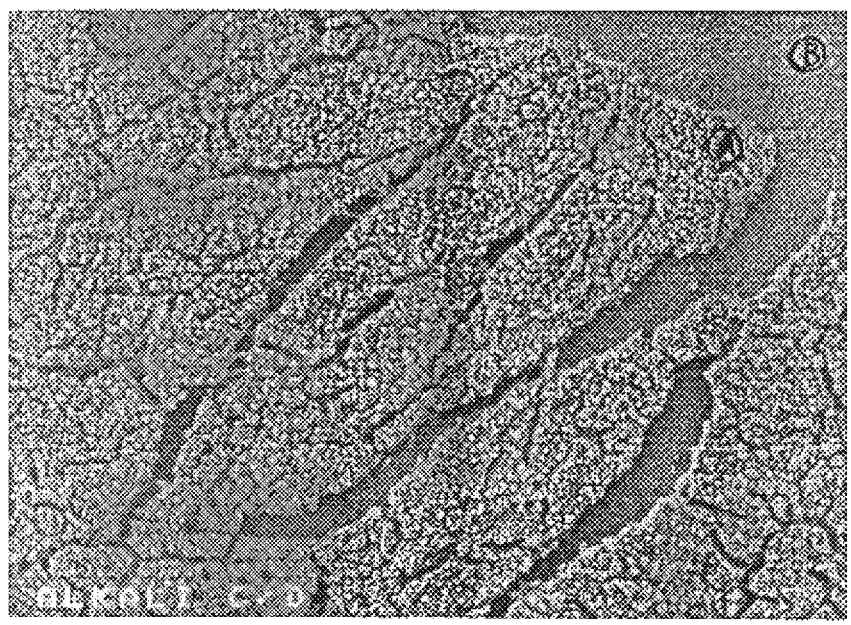
FIG. 26 is a SEM micrograph (200 times) showing a surface state of an electrode structural body (after having subjected to charging and discharging cycle) in a reference example of, the present invention.

FIG. 25 shows a SEM micrograph of magnification with 200 times for the surface state of the electrode structural body obtained in Reference Example 3 (in unused state without having been subjected to the charging and discharging cycle test) which was used as the anode in Reference Example 6. FIG. 26 shows a SEM micrograph of magnification with 200 times for the surface state of the anode of the rechargeable battery (after the third repetition of the charging and discharging in the charging and discharging cycle test). According to these two SEM micrographs of FIGS. 25 and 26, it is understood that in the case of subjecting to the repetition of the charging and discharging cycle, cracking is more apparently occurred in the anode's surface and the metallic tin material therein is partially peeled off (see, region B in FIG. 26). In comparison of the SEM micrograph of FIG. 17 and that of FIG. 21 which are of the same magnification, it is understood that the occurrence of cracking and the peeled-off state are significant for the surface state of the electrode structural body obtained in Reference Example 3.

Based on the results shown in Table 4, the following facts are understood.

(i) for the anode of each of the rechargeable batteries obtained in Examples 13 to 26, after the third repetition of the charging and discharging cycle in the charging and discharging cycle test, no cracking is present and pores are formed in the surface thereof. And these rechargeable batteries have a charging and discharging cycle life which is significantly longer by 22 to 33 times over that of the rechargeable battery of Reference Example 4 in which the tin metal foil is used as the anode. However, the charging and discharging cycle life of the rechargeable battery whose anode's surface having been suffered from the occurrence of cracking as above described is only two times that of the rechargeable battery of Reference Example 4. In the case of Reference Example 5 in which no gelatin was used, although the occurrence of cracking is not observed, the battery capacity is undesirably small.

(ii) As apparent from the comparison of Example 13 with Example 25, by forming the second layer, the charging and discharging cycle life if prolonged from 28 to 35 as shown in Table 4.

(iii) The rechargeable batteries of Examples 13 to 26 have a battery capacity which is distinctly higher by 1.5 to 2.0 times over that of the rechargeable battery of Reference Example 7 in which the carbon material is used as the anode. However, the battery capacity of the rechargeable battery of Reference Example 5 is smaller than that of the rechargeable battery of Reference Example 7.

The results graphically shown in FIG. 5 are of the interrelations between the average particle sizes (see, Table 1) of the grained host matrix materials of Sn or Sn-alloy each used in the anode (the electrode structural body) and the battery performances (i.e., battery lifetime (charging and discharging cycle life) under condition of repeating the charging and discharging cycle and charge-and-discharge Coulomb efficiency) based on some of the foregoing evaluated results for Examples 13 to 26 and Reference Examples 4 to 7.

As previously described, based on the results shown in FIG. 5, it is understood that when the average particle size of the grained host matrix material as the electrode material layer is less than 0.5 μm, the charging and discharging cycle life is markedly diminished. For the reason for this, it is considered such that when the average particle size is excessively small, the bulk density of the Sn or Sn-alloy layer is increased so that the void rate in the electrode material layer is diminished and as a result, upon repeating the charging and discharging cycle, cracking is occurred in the electrode material layer to cause layer peeling at the interface between the electrode material layer and the collector. On the other hand, when the average particle size of the grained host matrix material as the electrode material layer is beyond 60 μm, it is understood that not only the charge-and-discharge Coulomb efficiency but also the charging and discharging cycle life are diminished. For the reason for this, it is considered such that when the average particle size of the grained host matrix material as the electrode material layer is excessively large, the electrode material layer has such surface roughness that is large in terms of peak-to-valley elevation and because of this, electric field is converged at the protrusions, resulting in generation or growth of a dendrite of lithium upon charging.

The results graphically shown in FIG. 6 are of the interrelations between the densities and void ratios (see, Table 1) of the electrode material layers (comprising a given grained host matrix material of Sn or Sn-alloy) each used in the anode (the electrode structural body) and the battery performances (i.e., battery lifetime (charging and discharging cycle life) under condition of repeating the charging and discharging cycle and battery capacity) based on some of the foregoing evaluated results for Examples 13 to 26 and reference Examples 4 to 7.

As previously described, based on the results shown in FIG. 6, the following facts are understood.

When the bulk density of the electrode material layer is less than 0.10 where the density of the layer is beyond 6.56 g/cm$^3$, cracking is occurred at the surface of the electrode material layer, and the battery lifetime is shortened.

When the void ratios the electrode material layer is beyond 0.86 where the density of the layer is less than 1.00 g/cm$^3$, the battery lifetime and battery capacity are similar to those of the comparative rechargeable lithium battery in which cabonous material is used as the anode.

When the void ratios of the electrode material layer is in the range of 0.31 to 0.73, the battery lifetime and battery capacity are most excellent.

Based on these facts, it is understood that by making the electrode material layer to have a density preferably in the range of 1.00 to 6.56 g/cm$^3$ and a void ratios preferably in the range of 0.10 to 0.86 or more preferably in the range of 0.31 to 0.73, there can be attained a desirable rechargeable lithium battery which has a good enough or excellent battery capacity and a prolonged battery lifetime.

EXAMPLE 27

There was prepared a rechargeable lithium battery of AA-size and having the configuration shown in FIG. 13 in the following manner.

(1) Preparation of Anode 603

(i) Silicon powder of 1 to 3 μm in average particle size, tin powder of 5 to 20 μm in average particle size, spherical graphite powder of 5 μm in average particle size, and flake-like copper powder of 10 μm in width and 1 μm in thickness were mixed at a weight mixing ratio of 25:50:15:5 using an epicycle ball mill to obtain a mixture, the mixture and powder of polyvinylidene fluoride were mixed at a weight mixing of 95:5, followed by mixing with N-methyl-2-pyrrolidone, whereby obtaining a paste-like material.

(ii) There was provided a copper foil of 18 μm in thickness (whose opposite surfaces having been well cleaned using acetone and isopropyl alcohol) as an anode collector 601.

The paste-like material obtained in the above step (i) was applied on the opposite surfaces of the copper foil as the collector using a coater, followed by drying, whereby a 30 $\mu$m thick first layer on each of the opposite surfaces of the collector.

- (iii) 90% by weight of spherical graphite powder and 10% by weight of powder of polyvinylidene fluoride were mixed to obtain a mixture, and the mixture was mixed with N-methyl-2-pyrrolidone to obtain a paste-like material. The paste-like material was applied on each of the opposite first layers formed on the collector using a coater, followed by drying. The resultant obtained was subjected to drying treatment at 150° C. under reduced pressure, whereby a 10 $\mu$m thick second layer was formed on the surface of each of the opposite first layers formed on the collector. By this, there was obtained an electrode structural body comprising he collector whose opposite surfaces having the first and second layers formed in this order on each of them.
- (iv) The electrode structural body obtained in the above step (iii) was cut to obtain an electrode structural body having a prescribed size. A lead wire made of nickel as an anode lead 612 was connected to the collector of the electrode structural body by way of spot welding.

By this, there was obtained an anode 603.

Figure 15:
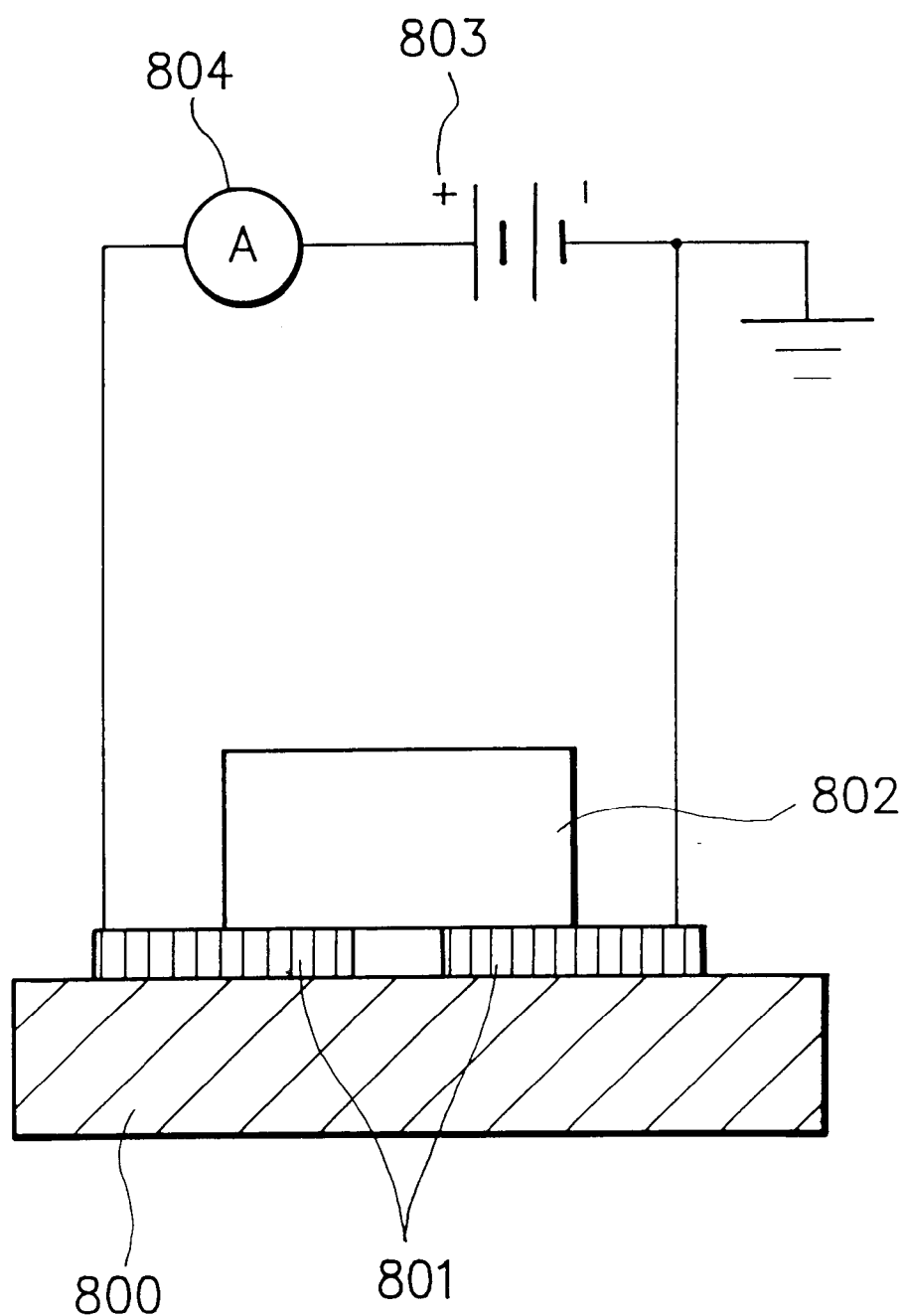
FIG. 15 is a schematic diagram illustrating a measuring device used for measuring an electric resistance of an electrode material layer.

Herein, independently, for each of the above first and second layers on the collector, the specific resistance (the volume resistivity) was examined in the following manner using a measuring device shown in FIG. 15. Particularly, in the measuring device shown in FIG. 15, gap electrodes 801 (having three-layered structure comprising 100 nm thick Cr/200 nm thick Ag/100 nm thick Cr) are formed on a glass plate 800 to have a gap of about 250 $\mu$m between them. Reference numeral 803 indicates a DC power source which is electrically connected to the gap electrodes 801 as shown in FIG. 15. Reference numeral 804 indicates an ammeter. Reference numeral 802 indicates an object (the first layer, the second layer, or the collector) to be measured with respect to its specific resistance, which is disposed on the gap electrodes 801.

Now, each (802) of the first and second layers was separately formed on the gap electrodes 801 in accordance with the above-described corresponding layer forming manner. In a region where ohmic contact is established between the electrodes with respect to the relation between the voltage applied and the electric current (specifically, the relation in which the electric current is proportional to the voltage applied) against the first or second layer (802), given direct current from the DC power source 803 was flown to obtained a value by the ammeter 804. Based on the value obtained by the ammeter 804, an electric resistance was obtained. Based on the electric resistance thus obtained, the thickness of the layer, and the value of the electrode gap, there was obtained a specific resistance for each of the first and second layers.

In this way, there was also obtained a specific resistance for the collector.

As a result, it was found that the specific resistance of the second layer is greater than that of the first layer. It was also found that the specific resistance of each of the first and second layers is greater than that of the collector.

(2) Preparation of Cathode 606

Electrolytic manganese dioxide was mixed with lithium carbonate with a mole ratio of 1:0.4, followed by subjecting to heat treatment at 800° C., to thereby obtain a lithium-manganese composite oxide. With the resultant lithium-manganese composite oxide in an amount of 85 wt. %, 5 wt. % of powder of acetylene black and 10 wt. % of powder of polyvinylidene fluoride were mixed. The resultant was mixed with N-methyl-2-pyrrolidone to obtain a paste-like material. The paste-like material was applied onto opposite surfaces of a 20 $\mu$m thick aluminum foil as a cathode collector 604 using a coater, followed by subjecting to drying, successively to roller press treatment, and the resultant was dried at 150° C. under reduced pressure to obtain an electrode structural body comprising a 90 $\mu$m thick cathode material layer 605 formed on the opposite surfaces of the collector 604.

The electrode structural body thus obtained was cut to obtain an electrode structural body having a prescribed size. A lead wire made of aluminum as a cathode lead 613 was connected to the collector of the electrode structural body by way of spot welding. By this, there was obtained a cathode 606.

(3) Preparation of Electrolyte Solution

There was provided a moisture-free mixed solvent composed of ethylene carbonate (EC) and dimethyl carbonate (DMC) with an equivalent mixing ratio. 1M (mol/L) of tetrafluoro lithium borate was dissolved in the mixed solvent.

By this, there was obtained an electrolyte solution.

(4) Separator 607

There was provided a 25 um thick polyethylene member having a number of perforations as a separator 607.

(5) Fabrication of Rechargeable Lithium Battery

The fabrication of a rechargeable lithium battery was conducted in a dry argon atmosphere having been controlled with respect to moisture in the range of dew point to 50° C.

- (i) The separator 607 was interposed between the anode 603 and the cathode 606, followed by spirally winding so as to provide an assembled body of the constitution comprising the separator/the cathode/the separator/the anode/the separator.

The assembled body was inserted into an anode can 608 made of stainless steel.

- (ii) The anode lead 612 was spot-welded to a bottom portion of the anode can 608. Necking was formed at the upper part of the anode can using a necking device. The cathode lead 613 was spot-welded to a cathode cap 609 provided with a gasket 610 made of polypropylene.
- (iii) The electrolyte solution was injected into the anode can. The cathode cap was put on, followed by sealing by way of caulking the cathode cap and the anode can using a caulking machine.

By this, there was obtained a rechargeable lithium battery. In this rechargeable lithium battery, the cathode has a greater capacity than that of the anode.

EXAMPLE 28

The procedures of Example 27 were repeated, except that the flake-like copper powder used in the preparation of the anode was replaced by spherical copper powder of 10 $\mu$m in average particle size, to thereby obtain a rechargeable lithium battery of AA-size and having the configuration shown in FIG. 13.

Separately, for the collector, the first and second layers in the anode, their specific resistances were evaluated in the same manner as in Example 27.

As a result, it was found that the specific resistance of the second layer is greater than that of the first layer and the specific resistance of each of the first and second layers is greater than that of the collector.

EXAMPLE 29

The procedures of Example 27 were repeated, except that the anode (603) was replaced by an anode prepared as will be described below, to thereby obtain a rechargeable lithium battery of AA-size and having the configuration shown in FIG. 13.

Preparation of Anode 603

(i) Tin powder of 5 to 20 μm in average particle size, spherical graphite powder of 5 μm in average particle size, and filament-like nickel powder of 0.8 μm in average particle were mixed at a weight mixing ratio of 75:15:5 using an epicycle ball mill to obtain a mixture. The mixture was subjected to reduction treatment in hydrogen gas current at 150° C. The mixture thus treated and powder of polyvinylidene fluoride were mixed at a weight mixing of 95:5, followed by mixing with N-methyl-2-pyrrolidone, whereby obtaining a paste-like material.

(ii) There was provided a copper foil of 18 μm in thickness (whose opposite surfaces having been well cleaned using acetone and isopropyl alcohol) as an anode collector 601.

The paste-like material obtained in the above step (i) was applied on the opposite surfaces of the copper foil as the collector using a coater, followed by drying, whereby a 30 μm thick first layer on each of the opposite surfaces of the collector.

(iii) 90% by weight of spherical graphite powder and 10% by weight of powder of polyvinylidene fluoride were mixed to obtain a mixture, and the mixture was mixed with N-methyl-2-pyrrolidone to obtain a paste-like material. The paste-like material was applied on each of the opposite first layers formed on the collector using a coater, followed by drying. The resultant obtained was subjected to drying treatment at 150° C. under reduced pressure, whereby a 10 μm thick second layer was formed on the surface of each of the opposite first layers formed on the collector. By this, there was obtained an electrode structural body comprising the collector whose opposite surfaces having the first and second layers formed in this order on each of them.

(iv) The electrode structural body obtained in the above step (iii) was cut to obtain an electrode structural body having a prescribed size. A lead wire made of nickel as an anode lead 612 was connected to the collector of the electrode structural body by way of spot welding.

By this, there was obtained an anode 603.

Separately, for the collector, the first and second layers in the anode, their specific resistances were evaluated in the same manner as in Example 27.

As a result, it was found that the specific resistance of the second layer is greater than that of the first layer and the specific resistance of each of the first and second layers is greater than that of the collector.

EXAMPLE 30

The procedures of Example 27 were repeated, except that the anode (603) was replaced by an anode prepared as will be described below, to thereby obtain a rechargeable lithium battery of AA-size and having the configuration shown in FIG. 13.

Preparation of Anode 603

(i) Silicon powder (whose surface oxide films on their surfaces having been removed using an aqueous solution of hydrofluoric acid and ammonium fluoride) of 3 μm in average particle size, spherical graphite powder of 5 μm in average particle size, and filament-like nickel powder of 0.8 μm in average particle were missed at a weight mixing ratio of 75:15:5 using an epicycle ball mill to obtain a mixture. The mixture and powder of polyvinylidene fluoride were mixed at a weight mixing of 95:5, followed by mixing with N-methyl-2-pyrrolidone, whereby obtaining a paste-like material.

(ii) There was provided a copper foil of 18 μm in thickness (whose opposite surfaces having been well cleaned using acetone and isopropyl alcohol) as an anode collector 601.

The paste-like material obtained in the above step (i) was applied on the opposite surfaces of the copper foil as the collector using a coater, followed by drying, whereby a 30 μm thick first layer on each of the opposite surfaces of the collector.

(iii) 90% by weight of spherical graphite powder and 10% by weight of powder of polyvinylidene fluoride were mixed to obtain a mixture, and the mixture was mixed with N-methyl-2-pyrrolidone to obtain a paste-like material. The paste-like material was applied on each of the opposite first layers formed on the collector using a coater, followed by drying. The resultant obtained was subjected to drying treatment at 150° C. under reduced pressure, whereby a 10 μm thick second layer was formed on the surface of each of the opposite first layers formed on the collector. By this, there was obtained an electrode structural body comprising the collector whose opposite surfaces having the first and second layers formed in this order on each of them.

(iv) The electrode structural body obtained in the above step (iii) was cut to obtain an electrode structural body having a prescribed size. A lead wire made of nickel as an anode lead 612 was connected to the collector of the electrode structural body by way of spot welding.

By this, there was obtained an anode 603.

Separately, for the collector, the first and second layers in the anode, their specific resistances were evaluated in the same manner as in Example 27.

As a result, it was found that the specific resistance of the second layer is greater than that of the first layer and the specific resistance of each of the first and second layers is greater than that of the collector.

EXAMPLE 31

The procedures of Example 27 were repeated, except that the anode (603) was replaced by an anode prepared as will be described below, to thereby obtain a rechargeable lithium battery of AA-size and having the configuration shown in FIG. 13.

Preparation of Anode 603

(i) Tin powder of 20 μm in average particle size was immersed in an aqueous solution of bismuth chloride and copper chloride, where the tin (Sn) components of the tin powder were partly substituted by Bi and Cu using a difference among the elements' ionization tendencies. A specimen of the tin powder thus treated was dissolved in an acid and the acid solution was subjected to plasma luminescence analysis. As a result, the tin powder thus treated was found to contain Bi and Cu respectively in an amount of about 10 atomic %.

(ii) The tin powder treated in the above step (i), spherical graphite powder of 5 μm in average particle size, and filament-like nickel powder of 0.8 μm in average particle were mixed at a weight mixing ratio of 75:15:5 using an epicycle ball mill to obtain a mixture. The mixture was subjected to reduction treatment in hydrogen gas current at 150° C. The mixture thus treated and powder of polyvinylidene fluoride were mixed at a weight mixing of 95:5, followed by mixing with N-methyl-2-pyrrolidone, whereby obtaining a paste-like material.

(iii) there was provided a copper foil of 18 μm in thickness (whose opposite surfaces having been well cleaned using acetone and isopropyl alcohol) as an anode collector 601.

The paste-like material obtained in the above step (ii) was applied on the opposite surfaces of the copper foil was the collector using a coater, followed by drying, whereby a 30 μm thick first layer on each of the opposite surfaces of the collector.

(iv) 90% by weight of spherical graphite powder and 10% by weight of powder of polyvinylidene fluoride were mixed to obtain a mixture, and the mixture was mixed with N-methyl-2-pyrrolidone to obtain a paste-like material. The paste-like material was applied on each of the opposite first layers formed on the collector using a coater, followed by drying. The resultant obtained was subjected to drying treatment at 150° C. under reduced pressure, whereby a 10 μm thick second layer was formed on the surface of each of the opposite first layers formed on the collector. By this, there was obtained an electrode structural body comprising the collector whose opposite surfaces having the first and second layers formed in this order on each of them.

(v) The electrode structural body obtained in the above step (iv) was cut to obtain an electrode structural body having a prescribed size. A lead wire made of nickel as an anode lead 612 was connected to the collector of the electrode structural body by way of spot welding.

By this, there was obtained an anode 603.

Separately, for the collector, the first and second layers in the anode, their specific resistances were evaluated in the same manner as in Example 27.

As a result, it was found that the specific resistance of the second layer is greater than that of the first layer and the specific resistance of each of the first and second layers is greater than that of the collector.

EXAMPLE 32

The procedures of Example 27 were repeated, except that the anode (603) was replaced by an anode prepared as will be described below, to thereby obtain a rechargeable lithium battery of AA-size and having the configuration shown in FIG. 13.

Preparation of Anode 603

(i) Silicon powder of 3 μm in average particle size and 98% in purity was immersed in an aqueous solution of hydrofluoric acid and ammonium fluoride to remove surface oxide films present on their surfaces.

Herein, for the silicon powder thus treated, the surfaces thereof may be covered by Cu or Ag by way of electroless plating using chemical reduction reaction in which tin colloid (containing tin ions) is deposited on their surfaces, the deposited tin components are substituted by Pd, and the resultant is subjected to reduction reaction using the Pd as a catalyst.

In view of this, the above silicon powder whose surface oxide films present on their surfaces have been removed was immersed in an electroless plating solution containing potassium tartrate-sodium copper complex and formaldehyde dissolved therein, followed by heating to conduct copper-coating treatment. The resultant was subjected to heat treatment in hydrogen gas current at 150° C. to reduce oxide materials present on the copper surfaces of the silicon powder, whereby silicon powder whose surfaces having been covered by Cu.

(ii) The silicon powder treated in the above step (i), spherical graphite powder of 5 μm in average particle size, and filament-like nickel powder of 0.8 μm in average particle were mixed at a weight mixing ratio of 75:15:5 using an epicycle ball mill to obtain a mixture. The mixture and powder of polyvinylidene fluoride were mixed at a weight mixing of 95:5, followed by mixing with N-methyl-2-pyrrolidone, whereby obtaining a paste-like material.

(iii) There was provided a copper foil of 18 μm in thickness (whose opposite surfaces having been well cleaned using acetone and isopropyl alcohol) as an anode collector 601.

The paste-like material obtained in the above step (ii) was applied on the opposite surfaces of the copper foil as the collector using a coater, followed by drying, whereby a 30 μm thick first layer on each of the opposite surfaces of the collector.

(iv) 90% by weight of spherical graphite powder and 10% by weight of powder of polyvinylidene fluoride were mixed to obtain a mixture, and the mixture was mixed with N-methyl-2-pyrrolidone to obtain a paste-like material. The paste-like material was applied on each of the opposite first layers formed on the collector using a coater, followed by drying. The resultant obtained was subjected to drying treatment at 150° C. under reduced pressure, whereby a 10 μm thick second layer was formed on the surface of each of the opposite first layers formed on the collector. By this, there was obtained an electrode structural body comprising the collector whose opposite surfaces having the first and second layers formed in this order on each of them.

(v) The electrode structural body obtained in the above step (iv) was cut to obtain an electrode structural body having a prescribed size. A lead wire made of nickel as an anode lead 612 was connected to the collector of the electrode structural body by way of spot welding.

By this, there was obtained an anode 603.

Separately, for the collector, the first and second layers in the anode, their specific resistances were evaluated in the same manner as in Example 27.

As a result, it was found that the specific resistance of the second layer is greater than that of the first layer and the specific resistance of each of the first and second layers is greater than that of the collector.

EXAMPLE 33

The procedures of Example 27 were repeated, except that the anode (603) was replaced by an anode prepared as will be described below, to thereby obtain a rechargeable lithium battery of AA-size and having the configuration shown in FIG. 13.

Preparation of Anode 603

(i) There was provided a copper foil of 18 μm in thickness (whose opposite surfaces having been well cleaned using acetone and isopropyl alcohol) as an anode collector 601.

The copper foil as a cathode and a SUS (stainless steel) plate as a counter electrode (an anode) were positioned in an aqueous solution of nickel (II) nitrate with 0.1M (mol/L), where electric current of 2.5 mA/cm$^2$ was flown and the electric current of the cathode was properly controlled, whereby depositing nickel oxide on protrusions present on the opposite surfaces of the copper foil so as to cover the protrusions by the nickel oxide. The resultant was subjected to drying treatment at 150° C.

(ii) The copper foil thus treated in the above step (i) as a cathode and a SUS (stainless steel) plate as a counter electrode (an anode) were positioned in a tin-electroplating solution (an aqueous solution containing 40 g/L of stannous sulfate, 60 g/L of sulfuric acid, and 2 g/L of gelatin dissolved therein), where electric current of 28 mA/cm$^2$ was flown whereby forming a 30 μm thick tin material layer (as a first layer) comprising a grained tin material of 10 μm or less in average particle size on each of the opposite surfaces of the copper foil as the collector. For the particle size of the grained tin material as the tin material layer, it was determined by an electron microscope.

The resultant obtained in the above was subjected to drying treatment at 100° C. under reduced pressure.

(iii) In accordance with the same manner as in the step (i) and while properly controlling the electric current of the cathode, nickel oxide was deposited on protruded portions present on each of the opposite surfaces of the tin material layer as the first layer, followed by subjecting to drying treatment at 100° C. under reduced pressure.

(iv) 90% by weight of spherical graphite powder and 10% by weight of powder of polyvinylidene fluoride were mixed to obtain a mixture, and the mixture was mixed with N-methyl-2-pyrrolidone to obtain a paste-like material. The paste-like material was applied on each of the opposite first layers formed on the collector using a coater, followed by drying. The resultant obtained was subjected to drying treatment at 150° C. under reduced pressure, whereby a 10 μm thick second layer was formed on the surface of each of the opposite first layers formed on the collector. By this, there was obtained an electrode structural body comprising the collector whose opposite surfaces having the first and second layers formed in this order on each of them.

(v) The electrode structural body obtained in the above step (iv) was cut to obtain an electrode structural body having a prescribed size. A lead wire made of nickel as an anode lead 612 was connected to the collector of the electrode structural body by way of spot welding.

By this, there was obtained an anode 603.

Separately, for the collector, the first and second layers in the anode, their specific resistances were evaluated in the same manner as in Example 27.

As a result, it was found that the specific resistance of the second layer is greater than that of the first layer and the specific resistance of each of the first and second layers is greater than that of the collector.

EXAMPLE 34

There was prepared a coin-like shaped rechargeable lithium battery having the configuration shown in FIG. 12 in the following manner.

(1) Preparation of anode 501:

(i) Silicon powder of 1 to 3 μm in average particle size, tin powder of 20 μm in average particle size, spherical graphite powder of 5 μm in average particle size, and flake-like copper powder of 10 μm in width and 1 μm in thickness were mixed at a weight mixing ratio of 25:50:15:5 using an epicycle ball mill to obtain a mixture, the mixture and powder of polyvinylidene fluoride were mixed at a weight mixing of 95:5, followed by mixing with N-methyl-2-pyrrolidone, whereby obtaining a paste-like material.

(ii) There was provided a copper foil of 18 μm in thickness (whose opposite surfaces having been well cleaned using acetone and isopropyl alcohol) as an anode collector.

The paste-like material obtained in the above step (i) was applied on the surface of the copper foil as the collector using a coater, followed by drying, whereby a 30 μm thick first layer on each of the opposite surfaces of the collector.

(iii) 85% by weight of powder of zinc oxide and 15% by weight of powder of polyvinylidene fluoride were mixed to obtain a mixture, and the mixture was mixed with N-methyl-2-pyrrolidone to obtain a paste-like material. The paste-like material was applied on the first layer formed on the collector using a coater, followed by drying. The resultant was subjected to drying treatment at 150° C. under reduced pressure, whereby a 10 μm thick second layer was formed on the first layer formed on the collector. By this, there was obtained an electrode structural body comprising the collector whose surface having the first and second layers laminated in this order thereon.

(iv) The electrode structural body obtained in the above step (iii) was cut to obtain an electrode structural body having a prescribed size.

By this, there was obtained an anode 501.

Herein, independently, for the collector, the first and second layers in the anode, their specific resistances were evaluated in the same manner as in Example 27.

As a result, it was found that the specific resistance of the second layer is greater than that of the first layer and the specific resistance of each of the first and second layers is greater than that of the collector.

(2) Preparation of cathode 503:

Electrolytic manganese dioxide was mixed with lithium carbonate with a mole ratio of 1:0.4, followed by subjecting to heat treatment at 800° C., to thereby obtain a lithium-manganese composite oxide. With the resultant lithium-manganese composite oxide in an amount of 85 wt. %, 5 wt. % of powder of acetylene black and 10 wt. % of powder of polyvinylidene fluoride were mixed. The resultant was mixed with N-methyl-2-pyrrolidone to obtain a paste-like material. The paste-like material was applied onto a surface of a 20 μm thick aluminum foil as a cathode collector using a coater, followed by subjecting to drying, successively to roller press treatment, and the resultant was dried at 150° C. under reduced pressure to obtain an electrode structural body comprising a 90 μm thick cathode material layer formed on the surface of the collector.

The electrode structural body thus obtained was cut to obtain an electrode structural body having a prescribed size. By this, there was obtained a cathode 503.

(3) Preparation of electrolyte solution:

There was provided a moisture-free mixed solvent composed of ethylene carbonate (EC) and dimethyl carbonate (DMC) with an equivalent mixing ratio. 1 M (mol/L) of tetrafluoro lithium borate was dissolved in the mixed solvent.

By this, there was obtained an electrolyte solution.

(4) Separator 507:

There was provided a 25 μm thick polyethylene member having a number of perforations as a separator 507.

(5) Fabrication of rechargeable lithium battery:

The fabrication of a coin-shaped rechargeable lithium battery was conducted in a dry argon atmosphere having been controlled with respect to moisture in the range of dew point to 50° C.

(i) The cathode 503 and the separator 507 were inserted in a cathode can 506, followed by installing a gasket 510 made of polypropylene. Then, the electrolyte solution was injected, followed by laminating the anode 501 on the separator 507. Successively, a spacer (not shown in FIG. 12) was installed to pinch the cathode 503 and the anode 501 so as to press them from the opposite sides. Then, an anode cap 505 was put on, followed by sealing by way of caulking the cathode can and the anode cap using a caulking machine.

By this, there was obtained a coin-shaped rechargeable lithium battery. In this rechargeable lithium battery, the cathode has a greater capacity than that of the anode.

Incidentally, in Examples 27 to 34, there was used the foregoing lithium-manganese composite oxide only as the cathode active material. This is only for the purpose of evaluating the performances of the anode in each case. It is a matter of course that other cathode active materials including, for example, lithium-nickel composite oxide, lithium-cobalt composite oxide, and lithium-vanadium composite oxide can be optionally used.

Similarly, although only one kind electrolyte solution was used in Examples 27 to 34, any other electrolyte solutions can be optionally used.

REFERENCE EXAMPLE 8

The procedures of Example 27 were repeated, except that the anode (603) was replaced by a single-layered anode prepared as will be described below, to thereby obtain a rechargeable lithium battery of AA-size and having the configuration shown in FIG. 13.

Preparation of anode 603:
(i) 90% by weight of spherical graphite powder and 10% by weight of powder of polyvinylidene fluoride were mixed to obtain a mixture, and the mixture was mixed with N-methyl-2-pyrrolidone to obtain a paste-like material.
(ii) There was provided a copper foil of 18 $\mu$m in thickness (whose opposite surfaces having been cleaned using acetone and isopropyl alcohol) as an anode collector 601.

The paste-like material obtained in the above step (i) was applied on each of the opposite surfaces of the collector using a coater, followed by drying. The resultant was subjected to roll-press treatment to form a 90 $\mu$m thick graphite layer on each of the opposite surfaces of the collector, followed by subjecting to drying treatment at 150° C. under reduced pressure. By this, there was obtained an electrode structural body comprising the collector whose opposite surfaces having the graphite layer formed an anode material layer on each of them.

(iii) The electrode structural body obtained in the above step (ii) was cut to obtain an electrode structural body having a prescribed size. A lead wire made of nickel as an anode lead 612 was connected to the collector of the electrode structural body by way of spot welding.

By this, there was obtained an anode 603.

REFERENCE EXAMPLE 9

The procedures of Example 30 were repeated, except that the silicon powder of 3 $\mu$m in average particle size in the step (i) in the preparation of anode 603 was replaced by silicon powder of 60 $\mu$m in average particle size, to thereby obtain a rechargeable lithium battery of AA-size and having the configuration shown in FIG. 13.

EVALUATION

For each of the rechargeable batteries obtained in Examples 27 to 34 and Reference Examples 8 and 9, its battery capacity (namely, an energy density per a unit volume of the battery) and its charging and discharging cycle life were evaluated through the charging and discharging cycle test.

The charging and discharging cycle test was conducted in the following manner. That is, each rechargeable battery is placed in a charging and discharging device HK-106M (produced by Hokuto Denko Kabushiki Kasiha), wherein charging and discharging are alternately repeated under conditions of 0.2 C (electric current of 0.2 time the electric capacity per an hour based on the electric capacity calculated from the cathode active material of the rechargeable battery) for the charging and discharging, and 30 minutes for the rest. As for other conditions, in the case of a rechargeable lithium battery, the cut-off voltage upon charging is made to be 4.2 V and that upon discharging is made to be 2.5 V.

The charging and discharging cycle test was initiated by operating charging. In the charging and discharging test, as for each rechargeable battery, there were observed its battery capacity (that is, an energy density, namely, a discharge energy density) per a unit volume of the rechargeable battery and its charging and discharging cycle life. The battery capacity was based on the service capacity after the third repetition of the charging and discharging cycle. And the charging and discharging cycle life was based on the number of the charging and discharging cycle having been repeated until the battery capacity became less than 60% of the initial battery capacity.

For the energy density (Wh/L, with L being liter) per a unit volume of the battery, it was evaluated based on a value obtained by the equation [average operation voltage (V) x discharge electricity quantity (Ah)]/battery volume (L). The battery volume herein is based on the outer size of an assembled body comprising the anode/the separator/the cathode.

In this way, for each of the rechargeable batteries obtained in Examples 27 to 34 and Reference Examples 8 and 9, its energy density per a unit volume of the battery and its charging and discharging cycle life were evaluated.

Herein, it should be understood that Reference Example 9 was conducted chiefly for the comparison purpose with respect to the effect of the average particle size of the host matrix material of the first layer in the anode.

In the following, the evaluated energy densities of the rechargeable batteries obtained in Examples 27 to 34 are collectively shown, where the figure shown for each of Examples 27 to 34 is a value relative to the evaluated energy density of Reference Example 8, which is set at 1.0.

| Example 27 | 1.6 |
| Example 28 | 1.4 |
| Example 29 | 1.5 |
| Example 30 | 1.3 |
| Example 31 | 1.6 |
| Example 32 | 1.4 |
| Example 33 | 1.5 |
| Example 34 | 1.4 |

Based on the above results, it is understood that any of the rechargeable batteries of Examples 27 to 34 has a desirable energy density which is apparently higher than that of the rechargeable battery of Reference Example 8 in which graphite in which lithium ion is intercalated upon charging is used in the anode.

For the charging and discharging cycle life, it was found that although the charging and discharging cycle life of the rechargeable battery of Example 34 is somewhat inferior to that of the rechargeable battery of Reference Example 8, the charging and discharging cycle life of each of the remaining examples is substantially the same as that of Example 8.

In order to examine the effects of the average particle size of the grained host matrix material according to the present invention, the charging and discharging cycle life of the rechargeable battery of Example 30 in which the grained host matrix material (the silicon powder) having a relatively small average particle size (3 $\mu$m) is used in the first layer of the anode was compared with that of the rechargeable battery of Reference Example 9 in which the grained host matrix material (the silicon powder) having a greater average particle size (60 $\mu$m) is used in the first layer of the anode.

Particularly, the ratio of the repeated number of the charging and discharging cycle until the battery capacity became less than 60% of the initial battery capacity for the former (Example 30) to that for the latter (Reference Example 9) was examined. The examined result was 1.9 (the cycle life of Example 30/the cycle life of Reference Example 9).

This reveals that the use of a grained host matrix material having an appropriately small average particle size in the first layer in the anode achieve a prolonged charging and discharging cycle life.

In order to examine the effects of the element substitution for the grained host matrix material according to the present invention used in the first layer in the anode, the charging and discharging cycle life of the rechargeable battery of Example 31 in which the element substitution was conducted was compared with that of the rechargeable battery of Example 29 in which such element substitution was not conducted. Particularly, this comparison was conducted by normalizing the charging and discharging cycle of Example 29 at 1.0.

The compared result was 1.2 for the cycle life of Example 31/the cycle life of Example 29. This reveals that in the case where the grained host matrix material is partly substituted by Cu or Bi, the charging and discharging is further prolonged.

In order to examine the effects when the surfaces of the grained host matrix material in powder form according to the present invention which is used in the first layer in the anode are covered by a highly electrically conductive material, the energy density and the charging and discharging cycle life of the rechargeable battery of Example 32 in which such surface coating was conducted were compared with those of the rechargeable battery of Example 30 in which such surface coating was not conducted. Particularly, this comparison was conducted by normalizing each of the energy density and the charging and discharging cycle of Example 30 at 1.0.

The compared results were 1.1 for the energy density of Example 32/the energy density of Example 30 and 1.3 for the cycle life of Example 32/the cycle life of Example 30. These facts reveal that in the case where the surfaces of the grained host matrix material in powder from (that is, the silicon powder) used in the first layer in the anode are covered by a highly electrically conductive material (Cu), the performance of electric current is improved to improve the energy density and the charging and discharging cycle life is further prolonged.

In order to examine the effects due to the shape of the electrically conductive auxiliary is used together with the grained host matrix material according to the present invention in the first layer in the anode, the charging and discharging cycle life of the rechargeable battery of Example 27 in which the flake-like copper powder was used was compared with that of the rechargeable battery of Example 28 in which the spherical copper powder was used. Particularly, this comparison was conducted by normalizing the charging and discharging cycle of Example 28 at 1.0.

The compared result was 1.2 for the cycle life of Example 27/the cycle life of Example 28.

This reveals that when electrically conductive auxiliaries having a different shape are used together with the grained host matrix material according to the present invention in the first layer in the anode, the packing density is improved to improve the electric current-collecting performance and the charging and discharging cycle life is further prolonged.

Based on the above-described facts, it is understood that according to the present invention, a high performance rechargeable lithium battery having a high energy density and a prolonged charging and discharging cycle life can be attained.

EXAMPLE 35

[rechargeable nickel-zinc battery]

There was prepared a coil-like shaped rechargeable nickel-zinc battery (having a two-layered anode material) having the configuration shown in FIG. 12 in the following manner.

(1) Preparation of anode 501:

(i) Powder of zinc oxide of 20 $\mu$m in average particle size, spherical graphite powder of 5 $\mu$m in average particle size, and flake-like copper powder of 10 $\mu$m in width and 1 $\mu$m in thickness were mixed at a weight mixing ratio of 85:5:5 using an epicycle ball mill to obtain a mixture, and the mixture was mixed with an aqueous solution containing polytetrafluoroethylene dispersed therein to obtain a paste-like material containing said mixture and said polytetrafluoroethylene at a weight ratio of 95:5.

(ii) There was provided an expanded metal member made of copper as an anode collector. The paste-like material obtained in the above step (i) was applied on a surface of the expanded metal member as the collector using a coater, followed by subjecting to drying treatment, then subjecting to roller-press treatment, whereby a 125 $\mu$m thick first layer was formed on the surface of the collector.

(iii) powder of ITO ($In_2O_3+SnO_3$), graphite powder and powder of carboxymethylcellulose (as a binder) were mixed at a weight mixing ratio of 45;45:10 to obtain a mixture, and the mixture was mixed with water to obtain a paste-like material. The paste-like material was applied on the first layer formed on the collector using a coater, followed by subjecting drying treatment, then subjecting to roller-press treatment, whereby a 25 $\mu$m thick second layer was formed on the first layer formed on the collector. By this, there was obtained an electrode structural body comprising the collector whose surface having the first and second layers laminated in this order thereon.

(iv) The electrode structural body obtained in the above step (iii) was cut to obtain an electrode structural body having a prescribed size. By this, there was obtained an anode 501.

Herein, independently, for the collector, the first and second layers in the anode, their specific resistances were evaluated in the same manner as in Example 27.

As a result, it was found that the specific resistance of the second layer is greater than that of the first layer and the specific resistance of each of the first and second layers is greater than that of the collector.

(2) Preparation of cathode 503:

Nickel hydroxide, nickel powder and carboxymethylcellulose were mixed, followed by adding water, whereby obtaining a paste-like material. A nickel foam member as a cathode collector was filled with the paste-like material. The resultant was dried, followed by subjecting to roll press treatment, whereby an electrode structural body comprising a cathode material layer formed in the collector.

The electrode structural body thus obtained was cut to obtain an electrode structural body having a prescribed size. By this, there was obtained a cathode 503.

(3) Electrolyte solution:

As an electrolyte solution, there was provided a 30 wt. % potassium hydroxide aqueous solution added with lithium hydroxide.

(4) Separator 507:

As a separator 507, there was provided a 100 $\mu$m thick composite body comprising a non-woven polypropylene member (having subjected to water immersion treatment) interposed between a pair of polypropylene members having a number of perforations (having subjected to water immersion treatment).

(5) Fabrication of rechargeable lithium battery:

(i) The cathode 503 and the separator 507 were inserted in a cathode can 506 made of stainless steel clad by titanium, followed by installing a gasket 510 made of polypropylene. Then, the electrolyte solution was injected, followed by laminating the anode 501 on the separator 507. Successively, a spacer made of stainless steel (not shown in FIG. 12) was installed to pinch the cathode 503 and the anode 501 so as to press them from the opposite sides. Then, an anode cap 505 made of stainless steel clad by titanium was put on, followed by sealing by way of caulking the cathode can and the anode cap using a caulking machine.

By this, there was obtained a coin-like shaped rechargeable nickel-zinc battery having a two-layered anode material layer. In this rechargeable nickel-zinc battery, the cathode has a greater capacity than that of the anode.

REFERENCE EXAMPLE 10

[rechargeable nickel-zinc battery]

The procedures of Example 35 were repeated, except that the step (iii) for the formation of the second layer in the preparation of anode 501 was not conducted, to thereby obtain a coin-like shaped rechargeable nickel-zinc battery (having a single-layered anode material layer) having the configuration shown in FIG. 12.

EVALUATION

For each of the rechargeable batteries obtained in Example 15 and Reference Example 10, its battery capacity (namely, an energy density per a unit volume of the battery) and its charging and discharging cycle life were evaluated through the charging and discharging cycle test.

The charging and discharging cycle test was conducted in the following manner. That is, each rechargeable battery is placed in a charging and discharging device HJ-106M (produced by Hokuto Denko Kabushiki Kaisha), wherein charging and discharging are alternately repeated under conditions of 0.2 C (electric current of 0.2 time the electric capacity per an hour based on the electric capacity calculated from the cathode active material of the rechargeable battery) for the charging and discharging, and 30 minutes for the rest.

As for other conditions, in the case of a rechargeable nickel-zinc battery, the cut-off voltage upon charging is made to be 2.0 V and that upon discharging is made to be 0.9 V The charging and discharging cycle test was initiated by operating charging. In the charging and discharging test, as for each rechargeable battery, there were observed its battery capacity (that is, an energy density, namely, a discharge energy density) per a unit volume of the rechargeable battery and its charging and discharging cycle life. The battery capacity was based on the service capacity after the third repetition of the charging and discharging cycle. And the charging and discharging cycle life was based on the number of the charging and discharging cycle having been repeated until the battery capacity became less than 60% of the initial battery capacity.

For the energy density (Wh/L) per a unit volume of the battery, it was evaluated based on a value obtained by the equation: [average operation voltage (V) x discharge electricity quantity (Ah)]/battery volume (L). The battery volume herein is based on the outer size of an assembled body comprising the anode/the separator/the cathode.

In this way, for each of the rechargeable batteries obtained in Example 35 and Reference Example 10, its energy density per a unit volume of the battery and its charging and discharging cycle life were evaluated. Based on the evaluated results, examination was conducted of the effects of the second layer used in the anode of the rechargeable battery of Example 35 by comparing the charging and discharging cycle life of the rechargeable battery of Example 35 with that of the rechargeable battery of Reference Example 10. Particularly, this comparison was conducted by normalizing the charging and discharging cycle life of Reference Example 10 at 1.0. The compared result was 1.7 for the cycle life of Example 35/ the cycle life of Reference Example 10. This reveals that when the anode material layer of the anode is designed to have such two-layered structure (comprising the first layer comprising the grained host matrix material according to the present invention and the second layer) as in Example 35, the charging and discharging cycle life is further prolonged.

EXAMPLE 36

[rechargeable zinc-oxygen battery]

There was prepared a coil-like shaped rechargeable zinc-oxygen battery having the configuration shown in FIG. 12 in the following manner.

(1) Preparation of anode 501:

(i) Powder of zinc oxide of 20 $\mu$m in average particle size, spherical graphite powder of 5 $\mu$m in average particle size, and filament-like nickel powder of 0.8 $\mu$m in average particle size were mixed at a weight mixing ratio of 85:5:5 using an epicycle ball mill to obtain a mixture, and the mixture was mixed with an aqueous solution containing polytetrafluoroethylene dispersed therein to obtain a paste-like material containing said mixture and said polytetrafluoroethylene at a weight ratio of 95:5.

(ii) There was provided an expanded metal member made of copper as an anode collector. The paste-like material obtained in the above step (i) was applied on a surface of the expanded metal member as the collector using a coater, followed by subjecting to drying treatment, then subjecting to roller-press treatment, whereby a 125 $\mu$m thick first layer on the surface of the collector.

(iii) powder of tungsten carbide and powder of carboxymethylcellulose (as a binder) were mixed at a weight mixing ratio of 95:5 to obtain a mixture, and the mixture was mixed with water to obtain a paste-like material. The paste-like material was applied onto the first layer formed on the collector using a coater, followed by subjecting drying treatment, then subjecting to roller-press treatment, whereby a 25 μm thick second layer was formed on the first layer formed on the collector. By this, there was obtained an electrode structural body comprising the collector whose surface having the first and second layers laminated in this order thereon.

(iv) The electrode structural body obtained in the above step (iii) was cut to obtain an electrode structural body having a prescribed size. By this, there was obtained an anode 501.

Herein, independently, for the collector, the first and second layers in the anode, their specific resistances were evaluated in the same manner as in Example 27.

As a result, it was found that the specific resistance of the second layer is greater than that of the first layer and the specific resistance of each of the first and second layer is greater than that of the collector.

(2) Preparation of cathode 503:

Powder of acetylene black, manganese dioxide, nickel oxide, and cobalt oxide were mixed to obtain a mixture. The mixture was mixed with an aqueous solution containing polytetrafluoroethylene dispersed therein to obtain a paste-like material. The paste-like material was applied onto a nickel mesh member as a cathode collector using a coater, followed by subjecting to drying treatment, then subjecting to roller-press treatment, whereby an electrode structural body comprising a cathode material layer formed on the nickel mesh member as the collector.

The electrode structural body thus obtained was cut to obtain an electrode structural body having a prescribed size. By this, there was obtained a cathode 503.

(3) Electrolyte solution:

As an electrolyte solution, there was provided a 30 wt. % potassium hydroxide aqueous solution added with lithium hydroxide.

(4) Separator 507:

As a separator 507, there was provided a 100 μm thick composite body comprising a non-woven polypropylene member (having subjected to water immersion treatment) interposed between a pair of polypropylene members having a number of perforations (having subjected to water immersion treatment).

(5) Fabrication of rechargeable lithium battery:

(i) An air diffusing paper and a water repellent film made of tetrafluoroethylene were inserted in a cathode can 506 made of stainless steel clad by titanium and which is provided with a port for the introduction of air. Then, the cathode 503 and the separator 507 were inserted therein, followed by laminating the anode 501 on the separator 507. Successively, a spacer made of stainless steel (not shown in FIG. 12) was installed to pinch the cathode 503 and the anode 501 so as to press them. Then, an anode cap 505 made of stainless steel clad by titanium was put on, followed by sealing by way of caulking the cathode can and the anode cap using a caulking machine.

By this, there was obtained a coin-like shaped rechargeable zinc-oxygen battery. In this rechargeable zinc-oxide battery, the cathode has a greater capacity than that of the anode.

REFERENCE EXAMPLE 11

[rechargeable zinc-oxygen battery]

The procedures of Example 36 were repeated, except that in the step (i) in the preparation of anode 501, without using the spherical graphite powder and the filament-like nickel powder, the zinc oxide powder was mixed with an aqueous solution containing polytetrafluoroethylene dispersed therein to obtain a paste-like material containing said zinc oxide powder and said polytetrafluoroethylene at a weight ratio of 95:5, whereby a coin-like shaped rechargeable zinc-oxygen battery having the configuration shown in FIG. 12.

EVALUATION

For each of the rechargeable batteries obtained in Example 36 and Reference Example 11, its battery capacity (namely, an energy density per a unit volume of the battery) and its charging and discharging cycle life were evaluated through the charging and discharging cycle test in the same manner as in Example 35 and Reference Example 10.

For each of the rechargeable batteries obtained in Example 36 and Reference Example 11, there were obtained evaluated results with respect to the energy density and the charging and discharging cycle life. Based on the evaluated results, examination was conducted of the effects of the electrically conductive auxiliary used in the first of the anode of the rechargeable battery of Example 36 by comparing the energy density and the charging and discharging cycle life of the rechargeable battery of Example 36 with those of the rechargeable battery of Reference Example 11.

Particularly, this comparison was conducted by normalizing each of the energy density and the charging and discharging cycle life of Reference Example 11 at 1.0. The compared result were 1.2 for the energy density of Example 36/the energy density of Reference Example 11, and 2.3 for the cycle life of Example 36/the cycle life of Reference Example 11.

These facts reveal that when in the case where the anode is designed as in Example 36, the electric current-collecting performance is improved to improve the energy density and the charging and discharging cycle life is further prolonged. Hence, it is understood that a high performance rechargeable zinc-oxygen battery having a high energy density and a prolonged charging and discharging cycle life can be attained.

REFERENCE EXAMPLE 12

[rechargeable lithium battery]

The procedures of Example 27 were repeated, except that the anode (603) was replaced by an anode prepared as will be described below, to thereby obtain a rechargeable lithium battery of AA-size and having the configuration shown in FIG. 13.

Preparation of anode 603:

(i) Silicon powder of 3 μm is average particle size, tin powder of 20 μm in average particle size, spherical graphite powder, and flake-like copper powder were mixed at a weight mixing ratio of 25:50:15:5 using an epicycle ball mill to obtain a mixture. The mixture and powder of polyvinylidene fluoride were mixed at a weight mixing of 95:5. The resultant was mixed with N-methyl-2-pyrrolidone to obtain a paste-like material.

(ii) There was provided a copper foil of 18 μm in thickness (whose opposite surfaces having been well cleaned using acetone and isopropyl alcohol) as an anode collector 601. The paste-like material obtained in the above step (i) was applied on the opposite surfaces of the copper foil as the collector using a coater, followed by drying, whereby a 30 μm thick first layer was formed on each of the opposite surfaces of the collector.

(iii) A commercially available Ag-paste (having a lower specific resistance ($1\times10^{-5}$ Ω·cm) than said first layer) was applied on each of the opposite first layers formed on the collector using a coater, followed by subjecting to drying treatment, then subjecting to heat treatment at 160° C., whereby forming a 10 μm thick second layer on each of the opposite first layers. The resultant was subjected to drying treatment at 150° C. under reduced pressure. By this, there was obtained an electrode structural body comprising the collector whose opposite surfaces having the first and second layers laminated in this order on each of them.

(iv) The electrode structural body obtained in the above step (iii) was cut to obtain an electrode structural body having a prescribed size. A lead wire made of nickel as an anode lead 612 was connected to the collector of the electrode structural body by way of spot welding. By this, there was obtained an anode 601.

Separately, for each of the first and second layers, their specific resistances were evaluated in the same manner as in Example 27. As a result, it was found that the specific resistance of the second layer is smaller than that of the first layer.

REFERENCE EXAMPLE 13
[rechargeable lithium battery]

The procedures of Example 13 were repeated, except that the anode (603) was replaced by an anode prepared as will be described below, to thereby obtain a rechargeable lithium battery of AA-size and having the configuration shown in FIG. 13.

Preparation of anode 603:

(i) There was provided a copper foil of 18 μm in thickness (whose opposite surfaces having been well cleaned using acetone and isopropyl alcohol)as an anode collector 601.

The copper foil as a cathode and a SUS (stainless steel) plate as a counter electrode (an anode) were positioned in a tin-electroplating solution (an aqueous solution containing 40 g/L of stannous sulfate, 60 g/L of sulfuric acid, and 2 g/L of gelatin dissolved therein), where electric current of 28 mA/cm$^2$ was flown, whereby forming a 39 μm thick tin material layer (as a first layer) comprising a grained tin material of 10 μm or less in average particle size on each of the opposite surfaces of the copper foil as the collector. The resultant was subjected to drying treatment at 100° C. under reduced pressure.

(ii) On each of the opposite first layers formed in the above step (i), there was formed a 1 μm thick aluminum layer (having an apparently lower specific resistance than the first layer) as a second on each of the opposite first layers formed on the collector by way of electron beam evaporation. By this, there was obtained an electrode structural body comprising the collector whose opposite surfaces having the first and second layers laminated in this order on each of them.

(iii) The electrode structural body obtained in the above step (ii) was cut to obtain an electrode structural body having a prescribed size. A lead wire made of nickel as an anode lead 612 was connected to the collector of the electrode structural body by way of spot welding. By this, there was obtained an anode 603.

Separately, for each of the first and second layers, their specific resistances were evaluated in the same manner as in Example 27. As a result, it was found that the specific resistance of the second layer is smaller than that of the first layer.

REFERENCE EXAMPLE 14
[rechargeable nickel-zinc battery]

The procedures of Example 35 were repeated, except that the anode (501) was replaced by an anode prepared as will be described below, to thereby obtain a coin-like shaped rechargeable nickel-zinc battery having the configuration shown in FIG. 12.

(1) Preparation of anode 501:

(i) Powder of zinc oxide of 20 μm in average particle size, spherical graphite powder of 5 μm in average particle size, and flake-like copper powder of 10 μm in width and 1 μm in thickness were mixed at a weight mixing ratio of 85:5:5 using an epicycle ball mill to obtain a mixture, and the mixture was mixed with an aqueous solution containing polytetrafluoroethylene dispersed therein to obtain a paste-like material containing said mixture and said polytetrafluoroethylene at a weight ratio of 95:5.

(ii) There was provided an expanded metal member made of copper as an anode collector. The paste-like obtained in the above step (i) was applied onto a surface of the expanded metal member as the collector using a coater, followed by subjecting to drying treatment, then subjecting to roller-press treatment, whereby a 125 μm thick first layer was formed on the surface of the collector.

(iii) A commercially available Cu-paste powder (having a lower specific resistance ($2\times10^{-4}$ Ω·cm) than said first layer) was applied onto the first layer formed on the collector using a coater, followed by subjecting to drying treatment, then subjecting to roller-press treatment, whereby forming a 25 μm thick second layer on the first layer. By this, there was obtained an electrode structural body comprising the collector whose surface having the first and second layers laminated in this order thereon.

(iv) The electrode structural body obtained in the above step (iii) was cut to obtain an electrode structural body having a prescribed size. By this, there was obtained an anode 501.

Separately, for each of the first and second layers, their specific resistances were evaluated in the same manner as in Example 27. As a result, it was found that the specific resistance of the second layer is smaller than that of the first layer.

REFERENCE EXAMPLE 15
[rechargeable zinc-oxygen battery]

The procedures of Example 36 were repeated, except that the anode (501) was replaced by an anode prepared in the same manner as in Reference Example 14, to thereby obtain a coin-like shaped rechargeable zinc-oxygen battery having the configuration shown in FIG. 12.

Separately, for each of the first and second layers, their specific resistances were evaluated in the same manner as in Example 27. As a result, it was found that the specific resistance of the second layer is smaller than that of the first layer.

EVALUATION

Evaluation was conducted in order to examine the effects due to the relation between the specific resistance of the first layer and that of the second layer in the anode.

Particularly, each of the rechargeable batteries obtained in Reference Examples 12 to 15, its charging and discharging cycle life was evaluated through the charging and discharging cycle test.

The charging and discharging cycle test was conducted in the following manner. That is, each rechargeable battery is placed in a charging and discharging device MJ-106M (produced by Hokuto Denko Kabushiki Kaisha), wherein charging and discharging are alternately repeated under conditions of 0.2 C (electric current of 0.2 time the electric capacity per an hour based on the electric capacity calculated from the cathode active material of the rechargeable battery) for the charging and discharging, and 30 minutes for the rest. As for other conditions, in the case of a rechargeable lithium battery (Reference Examples 12 and 13), the cut-off voltage upon charging is made to be 4.5 V and that upon discharging is made to be 2.8 V, and in the case of a rechargeable zinc series battery (Reference Examples 14 and 15), the cut-off voltage upon charging is made to be 2.0 V and that upon discharging is made to be 0.9 V.

The charging and discharging cycle test was initiated by operating charging. In the charging and discharging test, as for each rechargeable battery, its charging and discharging cycle life was observed. The charging and discharging cycle life was based on the number of the charging and discharging cycle having been repeated until the battery capacity became less than 60% of the initial battery capacity.

In this way, for each of the rechargeable batteries of Reference Examples 12 to 15, there was obtained a value of the charging and discharging cycle life (this value will be hereinafter referred to as "cycle life value").

In the following, the cycle life values of the rechargeable batteries of Reference Examples 12 to 15 are collectively shown, where the cycle life value of each of Reference Examples 12 to 15 is shown in comparison with that of the corresponding example (that is, Example 27, 13, 35, or 36) by normalizing the cycle life value of each of Reference Examples 12 to 15 at 1.0.

Example 27/Reference Example 12=2.6
Example 13/Reference Example 13=2.1
Example 35/Reference Example 35=3.4
Example 36/Reference Example 36=3.7

Based on the above results, it is understood that any of the rechargeable batteries in which the second layer has a specific resistance which is higher than that of the first layer has a longer charging and discharging cycle life.

From the above description, the following facts are understood. The present invention provides an improved high performance electrode structural body which desirably solve the problems found in the prior art, i.e., in not only the conventional rechargeable lithium batteries in which the oxidation-reduction of lithium is used but also the rechargeable zinc series batteries in which be oxidation-reduction of zinc is used, such that their anode is liable to pulverize upon repeating the charging and discharging cycle over a long period of time, and a dendrite of lithium or zinc is liable to generate or it is grown when it is generated, whereby causing internal-shorts between the anode and cathode, resulting in shortening the battery lifetime. By using this electrode structural body as the anode, there can be attained a high performance rechargeable battery having a high battery capacity, a high energy density, and a prolonged charging and discharging cycle life.

TABLE 1

| | density ($g/cm^3$) | void ratio | average particle size ($\mu m$) | surface roughness ($\mu m$) | crystallite size (nm) | *intensity ratio |
|---|---|---|---|---|---|---|
| Example 1 | 2.84 | 0.61 | 25 | 10.6 | 19.1 | 6.2 |
| Example 2 | 5.90 | 0.19 | 20 | 4.3 | 19.5 | 6.2 |
| Example 3 | 6.10 | 0.16 | 10 | 7.2 | 20.7 | 2.2 |
| Example 4 | 6.56 | 0.10 | 0.5 | 1.5 | 14.6 | 2.7 |
| Example 5 | 2.20 | 0.70 | 50 | 20.5 | — | — |
| Example 6 | 3.52 | 0.52 | 30 | 18.0 | — | — |
| Example 7 | 2.75 | 0.65 | 40 | 52.0 | — | — |
| Example 8 | 1.35 | 0.81 | 10 | 15.2 | 18.3 | 1.25 |
| Example 9 | 4.50 | 0.55 | 20 | 7.5 | — | — |
| Example 10 | 1.65 | 0.33 | 10 | 8.2 | — | — |
| Example 11 | 1.40 | 0.34 | 10 | 9.5 | — | — |
| Example 12 | 1.30 | 0.45 | 10 | 11.0 | — | — |
| Reference Example 1 | 7.29 | 0 | — | 0.2 | 51.0 | 1.8 |
| Reference Example 2 | 0.90 | 0.88 | 70 | 75.0 | 9.5 | 1.8 |
| Reference Example 3 | 6.80 | 0.07 | 0.01 | 0.6 | 20.6 | 1.6 |

*intensity ratio of the intensity of strongest peak (first peak) to that of second peak

TABLE 2

| | additive in electrolyte solution | Sn | C | O | N |
|---|---|---|---|---|---|
| Example 1 | gelatin: 2 g/l | 1 | 2.5 | 2.4 | 0.6 |
| Example 2 | gelatin: 20 g/l | 1 | 2.9 | 2.6 | 0.8 |
| Example 5 | 4-vinylpyridine: 10 ml/l | 1 | 5.0 | 2.4 | 0.4 |
| Example 6 | aniline and furan: respectively 5 ml/l | 1 | 4.6 | 2.3 | 0.6 |
| Example 7 | gelatin: 2 g/l, carbon: 20 g/l | 1 | 7.5 | 2.4 | 0.6 |
| Reference. Example 2 | none | 1 | 0.9 | 2.4 | 0 |

TABLE 3

| | Sn | C | O | N |
|---|---|---|---|---|
| Example 1 | 1 | 0.02 | 0.20 | 0.02 |
| Example 2 | 1 | 0.06 | 0.30 | 0.02 |

TABLE 4

| | anode | cathode | presence or absence of cracking | presence or absence of pores | battery capacity | battery lifetime |
|---|---|---|---|---|---|---|
| Example 13 | Example 1 | Li—Mn composite oxide | none | present | 1.7 | 28 |
| Example 14 | Example 2 | Li—Mn composite oxide | none | present | 1.9 | 30 |

TABLE 4-continued

| | anode | cathode | presence or absence of cracking | presence or absence of pores | battery capacity | battery lifetime |
|---|---|---|---|---|---|---|
| Example 15 | Example 3 | Li—Mn composite oxide | none | present | 1.9 | 20 |
| Example 16 | Example 4 | Li—Mn composite oxide | none | present | 2.0 | 18 |
| Example 17 | Example 5 | Li—Mn composite oxide | none | present | 1.4 | 27 |
| Example 18 | Example 6 | Li—Mn composite oxide | none | present | 1.8 | 32 |
| Example 19 | Example 7 | Li—Mn composite oxide | none | present | 1.6 | 33 |
| Example 20 | Example 8 | Li—Mn composite oxide | none | present | 1.8 | 31 |
| Example 21 | Example 9 | Li—Mn composite oxide | none | present | 1.7 | 30 |
| Example 22 | Example 10 | Li—Mn composite oxide | none | present | 1.5 | 17 |
| Example 23 | Example 11 | Li—Mn composite oxide | none | present | 1.7 | 19 |
| Example 24 | Example 12 | Li—Mn composite oxide | none | present | 1.8 | 25 |
| Example 25 | * | Li—Mn composite oxide | — | — | 1.5 | 35 |
| Example 26 | * | Li—Mn composite oxide | — | — | 1.5 | 36 |
| Reference Example 4 | Reference Example 1 | Li—Mn composite oxide | present | none | 1.5 | 1 |
| Reference Example 5 | Reference Example 2 | Li—Mn composite oxide | none | present | 0.9 | 10 |
| Reference Example 6 | Reference Example 3 | Li—Mn composite oxide | present | none | 1.5 | 2 |
| Reference Example 7 | carbonous material | Li—Mn composite oxide | — | — | 1.0 | — |

*modification (two-layered structure) of Example 1

What is claimed is:

1. An electrode structural body comprising a plate shaped collector having opposite surfaces and an electrode material layer formed on at least one of said opposite surfaces of said collector,
   wherein said electrode material layer contains 35% by weight or more of a grained host matrix material of 0.5 to 60 μm in average particle size,
   wherein said electrode material layer has a void ratio of 0.10 to 0.86,
   wherein said electrode material layer has a density in a range of 1.00 to 6.56 g/cm$^3$,
   wherein the grained host matrix material comprises a grained material composed of one or more elements selected from the group consisting of Si, Ge, Sn, Pb, In, Mg, and Zn, and
   wherein said collector is constituted of a metallic material which is inactive in a battery reaction selected from the group consisting of Cu, Ni, Fe, Ti, and alloys of two or more of these metals.

2. An electrode structural body according to claim 1, wherein said electrode structural body is used in a rechargeable battery in which charging and discharging are alternatively operated, and a plurality of pores of 0.10 to 10 μm in diameter are formed at a surface of the grained host matrix material layer after discharging.

3. An electrode structural body according to claim 1, wherein the electrode material layer has a thickness in a range of 5 to 500 μm.

4. An electrode structural body according to claim 1, wherein said electrode structural body is used in a rechargeable battery in which charging and discharging are alternately operated, and said electrode material layer of said electrode structural body in an unused state prior to operating either charging or discharging has a surface with a surface roughness of 1 to 60 μm in peak-to-valley elevation.

5. An electrode structural body according to claim 1, wherein the collector has a surface provided with at least a protruded portion and said protruded portion is covered by a material having a resistivity which is greater than that of a material constituting said collector.

6. An electrode structural body according to claim 5, wherein the material by which the protruded portion of the collector is covered is an oxide of one or more elements selected from the group consisting of Ni, Zn, Sn, and In.

7. An electrode structural body according to claim 1, wherein the average particle size of the grained host matrix material is in a range of 0.5 to 20 μm.

8. An electrode structural body according to claim 1, wherein the grained host matrix material comprises a grained material whose resistivity in bulk state is in a range of $1 \times 10^{-6}$ to $1 \times 10^0$ Ω·cm.

9. An electrode structural body according to claim 1, wherein the grained host matrix material comprises a grained material whose resistivity in bulk state is in a range of $1 \times 10^{-5}$ to $1 \times 10^{-1}$ Ω·cm.

10. An electrode structural body according to claim 1, wherein the electrode material layer contains 50% by weight or more of the grained host matrix material.

11. An electrode structural body according to claim 1, wherein said electrode structural body is used as an electrode of a rechargeable battery in which oxidation-reduction reaction of lithium is used, and the grained host matrix material of the electrode material layer comprises a grained matrix composed of one or more elements selected from the group consisting of Si, Sn, and In.

12. An electrode structural body according to claim 1, wherein said electrode structural body is used as an electrode of a rechargeable battery in which oxidation-reduction reaction of zinc is used, and the granted host matrix material of the electrode material layer comprises a grained material composed of one or more members selected from the group consisting of zinc oxide and zinc alloy.

13. An electrode structural body according to claim 1, wherein the grained host matrix material comprises a grained material whose surfaces are covered by a layer comprising one or more kinds of metallic materials.

14. An electrode structural body according to claim 1, wherein the electrode material layer contains an electrically conductive auxiliary in addition to the grained host matrix material.

15. An electrode structural body according to claim 14, wherein the electrically conductive auxiliary comprises a carbonous material or a metallic material.

16. An electrode structural body according to claim 14, wherein the electrode material layer contains the electrically conductive auxiliary in an amount of 1 to 30% by weight.

17. An electrode structural body according to claim 14, wherein the electrically conductive auxiliary is shaped in a form selected from the group consisting of a spherical form, a flake form, a filament form, a fibrous form, a spike form, and a needle form.

18. An electrode structural body according to claim 1, wherein the electrode material layer contains an organic polymer in addition to the grained host matrix material.

19. An electrode structural body according to claim 18, wherein the electrode material layer contains the organic polymer in an amount of 2 to 20% by weight.

20. An electrode structural body according to claim 1, wherein the electrode material layer contains an electrically conductive auxiliary and an organic polymer in addition to the grained host matrix material.

21. An electrode structural body according to claim 1, wherein the grained host matrix material of the electrode material layer is constituted by a metallic tin material or a tin alloy material.

22. An electrode structural body according to claim 21, wherein the tin alloy material has a tin element content of 50% to less than 100%.

23. An electrode structural body according to claim 21 wherein the tin alloy material is an alloy of Sn with one or more elements selected from the group consisting of Sb, Bi, Pb, Ni, Cu, Ag, and Zn.

24. An electrode structural body according to claim 21, wherein the grained host matrix material constituted by the metallic tin material or the tin alloy material is 10 to 50 nm in crystallite size.

25. An electrode structural body according to claim 21, wherein the electrode material layer has a void ratio in the range of 0.31 to 0.73.

26. An electrode structural body according to claim 21, wherein the electrode material layer has a density in a range of 2.00 to 6.00 g/cm$^3$.

27. An electrode structural body according to claim 21, wherein said electrode structural body is used in a rechargeable battery in which charging and discharging are alternatively operated, and a plurality of pores of 0.10 to 10 µm in diameter are formed at a surface of the grained host matrix material layer after discharging.

28. An electrode structural body according to claim 21, wherein the electrode material layer has a thickness in a range of 5 to 500 µm.

29. An electrode structural body according to claim 21, wherein said electrode structural body is used in a rechargeable battery in which charging and discharging are alternately operated, and said electrode material layer of said electrode structural body in an unused state prior to operating either charging or discharging has a surface with a surface roughness of 1 to 60 µm in peak-to-valley elevation.

30. An electrode structural body according to claim 21, wherein the electrode material layer contains one or more elements selected from the group consisting of C, N, O, F, and S.

31. An electrode structural body according to claim 30, wherein the one or more elements selected from the group consisting of C, N, O, F, and S are contained in a layer region of the electrode material layer on the side opposite the collector at a concentration which is greater than that of said one or more elements contained in a layer region of said electrode material layer which is adjacent to the collector.

32. An electrode structural body according to claim 21, wherein the grained host matrix material constituted by the metallic tin material or the tin alloy material comprises particles of the metallic tin material or the tin alloy material containing tin oxide among the particles or on surfaces of the particles.

33. An electrode structural body according to claim 21, wherein the electrode material layer contains an organic polymer, a carbonous material, or both an organic polymer and a carbonous material in addition to the grained metallic tin host matrix material or the grained tin alloy host matrix material.

34. An electrode structural body according to claim 21, wherein said electrode structural body is used as an anode of a rechargeable battery in which oxidation-reduction reaction of lithium is used.

35. A electrode structural body according to any of claim 1, 2-10, 11-24, 25 and 26-34 which has an additional layer comprising 80 to 98% by weight of an inorganic material and 2 to 20% by weight of an organic polymer on the electrode material layer comprising the grained matrix material formed on the collector.

36. An electrode structural body according to claim 35, wherein the grained host matrix material in bulk state at 20° C. has a resistivity which is greater than that of the material constituting the collector, and the inorganic material in bulk state at 20° C. has a specific resistance which is greater than said resistivity of the grained host matrix material.

37. An electrode structural body according to claim 36, wherein the resistivity of the inorganic material is in a range of $1\times10^{-4}$ to $1\times10^2$ Ω·cm.

38. An electrode structural body according to claim 36, wherein the resistivity of the inorganic material is in a range of $1\times10^{-4}$ to $1\times10^1$ Ω·cm.

39. An electrode structural body according to claim 35, wherein the additional layer has a thickness in a range of 1 to 30 µm.

40. A rechargeable battery comprising at least an anode, a cathode, and an electrolyte in which charging and discharging are alternately operated using oxidation-reduction reaction of an active material of said anode, characterized in that said anode comprises a plate shaped collector having opposite surfaces and an electrode material layer formed on at least one of said opposite surfaces of said collector, wherein said electrode material layer contains 35% by weight or more of a grained host matrix material of 0.5 to 60 µm in average particle size, wherein said electrode material layer has a void ratio of 0.10 to 0.86, wherein said electrode material layer has a density in a range of 1.00 to 6.65 g/cm$^3$, wherein the graned host matrix material comprises a grained material composed of one or more elements selected from the group consisting of Si, Ge, Sn, Pb, In, Mg, and Zn, and wherein said collector is constituted of a metallic material which is inactive in a battery reaction selected from the group consisting of Cu, Ni, Fe, Ti, and alloys of two or more of these metals.

41. A rechargeable battery according to claim 40, wherein a plurality of pores of 0.10 to 10 µm in diameter are formed at a surface of the grained host matrix material layer after discharging.

42. A rechargeable battery according to claim 40, wherein the electrode material layer has a thickness in a range of 5 to 500 µm.

43. A rechargeable battery according to claim 40, wherein the electrode material layer of the anode in an unused state prior to operating either charging or discharging has a surface with a surface roughness of 1 to 60 μm in peak-to-valley evaluation.

44. A rechargeable battery according to claim 40, wherein the collector has a surface provided with at least a protruded portion and said protruded portion is covered by a material having a resistivity which is greater than that of a material constituting said collector.

45. A rechargeable battery according to claim 40, wherein the material by which the protruded portion of the collector is covered is an oxide of one or more elements selected from the group consisting of Ni, Zn, Sn, and In.

46. A rechargeable battery according to claim 40, wherein the average particle size of the grained host matrix material is in a range of 0.5 to 20 μm.

47. A rechargeable battery according to claim 40, wherein the grained host matrix material comprises a grained material whose resistivity in bulk state is in a range of $1 \times 10^{-6}$ to $1 \times 10^{0}$ Ω·cm.

48. A rechargeable battery according to claim 40, wherein the grained host matrix material comprises a grained material whose resistivity in bulk state is in a range of $1 \times 10^{-5}$ to $1 \times 10^{-1}$ Ω·cm.

49. A rechargeable battery according to claim 40, wherein the electrode material layer contains 50% by weight or more of the grained host matrix material.

50. A rechargeable battery according to claim 40, wherein said rechargeable batter is a rechargeable battery in which oxidation-reduction reaction of lithium is used, and the grained host matrix material of electrode material layer comprises a grained material composed of one or more elements selected from the group consisting of Si, Sn, and In.

51. A rechargeable battery according to claim 40, wherein said rechargeable batter is a rechargeable battery in which oxidation-reduction reaction of zinc is used, and the grained host matrix material of the electrode material layer comprises a grained material composed of one or more members selected from the group consisting of zinc oxide and zinc alloy.

52. A rechargeable battery according to claim 40, wherein the grained host matrix material comprises a grained material whose surfaces are covered by a layer comprising one or more kinds of metallic materials.

53. A rechargeable battery according to claim 40, wherein the electrode material layer contains an electrically conductive auxiliary in addition to the grained host matrix material.

54. A rechargeable battery according to claim 53, wherein the electrically conductive auxiliary comprises a carbonous material or a metallic material.

55. A rechargeable battery according to claim 54, wherein the electrode material layer contains the electrically conductive auxiliary in an amount of 1 to 30% by weight.

56. A rechargeable battery according to claim 53, wherein the electrically conductive auxiliary is shaped in a form selected from the group consisting of a spherical form, a flake form, a filament form, a fibrous form, a spike form, and a needle form.

57. A rechargeable battery according to claim 40, wherein the electrode material layer contains an organic polymer in addition to the grained host matrix material.

58. A rechargeable battery according to claim 57, wherein the electrode material layer contains the organic polymer in an amount of 2 to 20% by weight.

59. A rechargeable battery according to claim 40, wherein the electrode material layer contains an electrically conductive auxiliary and an organic polymer in addition to the grained best matrix material.

60. A rechargeable batter according to claim 40, wherein the grained host matrix material of the electrode material layer is constituted by a metallic tin material or a tin alloy material.

61. A rechargeable battery according to claim 60, wherein the tin alloy material has a tin element content of 50% to less than 100%.

62. A rechargeable battery according to claim 60, wherein the tin alloy material is an alloy of Sn with one or more elements selected from the group consisting of Sb, Bi, Pb, Ni, Cu, Ag, and Zn.

63. A rechargeable battery according to claim 60, wherein the grained host matrix material constituted by the metallic tin material or the tin alloy material is 10 to 50 nm in crystallite size.

64. A rechargeable battery according to claim 60, wherein the electrode material layer has a void ratio in the range of 0.31 to 0.73.

65. A rechargeable battery according to claim 60, wherein the electrode material layer has a density in a range of 2.00 to 6.00 g/cm$^3$.

66. A rechargeable battery according to claim 60, wherein a plurality of pores of 0.10 to 10 μm, diameter are formed at a surface of the grained host matrix material layer after discharging.

67. A rechargeable battery according to claim 60, wherein the electrode material layer has a thickness in a range of 5 to 500 μm.

68. A rechargeable battery according to claim 60, wherein the electrode material layer of the anode in an unused state prior to operating either charging or discharging has a surface with a surface roughness of 1 to 60 μm in peak-to-valley elevation.

69. A rechargeable battery according to claim 60, wherein the electrode material layer contains one or more elements selected from the group consisting of C, N, O, F, and S.

70. A rechargeable battery according to claim 69, wherein the one or more elements selected from the group consisting of C, N, O, F, and S are contained in a layer region of the electrode material layer on the side opposite the collector at a concentration which is greater than that of said one or more elements contained in a layer region of said electrode material layer which is adjacent to the collector.

71. A rechargeable battery according to claim 60, wherein the grained host matrix material constituted by the metallic tin material or the tin alloy material comprises particles of the metallic tin material or the tin alloy material containing tin oxide among the particles or on surfaces of the particles.

72. A rechargeable battery according to claim 60, wherein the electrode material layer contains an organic polymer, a carbonous material, or both an organic polymer and a carbonous material in addition to the grained metallic tin host matrix material or the grained tin alloy host matrix material.

73. A rechargeable battery according to claim 60, wherein said rechargeable battery is a rechargeable battery in which oxidation-reduction reaction of lithium is used.

74. A rechargeable battery according to claim 60, wherein said rechargeable battery is a rechargeable battery in which oxidation-reduction reaction of lithium is used, and wherein the anode comprising the electrode material layer in a charged state has an elemental ratio of lithium element contained therein to the tin element contained therein in a range of 0.1 to 3.52.

75. A rechargeable battery according to claim 40, wherein an additional layer comprising 80 to 98% by weight of an inorganic material and 2 to 20% by weight of an organic polymer is provided on the electrode material layer comprising the grained matrix material formed on the collector.

76. A rechargeable battery according to claim 75, wherein the grained host matrix material in bulk state at 20° C. has a resistivity which is greater than that of the material constituting the collector, and the inorganic material in bulk state at 20° C. has a resistivity which is greater than said specific resistance of the grained host matrix material in bulk state.

77. A rechargeable battery according to claim 76, wherein the resistivity of the inorganic material is in a range of $1 \times 10^{-4}$ to $1 \times 10^{1}$ Ω·cm.

78. A rechargeable battery according to claim 76, wherein the resistivity of the inorganic material is in a range of $1 \times 10^{-4}$ to $1 \times 10^{1}$ Ω·cm.

79. A rechargeable battery according to claim 75, wherein the additional layer has a thickness in a range of 1 to 30 μm.

80. An electrode structural body according to claim 1, wherein the electrode material layer comprises a mixture of said grained host matrix material and an electrically conductive auxiliary comprising one or more materials selected from the group consisting of carbonous materials and metallic materials.

81. An electrode structural body according to claim 1, wherein said grained host matrix material comprises a Si powder with a purity of less than 99% which contains an impurity comprising one or more elements selected from the group consisting of Al, Ca, Cr, Fe, Mg, Mn, and Ni.

82. An electrode structural body according to claim 81, wherein said Si powder comprises particles whose surfaces are partially covered by one or more materials selected from the group consisting of Cu, Ni, Ag and Sn.

83. An electrode structural body according to claim 81 to 82, wherein the electrode material layer comprises a mixture of said grained host matrix material and an electrically conductive auxiliary comprising one or more materials selected from the group consisting of carbonous materials and metallic materials.

84. An electrode structural body comprising a plate shaped collector having opposite surfaces and an electrode material layer formed on at least one of said opposite surfaces of said collector, wherein said electrode material layer contains 35% by weight or more of a grained host matrix material of 0.5 to 60 μm in average particle size, said grained host matrix material comprising a Si powder with a purity of less than 99% which contains an impurity comprising one or more elements selected from the group consisting of Al, Ca, Cr, Fe, Mg, Mn, and Ni.

85. An electrode structural body according to claim 84, wherein said Si powder comprises particles whose surfaces are partially covered by one or more materials selected from group consisting of Cu, Ni, Ag and Sn.

86. An electrode structural body according to claim 84 or 85, wherein the electrode material layer comprises a mixture of said grained host matrix material and an electrically conductive auxiliary comprising one or more materials selected from the group consisting of carbonous materials and metallic materials.

87. A rechargeable battery according to claim 40, wherein the electrode material layer comprises a mixture of said grained host matrix material and an electrically conductive auxiliary comprising one or more materials selected from the group consisting of carbonous materials and metallic materials.

88. A rechargeable battery according to claim 40, wherein said grained host matrix material comprises a Si powder with a purity of less than 99% which contains an impurity comprising one or more elements selected from the group consisting of Al, Ca, Cr, Fe, Mg, Mn, and Ni.

89. A rechargeable battery according to claim 88, wherein said Si powder comprises particles whose surfaces are partially covered by one or more materials selected from the group consisting of Cu, Ni, Ag and Sn.

90. A rechargeable battery according to claim 88 or 89, wherein the electrode material layer comprises a mixture of said grained host matrix material and an electrically conductive auxiliary comprising one or more materials selected from the group consisting of carbonous materials and metallic materials.

91. A rechargeable battery comprising at least an anode, a cathode, and an electrolyte in which charging and discharging are alternately operated using oxidation-reduction reaction of an active material of said anode, characterized in that said anode comprises a plate shaped collector having opposite surfaces and an electrode material layer formed on at least one of said opposite surfaces of said collector, said electrode material layer containing 35% by weight or more of a grained host matrix material 0.5 to 60 μm in average particle size, said grained host matrix material comprising a Si powder with a purity of less than 99% which contains an impurity comprising one or more elements selected from the group consisting of Al, Ca, Cr, Fe, Mg, Mn, and Ni.

92. A rechargeable battery according to claim 91, wherein said Si powder comprises particles whose surfaces are partially covered by one or more materials selected from the group consisting of Cu, Ni, Ag and Sn.

93. A rechargeable battery according to claim 91 or 92, wherein the electrode material layer comprises a mixture of said granted host matrix material and an electrically conductive auxiliary comprising one or more materials selected from the group consisting of carbonous materials and metallic materials.

94. An electrode structural body comprising a plate shaped collector having opposite surfaces and an electrode material layer formed on at least one of said opposite surfaces of said collector, wherein said electrode material layer contains 35% by weight or more of a grained host matrix material of 0.5 to 60 μm in average particle size and has a density in a range of 1.00 to 6.56 g/cm³, said grained host matrix material comprising a grained material composed of at least an element selected from the group consisting of Si, Ge, Sn, Pb, In, Mg and Zn, said electrode material layer comprising a mixture of said grained host matrix material, an electrically said grained host matrix material, an electrically conductive auxiliary comprising one or more materials selected from the group consisting of carbonous materials and metallic materials, and a binder, and said collector being constituted by a metallic material which is inactive in a battery reaction selected from the group consisting of Cu, Ni, Fe, Ti, and alloys of two or more these metals.

95. A rechargeable battery comprising at least an anode, a cathode, and an electrolyte and in which charging and discharging are alternately operated using oxidation-reduction reaction of an active material of said anode, characterized in that said anode comprises a plate shaped collector having opposite surfaces and an electrode material layer formed on at least one of said opposite surfaces of said collector, said electrode material layer containing 35% by weight or more of a grained host matrix material of 0.5 to 60 μm in average particle size and having a density in a range of 1.00 to 6.56 g/cm³, said grained host matrix material comprising a grained material composed of at least an element selected from the group consisting of Si, Ge, Sn, Pb, In, Mg and Zn, said electrode material layer comprising a mixture of said grained host matrix material, an electrically conductive auxiliary comprising one or more materials selected from the group consisting of carbonous materials and metallic materials, and a binder, and said collector being constituted by a metallic material which is inactive in a battery reaction selected from the group consisting of Cu, Ni, Fe, Ti, and alloys of two or more these metals.

* * * * *

UNITED STATES PATENT AND TRADEMARK OFFICE
CERTIFICATE OF CORRECTION

PATENT NO. : 6,432,585 B1
DATED : August 13, 2002
INVENTOR(S) : Soichiro Kawakami et al.

It is certified that error appears in the above-identified patent and that said Letters Patent is hereby corrected as shown below:

Title page,
Item [57], ABSTRACT,
Line 3, "an" should read -- on --; and
Line 6, "5" should read -- 0.5 --.

Column 1,
Line 36, "Ones" should read -- fumes --;
Line 61, "potable" should read -- portable --; and
Line 65, "has" should read -- has been --.

Column 2,
Line 3, "-anode" should read -- anode --;
Line 7, "hive" should read -- have --;
Line 8, "lithium," should read -- lithium --;
Line 12, "which" should read -- which a --;
Line 17, "will" should read -- will be --;
Line 24, "in addition" should read -- In addition --;
Line 32, "not" should read -- not a --;
Line 39, "portions." should read -- portions --;
Line 62, "Is" should read -- is --; and
Line 66, "attain a:" should read -- to attain a --.

Column 3,
Line 20, "used" should read -- used in --;
Line 52, "mm; in" should read -- mm in --; and
Line 58, "used," should read -- used --.

Column 4,
Line 3, "mm, in" should read -- mm in --; and
Line 9, "describes" should read -- describe --.

Column 5,
Line 32, "-reduction." should read -- -reduction --;
Line 40, "such" should read -- such as --; and
Line 49, "2(B)" should read -- 2(b) --.

Column 6,
Line 7, "means" should read -- means of --; and
Line 57, "example of," should read -- example of --.

UNITED STATES PATENT AND TRADEMARK OFFICE
CERTIFICATE OF CORRECTION

PATENT NO. : 6,432,585 B1
DATED : August 13, 2002
INVENTOR(S) : Soichiro Kawakami et al.

It is certified that error appears in the above-identified patent and that said Letters Patent is hereby corrected as shown below:

Column 7,
Line 3, "60 $\mu$m." should read -- 60 $\mu$m --;
Line 7, "capacity" should read -- capacity, --;
Line 18, "electrochemical" should read -- electrochemically --;
Line 20, "in" should read -- In --; and
Line 54, "material," should read -- material --.

Column 8,
Line 11, "life)," should read -- life) --;
Lines 13 and 36, "ratios" should read -- ratio --;
Line 48, "among," should read -- among --;
Line 50, "particle," should read -- particles, --;
Line 58, "kind" should read -- kind of --;
Line 58, "W=w)." should read -- W=w), --; and
Line 64, "battery" should read -- battery. --.

Column 9,
Line 11, "ratios" should read -- ratio --;
Line 22, "in" should read -- in an --;
Line 23, "being" should read -- been --; and
Line 51, "more" should read -- more of --.

Column 10,
Line 25, "in" should read -- In --;
Line 35, "uses" should read -- used --; and
Line 45, "ray" should read -- may --.

Column 11,
Line 39, "Si" should read -- Bi --;
Line 55, "obtained" should read -- obtained. --; and
Line 61, "consisting-" should read -- consisting --.

Column 12,
Line 36, "layer 101" should read -- layer 102 --;
Line 39, "electrodes" should read -- electrode --;
Line 44, "increased" should read -- increase --;
Line 53, "We" should read -- the --; and
Line 63, "in additional" should read -- In addition, --.

UNITED STATES PATENT AND TRADEMARK OFFICE
CERTIFICATE OF CORRECTION

PATENT NO. : 6,432,585 B1
DATED : August 13, 2002
INVENTOR(S) : Soichiro Kawakami et al.

It is certified that error appears in the above-identified patent and that said Letters Patent is hereby corrected as shown below:

Column 16,
Line 5, "can alloys" should read -- can be alloys --;
Line 18, "prises" should read -- prise --; and
Line 48, "maganese" should read -- manganese --.

Column 17,
Line 16, "under" should read -- under an --; and
Lines 52, 55 and 63, "ratios" should read -- ratio --.

Column 18,
Lines 2, 19, 28 and 35, "ratios" should read -- ratio --; and
Line 24, "ratios the" should read -- ratio of the --.

Column 20,
Line 8, "being" should read -- being an --;

Column 21,
Line 65, "ratios," should read -- ratio, --.

Column 23,
Line 40, "control" should read -- controlling --;
Line 47, "pinhole." should read -- pinholes. --.

Column 24,
Line 35, "capable" should read -- capable of --;
Line 42, "production an" should read -- production of an --;
Line 50, "is" (second occurrence) should be deleted; and
Line 66, "same" should read -- same as --.

Column 25,
Line 43, "batter," should read -- battery, --.

Column 26,
Lines 3, 8 and 26, "ratios." should read -- ratio. --;
Line 42, "particles)" should read -- particles)) --; and
Line 56, "of more" should read -- or more --.

Column 28,
Line 64, "be also" should read -- also be --.

UNITED STATES PATENT AND TRADEMARK OFFICE
CERTIFICATE OF CORRECTION

PATENT NO.    : 6,432,585 B1
DATED         : August 13, 2002
INVENTOR(S)   : Soichiro Kawakami et al.

It is certified that error appears in the above-identified patent and that said Letters Patent is hereby corrected as shown below:

Column 31,
Line 35, "nitrobenzene," should read -- nitrobenzene, dichloroethane, diethoxyethane, 1,2-dimethoxyethane, chlorobenzene, ϒ-butyrolactone, dioxolon, sulfolan, nitromethane --.

Column 32,
Line 1, "illustrate" should read -- illustrated --; and
Line 50, "reference numeral a cathode collector" should be deleted.

Column 33,
Line 49, "batter," should read -- battery, --.

Column 34,
Line 27, "functions" should read -- functions as --; and
Line 62, "them to" should read -- them to be --.

Column 35,
Line 10, "purpose" should read -- purposes --; and
Line 31, "electrode" should read -- electrodes --.

Column 38,
Line 49, "reduce" should read -- reduced --.

Column 39,
Line 59, "RATE:" should read -- RATIO: --; and
Lines 61 and 62, "ratios" should read -- ratio --.

Column 40,
Lines 46 and 47, "ratios" should read -- ratio --.

Column 45,
Line 6, "replaced" should read -- replaced by --; and
Line 26, "17" should read -- 7 --.

Column 46,
Line 47, "after the" (second occurrence) should be deleted.

UNITED STATES PATENT AND TRADEMARK OFFICE
CERTIFICATE OF CORRECTION

PATENT NO.  : 6,432,585 B1
DATED       : August 13, 2002
INVENTOR(S) : Soichiro Kawakami et al.

It is certified that error appears in the above-identified patent and that said Letters Patent is hereby corrected as shown below:

Column 47,
Line 20, "for" should read -- For --; and
Line 40, "if prolonged" should read -- is prolonged --.

Column 48,
Line 33, "ratios" should read -- ratio of --; and
Lines 38 and 43, "ratios" should read -- ratio --.

Column 49,
Line 17, "comprising he" should read -- comprising the --; and
Line 50, "obtained a value" should read -- obtain a value --.

Column 51,
Line 67, "missed" should read -- mixed --.

Column 53,
Line 5, "there" should read -- There --.

Column 58,
Line 7, "HK-106M" should read -- HJ-106M --.

Column 59,
Line 25, "achieve" should read -- achieved --.

Column 60,
Line 25, "material)" should read -- material layer) --;
Line 47, "powder" should read -- Powder --; and
Line 47, "$SnO_3$)," should read -- $SnO_2$), --.

Column 61,
Line 53, "Example 15" should read -- Example 35 --.

Column 62,
Line 4, "V" should read -- V. --; and
Line 66, "powder" should read -- Powder --.

Column 64,
Line 34, "result" should read -- results --.

UNITED STATES PATENT AND TRADEMARK OFFICE
CERTIFICATE OF CORRECTION

PATENT NO. : 6,432,585 B1
DATED : August 13, 2002
INVENTOR(S) : Soichiro Kawakami et al.

It is certified that error appears in the above-identified patent and that said Letters Patent is hereby corrected as shown below:

Column 65,
Line 21, "601." should read -- 603. --.

Column 66,
Line 24, "paste-like" should read -- paste-like material --.

Column 67,
Line 7, "MJ-106M" should read -- HJ-106M --;
Line 50, "solve" should read -- solves --; and
Line 54, "be" should read -- the --.

Column 69,
Line 49, "altena-" should read -- alternate --; and
Line 50, "tively" should read -- ly --.

Column 70,
Line 48, "matrix" should read -- material --; and
Line 53, "granted" should read -- grained --.

Column 71,
Line 41, "alterna" should read -- alternate --; and
Line 42, "tively" should read -- ly --.

Column 72,
Line 50, "graned" should read -- grained --.

Column 73,
Line 3, "evaluation." should read -- elevation. --; and
Line 67, "best" should read -- host --.

Column 74,
Line 1, "batter" should read -- battery --; and
Line 23, "10 $\mu$m" should read -- 10 $\mu$m in --.

Column 75,
Line 33, "81 to" should read -- 81 or --; and
Line 51, "from" should read -- from the --.

UNITED STATES PATENT AND TRADEMARK OFFICE
CERTIFICATE OF CORRECTION

PATENT NO. : 6,432,585 B1
DATED : August 13, 2002
INVENTOR(S) : Soichiro Kawakami et al.

It is certified that error appears in the above-identified patent and that said Letters Patent is hereby corrected as shown below:

Column 76,
Line 32, "granted" should read -- grained --; and
Line 53, "more" should read -- more of --.

Column 78,
Line 3, "more" should read -- more of --.

Signed and Sealed this

Eighth Day of April, 2003

JAMES E. ROGAN
*Director of the United States Patent and Trademark Office*